United States Patent
Todo et al.

(10) Patent No.: US 8,503,490 B2
(45) Date of Patent: Aug. 6, 2013

(54) INFORMATION PROCESSING APPARATUS, INFORMATION PROCESSING METHOD, AND PROGRAM

(75) Inventors: Shin Todo, Tokyo (JP); Motomu Ueta, Kanagawa (JP); Jun Onuki, Kanagawa (JP); Masaki Nishikawa, Kanagawa (JP); Masafumi Kurashige, Kanagawa (JP); Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 393 days.

(21) Appl. No.: 12/986,297

(22) Filed: Jan. 7, 2011

(65) Prior Publication Data

US 2011/0173654 A1    Jul. 14, 2011

(30) Foreign Application Priority Data

Jan. 14, 2010 (JP) ................ P2010-006137
Jan. 14, 2010 (JP) ................ P2010-006138

(51) Int. Cl.
*H04J 3/04* (2006.01)

(52) U.S. Cl.
USPC ....................................... 370/535

(58) Field of Classification Search
None
See application file for complete search history.

(56) References Cited

U.S. PATENT DOCUMENTS

| 7,313,031 | B2 | 12/2007 | Shiga | |
| 8,345,168 | B2* | 1/2013 | Takashimizu et al. | 348/725 |
| 2004/0017508 | A1* | 1/2004 | Huang | 348/441 |
| 2004/0240446 | A1* | 12/2004 | Compton | 370/389 |
| 2007/0217763 | A1* | 9/2007 | Siemens et al. | 386/112 |
| 2009/0073320 | A1 | 3/2009 | Todo et al. | |

FOREIGN PATENT DOCUMENTS

| JP | 2006 236056 | 9/2006 |
| JP | 2009 71701 | 4/2009 |

* cited by examiner

*Primary Examiner* — Otis L Thompson, Jr.
(74) *Attorney, Agent, or Firm* — Frommer Lawrence & Haug LLP; William S. Frommer

(57) ABSTRACT

A communication device includes a transmission amplifier supplied with a binary transmission signal is capable of choosing between amplifying the transmission signal and entering a high-impedance state at an output. An antenna is supplied with a transmission signal output from the transmission amplifier. A comparator compares a signal received by the antenna with threshold values to obtain a reception signal, which is supplied to a processing unit. A capacitor is connected between the transmission amplifier and the antenna or between the antenna and the comparator. A control unit allows the transmission amplifier to be in the high-impedance state for a period during which the processing unit receives a reception signal.

11 Claims, 31 Drawing Sheets

FIG. 9

| MULTIPLEXED VIDEO FRAME CONFIGURATION INFORMATION |
|---|
| HORIZONTAL LENGTH, HORIZONTAL BLANKING LENGTH, AND HORIZONTAL EFFECTIVE LENGTH OF MULTIPLEXED VIDEO FRAME<br>VERTICAL LENGTH, VERTICAL BLANKING LENGTH, AND VERTICAL EFFECTIVE LENGTH OF MULTIPLEXED VIDEO FRAME<br>FRAME STRUCTURE (Interlaced/Progressive) OF MULTIPLEXED VIDEO FRAME<br>FRAME FREQUENCY OF MULTIPLEXED VIDEO FRAME<br>BIT WIDTH (8-BIT/10-BIT/12-BIT/16-BIT) OF MULTIPLEXED VIDEO FRAME |
| VIDEO-MULTIPLEXING RELATED INFORMATION |
| PRESENCE/ABSENCE OF EACH VIDEO (FLAG INDICATING VIDEO HAS BEEN MULTIPLEXED)<br>MULTIPLEXING POSITION (x COORDINATE OF STARTING POINT, y COORDINATE OF STARTING POINT) OF EACH VIDEO<br>HORIZONTAL SIZE AND VERTICAL SIZE OF EACH VIDEO<br>MULTIPLEXING LINE INTERVAL OF EACH VIDEO<br><br>PRESENCE/ABSENCE OF Ancillary Data OF EACH VIDEO<br>MULTIPLEXING POSITION (x COORDINATE OF STARTING POINT, y COORDINATE OF STARTING POINT) OF Ancillary Data OF EACH VIDEO<br>HORIZONTAL SIZE AND VERTICAL SIZE OF Ancillary Data OF EACH VIDEO<br>MULTIPLEXING LINE INTERVAL OF Ancillary Data OF EACH VIDEO |
| VIDEO FORMAT INFORMATION |
| CLOCK FREQUENCY OF EACH VIDEO<br>POLARITY (H, V) OF BLANKING PULSE OF EACH VIDEO<br>HORIZONTAL LENGTH, HORIZONTAL BLANKING LENGTH, AND HORIZONTAL EFFECTIVE LENGTH OF EACH VIDEO<br>VERTICAL LENGTH, VERTICAL BLANKING LENGTH, AND VERTICAL EFFECTIVE LENGTH OF EACH VIDEO<br>FRAME STRUCTURE (Interlaced/Progressive) OF EACH VIDEO<br>FRAME FREQUENCY OF EACH VIDEO<br>IMAGE FORMAT (Interleaved/Planar) OF EACH VIDEO<br>NUMBER OF BITS (8 BITS/10 BITS/12 BITS/14 BITS/16 BITS) OF EACH VIDEO<br>SAMPLING FORMAT (4:2:2/4:4:4/4:1:1) OF EACH VIDEO<br>COLOR FORMAT AND NUMBER OF COLORS (RGB/YCbCr/CMYK/SIX COLORS/EIGHT COLORS/...) OF EACH VIDEO<br><br>LINE NUMBER OF Ancillary Data OF EACH VIDEO<br>LINE NUMBER OF Timecode OF EACH VIDEO |

FIG. 10

| AUDIO-MULTIPLEXING RELATED INFORMATION |
|---|
| PRESENCE/ABSENCE OF EACH AUDIO (FLAG INDICATING AUDIO HAS BEEN MULTIPLEXED)<br>MULTIPLEXING POSITION (x COORDINATE OF STARTING POINT, y COORDINATE OF STARTING POINT) OF EACH AUDIO<br>HORIZONTAL SIZE AND VERTICAL SIZE OF EACH AUDIO<br>MULTIPLEXING LINE INTERVAL OF EACH AUDIO |
| AUDIO FORMAT INFORMATION |
| CLOCK FREQUENCY OF EACH AUDIO<br>NUMBER OF CHANNELS (Mono/Dual-Mono/Stereo/.../5.1CH/7.1CH/9.1CH) OF EACH AUDIO<br>SAMPLING FREQUENCY (32 kHz/44.1 kHz/48 kHz/96 kHz/192 kHz) OF EACH AUDIO<br>NUMBER OF BITS (16 BITS/20 BITS/24 BITS) OF EACH AUDIO |
| ATTACHMENT DATA OF AUDIO |
| NUMBER OF SAMPLES OF EACH AUDIO<br>(NUMBER OF AUDIO SAMPLES IN MULTIPLEXED VIDEO FRAME) |

FIG. 18

| CONTINUITY INFORMATION |
|---|
| SERIAL NUMBER OF MULTIPLEXED VIDEO FRAME |
| FRAME/FIELD IDENTIFICATION (Frame/Top Field/Bottom Field) OF EACH VIDEO DATA |
| SERIAL FRAME NUMBER OF EACH VIDEO DATA |
| Timecode ATTACHED TO EACH VIDEO DATA |
| SERIAL NUMBER OF AUDIO SAMPLE OF EACH VIDEO DATA |
| NUMBER OF AUDIO SAMPLES IN MULTIPLEXED VIDEO FRAME OF EACH VIDEO DATA |

| RELIABILITY INFORMATION |
|---|
| SYNCHRONIZATION STABILITY FLAG OF MULTIPLEXED VIDEO SIGNAL (PLL Locked FLAG OF MULTIPLEXED VIDEO SIGNAL GENERATING CIRCUIT) |
| SYNCHRONIZATION STABILITY FLAG OF VIDEO SIGNAL (PLL Locked FLAG OF VIDEO RECEIVING CIRCUIT) |
| RELIABILITY FLAG (Validity Bit) OF AUDIO |

| WRITE-COMPLETION FLAG |
|---|
| WRITE-COMPLETION FLAG OF EACH VIDEO AFTER PROCESSING |
| WRITE-COMPLETION FLAG OF EACH AUDIO AFTER PROCESSING |
| WRITE-COMPLETION FLAG OF MULTIPLEXED VIDEO FRAME |

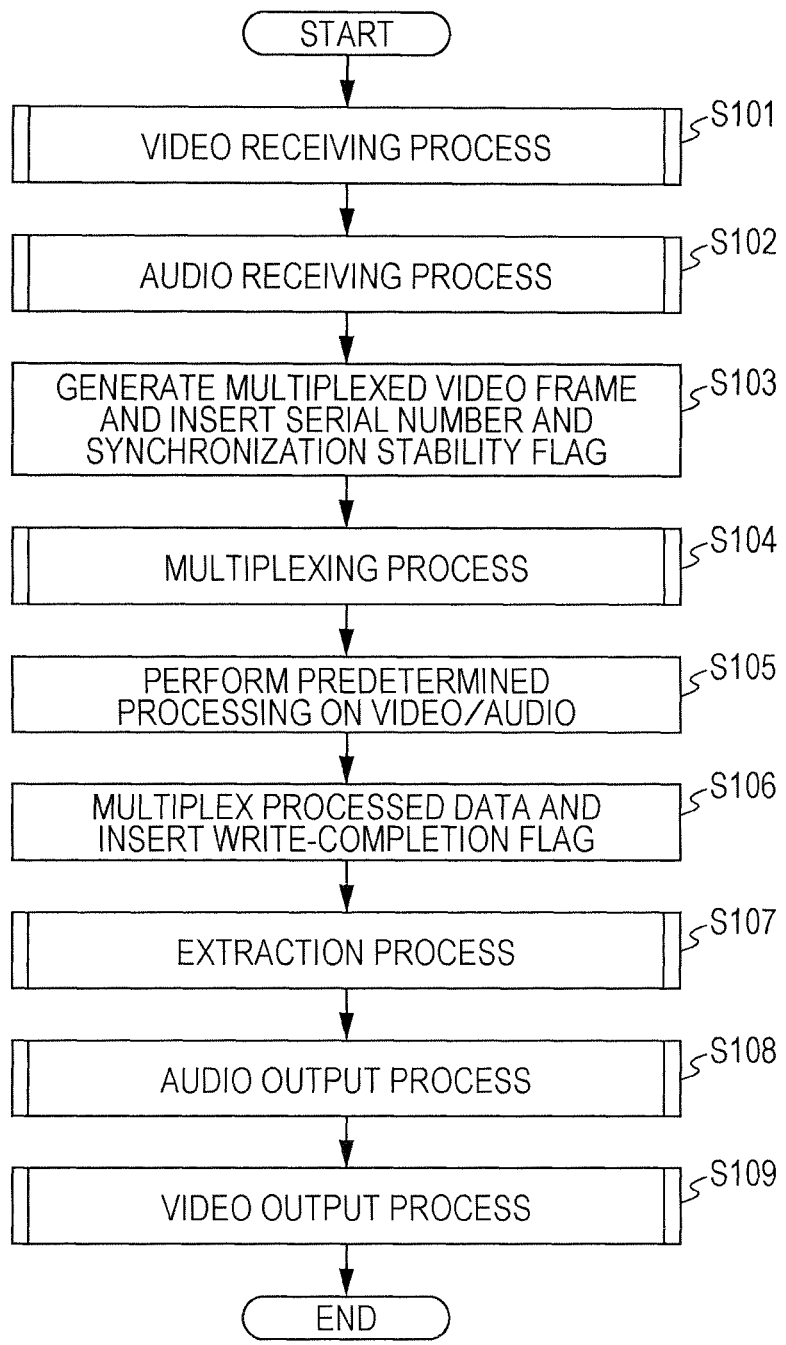

FIG. 26
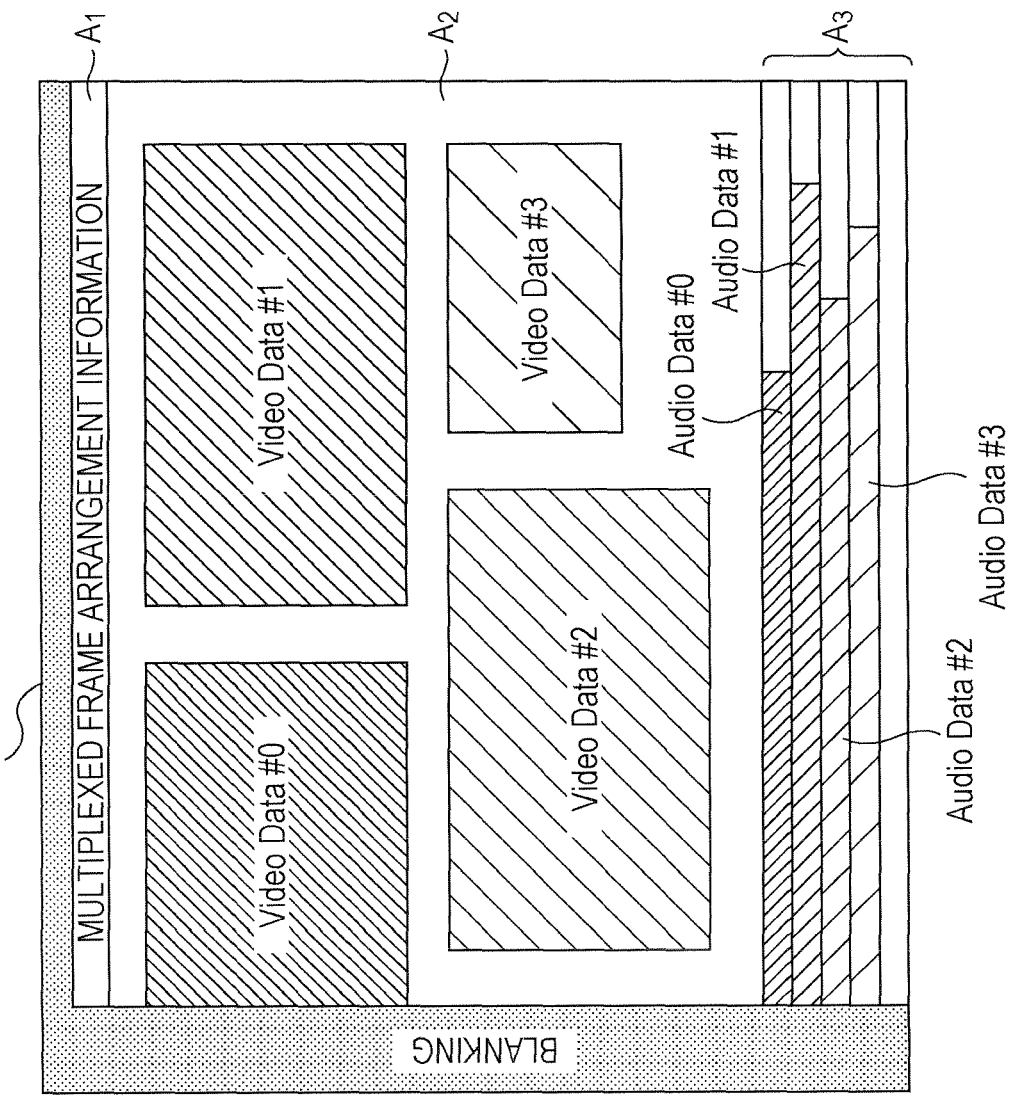
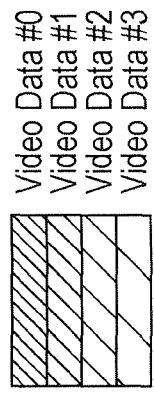
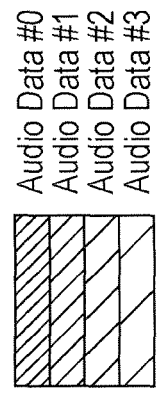

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program. More specifically, the present invention relates to an information processing apparatus, an information processing method, and a program in which when a plurality of streams of data are multiplexed and transmitted as data of a multiplexed video frame, information regarding the arrangement positions of the streams of data in the multiplexed video frame and information regarding the format of the streams of data can be transmitted.

2. Description of the Related Art

Video Interfaces

One-way transmission schemes with which timing signals, such as clocks, horizontal synchronization signals, and vertical synchronization signals, and image data are transmitted are called "video interfaces". Society of Motion Picture and Television Engineers (SMPTE) 125M and SMPTE 274M are typical examples of video interfaces.

Other examples of video interfaces include schemes in which data enable signals are added, such as Digital Video Interactive (DVI)/Video Electronics Standard Association (VESA), schemes in which video data is serialized, such as High-Definition Multimedia Interface (HDMI), and schemes in which timing information is further multiplexed into a data line, such as SMPTE 259M and SMPTE 292M.

Hereinafter, a signal set transmitted via a video interface is referred to as a "video signal", and a set of input pins and output pins of a video interface is referred to as a "video port", as appropriate.

Video Port Bandwidth

Video ports provide wide bandwidth and effective speed with stability. For example, a 24-bit HD (1920×1080 at 30 frames per second (fps)) video port ensures stable data transfer with a rate of 1920×1080×30 pixels per second=186 megabytes per second (MB/s).

The recent rapid increase of video port bandwidth is due to the improvement of display resolution, switching of broadcast quality from standard definition (SD) (720×480) to high definition (HD) (1920×1080), diversity of the display performance of displays (480i/480p/1080i/720p/1080p), and other reasons. In the present situation, the HD (1920×1080 at 30 fps) and wide ultra extended graphics array (WUXGA) (1920×1200 at 60 fps) bandwidths have become generally available.

Multi-Channel Video and Audio

Recent audio visual devices can handle multiple video/audio signals.

For example, home digital recorders can handle data of the output system, which includes:

Output of video without a menu or guide (video output)
Output of video with a menu or guide (monitor output)
Output of video obtained by decoding a bit stream from an antenna (decoder output)

Further, there is a demand for professional devices for use in processing of video, in many cases, capable of handling and also outputting data of the output system, which includes:

Output of standard video (program output, video output)
Output of superimposed video (monitor output)
Video of a scene several seconds ago (preview output)
Screens to be displayed on external displays
Display on device displays In particular, data handled in professional devices for use in processing of video may contain data of various display sizes, various frame frequencies (refresh rates), such as SD/HD, 4:2:2/4:4:4, RGB/YCbCr, interlaced or progressive.

There is also a demand for an input system capable of simultaneously inputting multiple video streams to a processor, such as simultaneously inputting and simultaneously recording asynchronous video signals in different formats, switching the video signals while simultaneously inputting them, or processing or modifying the video signals and combining resulting signals when switching them. The number of channels of audio attached to video has also significantly increased, such as 5.1ch, 7.1ch, 9.1ch, and multiple languages across multiple channels.

Accordingly, it is requested that a processor of an audio visual device be capable of simultaneously inputting or outputting a plurality of video streams and a plurality of audio streams.

For example, Japanese Unexamined Patent Application Publication No. 2009-71701 discloses a technique for multiplexing input video data having a plurality of formats to produce data of a multiplexed video frame that is a video frame having a large screen size and for inputting the data of the multiplexed video frame to a processor from a video port thereof.

Japanese Unexamined Patent Application Publication No. 2009-71701 also describes that video data of each format, which is extracted from a multiplexed video frame, is processed by a processor and that processed video data of each format is re-multiplexed by the processor into a multiplexed video frame. Processed video data of each format is extracted from a multiplexed video frame output from a video port of the processor, and is output to the outside of the apparatus.

Japanese Unexamined Patent Application Publication No. 2006-236056 is another example of related art.

SUMMARY OF THE INVENTION

The technique described in Japanese Unexamined Patent Application Publication No. 2009-71701 may involve matching of information regarding the multiplexing position of video data of each format in a multiplexed video frame in advance between a circuit on the input side and a processor and between the processor and a circuit on the output side. In the processor that has received a multiplexed video frame obtained by multiplexing video data of each format from the circuit on the input side or in the circuit on the output side that has received the multiplexed video frame from the processor, data is extracted on the basis of the information regarding the multiplexing position.

The information regarding the multiplexing positions includes information such as that indicating which channel (stream) of video data and where in the multiplexed video frame that video data is to be attached.

The format of video signals that may influence the data array is also determined in advance between the circuit on the input side and the processor and between the processor and the circuit on the output side.

Accordingly, the multiplexing position of video data of each format in a multiplexed video frame is fixed, and it is not easy to change the multiplexing positions to support the transmission of various signals.

Furthermore, the formats of video data that can be handled are restrictive, and it is therefore difficult for the circuit on the input side to automatically determine the presence or type of video signals on the basis of signals input from the outside to change the configuration of a multiplexed video frame accordingly.

It is therefore desirable to transmit, when multiplexing and transmitting a plurality of streams of data as data of a multiplexed video frame, information regarding the arrangement positions of the streams of data in the multiplexed video frame and information regarding the format of the streams of data.

In addition, the technique described in Japanese Unexamined Patent Application Publication No. 2009-71701 does not allow the processor that has obtained data multiplexed using a multiplexed video frame from the circuit on the input side or the circuit on the output side that has obtained the data from the processor to determine the continuity and reliability of the obtained data.

For example, even if a portion of the video input has failed to be synchronized in a receiving circuit in the circuit on the input side, it is difficult for the processor that has received an input of data to determine which video input has failed to be synchronized.

Furthermore, even if a certain frame is missing and, instead, a different frame has been inserted in a multiplexed video frame in the circuit on the input side, the processor that has received an input of data may determine that the continuity of frames is maintained and may perform processing.

As described above, the processed video data of each format is re-multiplexed in the processor. However, even if the re-multiplexing operation has not completed to the end because of delayed processing of the processor, it is difficult for the circuit on the output side to determine the incomplete multiplexing. Since a multiplexed video frame in which each stream of data is multiplexed is periodically input from the circuit on the input side, the processor performs processing on one multiplexed video frame by the time when the next multiplexed video frame is input.

It is therefore desirable to transmit, when multiplexing and transmitting a plurality of streams of data as data of a multiplexed video frame, information regarding at least the continuity of each stream of data.

According to an embodiment of the present invention, an information processing apparatus includes the following elements. Generating means generates a multiplexed video frame that is a video frame having a predetermined screen size, and inserts first information into the multiplexed video frame, the first information being information regarding a configuration of the multiplexed video frame. First multiplexing means arranges one frame included in input video data in the multiplexed video frame, multiplexes data of the frame so as to be transmitted as data of the multiplexed video frame corresponding to an arrangement position of the frame, and inserts second information and third information into a multiplexed video frame obtained after multiplexing, the second information being information regarding the arrangement position of the frame, the third information being information regarding a format of the video data. Processing means extracts the data of the frame multiplexed in the multiplexed video frame obtained after multiplexing, the multiplexed video frame obtained after multiplexing being input to the processing means from an input video port thereof, in accordance with the first information, the second information, and the third information, and performs processing on the extracted data.

The information processing apparatus may further include the following elements. Dividing means divides input audio data into audio data items, each having samples input during a period of time corresponding to a period of one frame of the multiplexed video frame, in order, starting from a top sample of the audio data. Second multiplexing means arranges each of the audio data items obtained through division by the dividing means in the multiplexed video frame, multiplexes the audio data item so as to be transmitted as data of the multiplexed video frame corresponding to an arrangement position of the audio data item, and inserts fourth information that is information representing the number of samples included in the audio data item, fifth information that is information regarding the arrangement position of the audio data item, and sixth information that is information regarding a format of the audio data into the multiplexed video frame. The processing means may be configured to extract the audio data items obtained through division, which are multiplexed in the multiplexed video frame obtained after multiplexing, in accordance with the first information, the fourth information, the fifth information, and the sixth information, and to perform processing on the extracted data items.

The first multiplexing means may be configured to divide one frame of each of a plurality of formats of the video data into lines, to arrange the frame in the multiplexed video frame so that the lines of the frame are arranged from bottom to top in a first video area provided in the multiplexed video frame, in such a manner that the lines of the same frame are not consecutive, and to multiplex data of the frames of the plurality of formats.

The second multiplexing means may be configured to multiplex the audio data items obtained through division so as to be transmitted as data in a first audio area provided below the first video area of the multiplexed video frame.

The processing means may be configured to divide each of the frames of the formats, which are obtained after processing, into lines, to arrange the frames in the multiplexed video frame so that the lines of the frames are arranged from top to bottom in a second video area provided in the multiplexed video frame, in such a manner that the lines of the same frame are not consecutive, and to multiplex the frames so as to be transmitted as data of the multiplexed video frame corresponding to arrangement positions of the frames. The processing means may also be configured to multiplex the audio data items obtained through division, which are obtained after processing, so as to be transmitted as data in a second audio area provided above the second video area of the multiplexed video frame, and further to output from an output video port thereof a multiplexed video frame in which data obtained after processing is transmitted.

The information processing apparatus may further include the following elements. First extracting means extracts data of each of the frames of the formats from the multiplexed video frame output from the processing means in accordance with the first information, the second information, and the third information. First transmitting means outputs the extracted data of each of the frames of the formats to outside after performing processing corresponding to the format based on the third information.

The information processing apparatus may further include the following elements. Second extracting means extracts the audio data items obtained through division from the multiplexed video frame output from the processing means in accordance with the first information, the fourth information, the fifth information, and the sixth information. Second transmitting means performs processing corresponding to the format based on the sixth information on the extracted audio data items obtained through division, and outputs the audio data items obtained through division, on which the processing has been performed, to outside in order, starting from a top sample of the audio data items.

According to another embodiment of the present invention, an information processing method includes the steps of generating a multiplexed video frame that is a video frame having a predetermined screen size; inserting first information into the multiplexed video frame, the first information being information regarding a configuration of the multiplexed video frame; arranging one frame included in input video data in the multiplexed video frame; multiplexing data of the frame so as to be transmitted as data of the multiplexed video frame corresponding to an arrangement position of the frame; inserting second information and third information into a multiplexed video frame obtained after multiplexing, the second information being information regarding the arrangement position of the frame, the third information being information regarding a format of the video data; extracting the data of the frame multiplexed in the multiplexed video frame obtained after multiplexing, the multiplexed video frame obtained after multiplexing being input from an input video port, in accordance with the first information, the second information, and the third information; and performing processing on the extracted data.

According to another embodiment of the present invention, a program causes a computer to execute a process including the steps of generating a multiplexed video frame that is a video frame having a predetermined screen size; inserting first information into the multiplexed video frame, the first information being information regarding a configuration of the multiplexed video frame; arranging one frame included in input video data in the multiplexed video frame; multiplexing data of the frame so as to be transmitted as data of the multiplexed video frame corresponding to an arrangement position of the frame; inserting second information and third information into a multiplexed video frame obtained after multiplexing, the second information being information regarding the arrangement position of the frame, the third information being information regarding a format of the video data; extracting the data of the frame multiplexed in the multiplexed video frame obtained after multiplexing, the multiplexed video frame obtained after multiplexing being input from an input video port, in accordance with the first information, the second information, and the third information; and performing processing on the extracted data.

In an embodiment of the present invention, a multiplexed video frame that is a video frame having a predetermined screen size is generated, and first information that is information regarding a configuration of the multiplexed video frame is inserted into the multiplexed video frame. Further, one frame included in input video data is arranged in the multiplexed video frame, and data of the frame is multiplexed so as to be transmitted as data of the multiplexed video frame corresponding to an arrangement position of the frame. In addition, second information that is information regarding the arrangement position of the frame and third information that is information regarding a format of the video data are inserted into a multiplexed video frame obtained after multiplexing. Further, the data of the frame multiplexed in the multiplexed video frame obtained after multiplexing, which is input from an input video port, is extracted in accordance with the first information, the second information, and the third information, and processing is performed on the extracted data.

According to an embodiment of the present invention, when a plurality of streams of data are multiplexed and transmitted as data of a multiplexed video frame, information regarding the arrangement position of each stream of data in the multiplexed video frame and information regarding the format of each stream of data can be transmitted.

According to another embodiment of the present invention, when a plurality of streams of data are multiplexed and transmitted as data of a multiplexed video frame, information regarding at least the continuity of each stream of data can be transmitted.

BRIEF DESCRIPTION OF THE DRAWINGS

FIG. 9 is a diagram illustrating an example of multiplexed frame arrangement information;

FIG. 10 is a diagram illustrating the example of the multiplexed frame arrangement information, which follows FIG. 9;

FIG. 18 is a diagram illustrating an example of multiplexed frame state information;

FIG. 19 is a flowchart illustrating a process of the information processing apparatus;

FIG. 26 is a diagram illustrating an example of a multiplexed video frame;

DESCRIPTION OF THE PREFERRED EMBODIMENTS

Overall Configuration of Information Processing Apparatus

Figure 1:
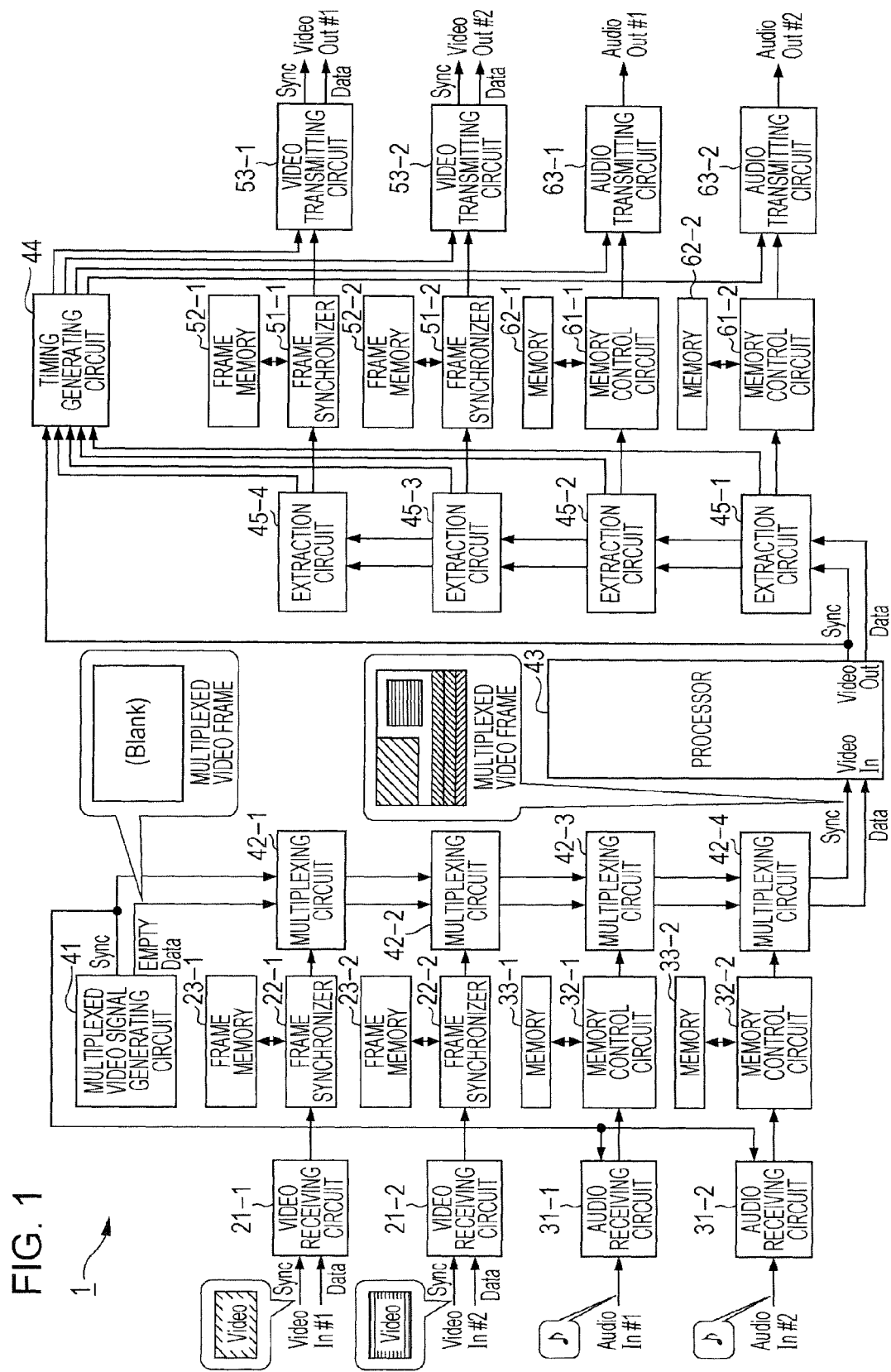
FIG. 1 is a block diagram illustrating an example configuration of an information processing apparatus according to an embodiment of the present invention.

FIG. 1 is a block diagram illustrating an example configuration of an information processing apparatus 1 according to an embodiment of the present invention.

The information processing apparatus 1 may be a device configured to perform processing on two streams of video data and audio data input using a processor 43 having a one-input and one-output video port and to output two streams of video data and audio data.

A video signal of a video stream #1 supplied from the outside is input to a video receiving circuit 21-1 together with a synchronization signal, and a video signal of a video stream #2 is input to a video receiving circuit 21-2 together with a synchronization signal.

The video streams #1 and #2 may have the same format or different formats, such as resolution, frame rate, scanning scheme, transmission scheme, and compression scheme. The input timings of frames of the video streams #1 and #2 may not necessarily be synchronous with each other.

An audio signal of an audio stream #1 supplied from the outside is input to an audio receiving circuit 31-1, and an audio signal of an audio stream #2 is input to an audio receiving circuit 31-2. Audio signals may be input to the audio receiving circuits 31-1 and 31-2 in the form of, for example, three-line audio having a clock signal, a data signal, and a signal representing a sampling frequency.

The audio streams #1 and #2 may also have the same format or different formats, such as sampling frequency, the number of bits, and the number of channels. Also, the input timings of the audio streams #1 and #2 may not be necessarily be synchronous with each other. The audio may be attached to or may be independent from the video.

The video receiving circuit 21-1 includes a cable equalizer, a deserializer, various decoders, a 4:2:2/4:4:4 decoder, an analog/digital (A/D) converter, and any other suitable device. The video receiving circuit 21-1 performs various processing, such as A/D conversion, on the input video signal, and generates data of the frames of the video signal of the video stream #1.

The video receiving circuit 21-1 also obtains ancillary data transmitted as information attached to the frame data of the video stream #1. Ancillary data is data transmitted using the video blanking period. Ancillary data includes non-image data information such as timecode, video index, and closed caption.

The video receiving circuit 21-1 outputs the generated data of the frames, ancillary data, and video format information about the video stream #1 to a frame synchronizer 22-1. Video format information is information regarding the format of a video signal, and is included in multiplexed frame arrangement information described below. Information included in the multiplexed frame arrangement information, such as video format information, will be described below.

The frame synchronizer 22-1 synchronizes the timing of frames between the streams of video, and causes data of one frame supplied from the video receiving circuit 21-1 to be stored in a frame memory 23-1. The frame synchronizer 22-1 also causes the ancillary data and video format information about the video stream #1 supplied from the video receiving circuit 21-1 to be stored in the frame memory 23-1.

In accordance with a request from a multiplexing circuit 42-1, the frame synchronizer 22-1 reads data from the frame memory 23-1, and outputs the data.

In terms of implementation, if clocks having different frequencies are used as the operating clocks of the video receiving circuit 21-1, the frame synchronizer 22-1, and the multiplexing circuit 42-1, a first-in-first-out (FIFO) such as a dual-port random access memory (RAM) is provided between the video receiving circuit 21-1 and the frame synchronizer 22-1 and between the frame synchronizer 22-1 and the multiplexing circuit 42-1. Data passing through the FIFOs can be reliably transmitted and received. In addition, the data rate bias during memory access can also be reduced.

A FIFO is also provided as appropriate between the video receiving circuit 21-2 and a frame synchronizer 22-2 and between the frame synchronizer 22-2 and a multiplexing circuit 42-2. Also in a configuration for processing audio data, a FIFO is provided as appropriate between the audio receiving circuit 31-1 and a memory control circuit 32-1, between the memory control circuit 32-1 and a multiplexing circuit 42-3, between the audio receiving circuit 31-2 and a memory control circuit 32-2, and between the memory control circuit 32-2 and a multiplexing circuit 42-4.

Here, it is not guaranteed that the frame frequency of the input video signal of video stream #1 and the frame frequency of a multiplexed video signal described below match. The frame synchronizer 22-1 absorbs the difference between the frame frequencies by redundantly supplying the video data stored in the frame memory 23-1 (continuously supplying data of the same frame) to the multiplexing circuit 42-1 or by skipping reading of data. Matching between the frame frequency of the video signal of the video stream #1 and the frame frequency of the multiplexed video signal is described in Japanese Unexamined Patent Application Publication No. 2009-71701.

Similarly to the video receiving circuit 21-1, the video receiving circuit 21-2 performs various processing on the input video signal, and generates data of the frames of the video stream #2. The video receiving circuit 21-2 also obtains ancillary data of the video stream #2.

The video receiving circuit 21-2 outputs the generated data of the frames, ancillary data, and video format information about the video stream #2 to the frame synchronizer 22-2.

Similarly to the frame synchronizer 22-1, the frame synchronizer 22-2 synchronizes the timing of frames between the individual streams of video signals, and causes the frame data supplied from the video receiving circuit 21-2 to be stored in the frame memory 23-2. The frame synchronizer 22-2 also causes the ancillary data and video format information about the video stream #2 supplied from the video receiving circuit 21-2 to be stored in the frame memory 23-2.

In accordance with a request from the multiplexing circuit 42-2, the frame synchronizer 22-2 reads data from the frame memory 23-2, and outputs the data. The frame synchronizer 22-2 also redundantly reads frame data stored in the frame memory 23-2 or skips reading, as necessary.

The audio receiving circuit 31-1 performs various processing, such as A/D conversion, sampling rate conversion, and serial/parallel (S/P) conversion, on the input audio signal, and generates audio data of the audio stream #1. The generated audio data is composed of a time sequence of audio samples.

The audio receiving circuit 31-1 divides (cuts out) the audio data of the audio stream #1 into audio data items each having samples input during a period of time corresponding to one frame period of the multiplexed video frame. The audio receiving circuit 31-1 further outputs each of the resulting data items of audio samples to the memory control circuit 32-1, together with number-of-samples information that is information indicating the number of audio samples thereof. A synchronization signal indicating one frame period of the multiplexed video frame is supplied to the audio receiving circuit 31-1 from a multiplexed video signal generating circuit 41. The multiplexed video frame will be described below.

Figure 2:
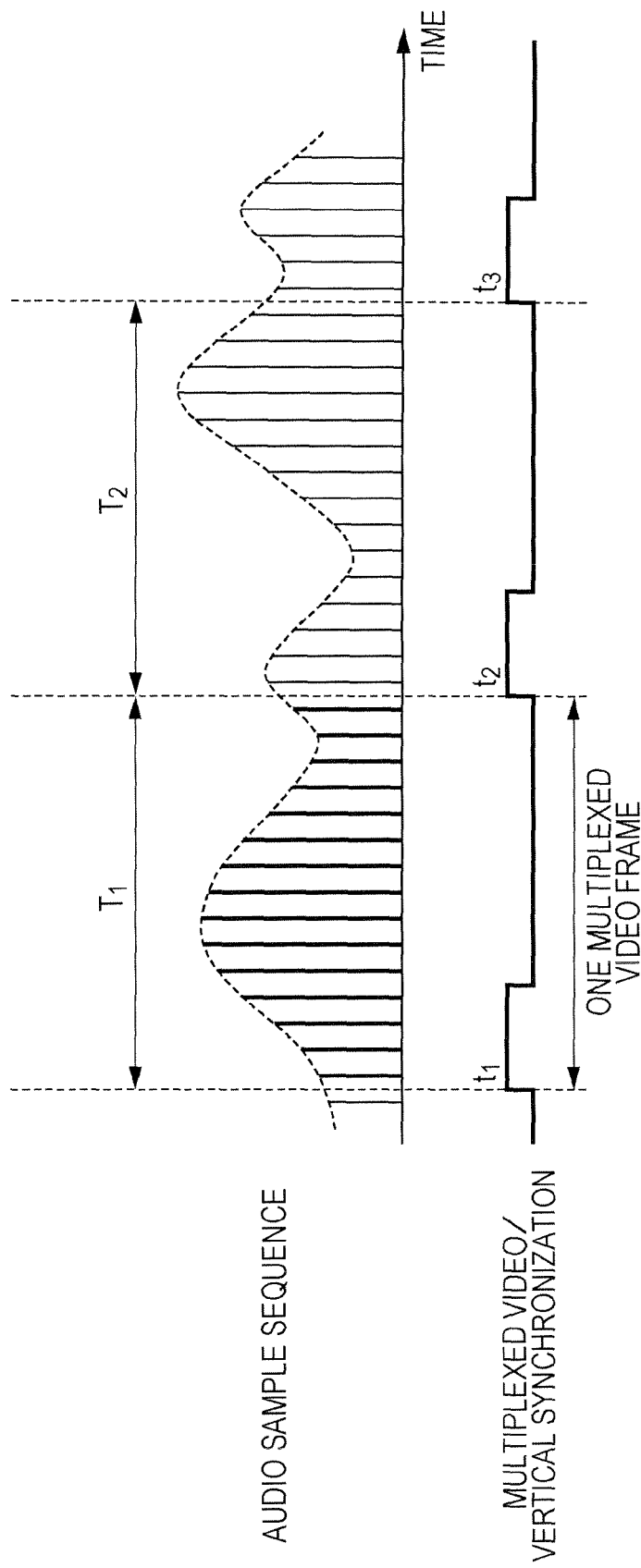
FIG. 2 is a diagram illustrating an example of audio samples that are cut out.

FIG. 2 is a diagram illustrating an example of audio samples that are cut out.

In FIG. 2, the abscissa represents time, and solid lines on the time axis represent audio samples. In the example of FIG. 2, a synchronization signal (vertical synchronization signal) supplied from the multiplexed video signal generating circuit 41 defines that each of a period of time $T_1$, which is the period of time from time $t_1$ to time $t_2$, and a period of time $T_2$, which is the period of time from time $t_2$ to time $t_3$, is one frame period of the multiplexed video frame.

The audio receiving circuit 31-1 counts the number of audio samples input during the period of time $T_1$, and cuts out the audio samples input during the period of time $T_1$ at the timing of time $t_2$. The audio receiving circuit 31-1 outputs the data of the cut out audio samples, as data to be multiplexed into a multiplexed video frame output from the multiplexed video signal generating circuit 41 during the period of time $T_1$, to the memory control circuit 32-1 together with the number-of-samples information.

Similarly, the audio receiving circuit 31-1 cuts out the audio samples input during the period of time $T_2$, and outputs the data of the cut out audio samples, as data to be multiplexed into a multiplexed video frame output from the multiplexed video signal generating circuit 41 during the period of time $T_2$, together with the number-of-samples information.

The processing for the audio data is different from that for the video data in that the frame synchronizer function is not used. In principle, no redundancy or missing of audio data is allowed. Therefore, in the audio receiving circuit 31-1, based on the synchronization signal of the multiplexed video frame, audio samples input during one frame period are cutout as they are as audio data to be multiplexed into one multiplexed video frame.

If the sampling frequency of the audio data is not an integer multiple of the frame frequency of the multiplexed video frame, variation may occur in the number of audio samples input to the audio receiving circuit 31-1 during one frame period. The number-of-samples information is also multiplexed into the multiplexed video frame, thereby enabling the processor 43 or the like, which has received the multiplexed video frame, to determine the number of audio samples that has been multiplexed in the multiplexed video frame.

Referring back to FIG. 1, the audio receiving circuit 31-1 further outputs audio format information about the audio stream #1 to the memory control circuit 32-1. Audio format information is information regarding the format of an audio signal, and is included in multiplexed frame arrangement information.

The memory control circuit 32-1 causes the data of the audio samples, the number-of-samples information, and the audio format information, which are supplied from the audio receiving circuit 31-1, to be stored in the memory 33-1. In accordance with a request from the multiplexing circuit 42-3, the memory control circuit 32-1 reads data from the memory 33-1, and outputs the data.

Similarly to the audio receiving circuit 31-1, the audio receiving circuit 31-2 performs various processing on the input audio signal, and generates the audio data of the audio stream #2. The audio receiving circuit 31-2 divides the audio data of the audio stream #2 into audio data items each having samples input during a period of time corresponding to one frame period of the multiplexed video frame, and outputs each of the resulting audio data items to the memory control circuit 32-2 together with number-of-samples information.

The audio receiving circuit 31-2 also outputs audio format information about the audio stream #2 to the memory control circuit 32-2.

The memory control circuit 32-2 causes the data of the audio sample, the number-of-samples information, and the audio format information, which are supplied from the audio receiving circuit 31-2, to be stored in the memory 33-2. In accordance with a request from the multiplexing circuit 42-4, the memory control circuit 32-2 reads data from the memory 33-2, and outputs the data.

The multiplexed video signal generating circuit 41 may be a frequency multiplier having an oscillator and a phase locked loop (PLL). The multiplexed video signal generating circuit 41 generates a video frame to be input to the processor 43 or output from the processor 43, in which the individual streams of video data and audio data are multiplexed. The video frame generated by the multiplexed video signal generating circuit 41 may be a frame having a maximum size (number of pixels) that is allowed within a range in which, for example, the bandwidth used for transmission does not exceed the bandwidth of the video port of the processor 43.

Hereinafter, a video frame used for multiplexing video data, audio data, and the like is referred to as a "multiplexed video frame". Further, the signal of the multiplexed video frame is referred to as the "multiplexed video signal".

Figure 3:
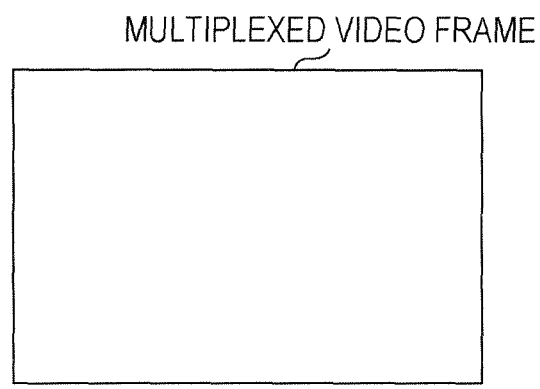
FIG. 3 is a diagram illustrating an example of a multiplexed video frame.

FIG. 3 is a diagram illustrating an example of a multiplexed video frame.

As illustrated in FIG. 3, a multiplexed video frame generated by the multiplexed video signal generating circuit 41 may be an image in which no video data or audio data is multiplexed. The multiplexed video signal generating circuit 41 inserts multiplexed video frame configuration information into the multiplexed video frame. The multiplexed video frame configuration information is information regarding the configuration of the multiplexed video frame, and is included in multiplexed frame arrangement information.

The size of the multiplexed video frame is larger than the sum of the frame size of video of the individual streams and the size of audio data of audio of the individual streams that is input during one frame period of the multiplexed video frame. It is possible to attach the frames of video of the individual streams to the multiplexed video frame so as not to overlap each other. It is also possible to insert data of audio samples of audio of the individual streams that are input during one frame period of the multiplexed video frame.

The multiplexed video signal generating circuit 41 outputs data and a synchronization signal of the multiplexed video frame to the multiplexing circuit 42-1. The synchronization signal of the multiplexed video frame is supplied to each circuit provided after the multiplexing circuit 42-1, together with the data of the multiplexed video frame. The synchronization signal output from the multiplexed video signal generating circuit 41 is also supplied to the audio receiving circuits 31-1 and 31-2.

The multiplexing circuit 42-1 attaches (inserts) a frame of the video stream #1 whose data has been supplied from the frame synchronizer 22-1 in accordance with a request to the multiplexed video frame supplied from the multiplexed video signal generating circuit 41. After attaching the frame of the video stream #1 to the multiplexed video frame, the multiplexing circuit 42-1 inserts video-multiplexing related information into the multiplexed video frame. The video-multiplexing related information is information regarding multiplexing and 配列 of the data of the video frames, and is included in multiplexed frame arrangement information.

The multiplexing circuit 42-1 further inserts the video format information about the video stream #1 and ancillary data, which are supplied from the frame synchronizer 22-1, into the multiplexed video frame.

The multiplexing circuit 42-1 outputs the data of the multiplexed video frame having various data inserted therein to the multiplexing circuit 42-2. The multiplexed video frame output from the multiplexing circuit 42-1 contains, in addition to the multiplexed video frame configuration information inserted by the multiplexed video signal generating circuit 41, the frame data of the video stream #1, the video format information, the ancillary data, and the video-multiplexing related information.

The multiplexing circuit 42-2 attaches (inserts) a frame of the video stream #2 whose data has been supplied from the frame synchronizer 22-2 in accordance with a request to the multiplexed video frame supplied from the multiplexing circuit 42-1. One frame of the video stream #2 is attached at a position that does not overlap the frame of the video stream #1. After attaching the frames of the video stream #2 to the multiplexed video frame, the multiplexing circuit 42-2 inserts video-multiplexing related information into the multiplexed video frame.

The multiplexing circuit 42-2 further inserts the video format information about the video stream #2 and ancillary data, which are supplied from the frame synchronizer 22-2, into the multiplexed video frame.

The multiplexing circuit 42-2 outputs the data of the multiplexed video frame having various data inserted therein to the multiplexing circuit 42-3. The data of the multiplexed video frame output from the multiplexing circuit 42-2 is data in which the data of one frame of the video stream #1 and the data of one frame of the video stream #2 have been multiplexed.

The multiplexing circuit 42-3 inserts the data of the audio samples of the audio stream #1, the number-of-samples information, and the audio format information, which are supplied from the memory control circuit 32-1 in accordance with a request, into the multiplexed video frame supplied from the multiplexing circuit 42-2. After inserting the data of the audio samples of the audio stream #1, the multiplexing circuit 42-3 also inserts audio-multiplexing related information into the multiplexed video frame. The audio-multiplexing related information is information regarding multiplexing and 配列 of the data of the audio samples, and is included in multiplexed frame arrangement information.

The multiplexing circuit 42-3 outputs the data of the multiplexed video frame having the data inserted therein to the multiplexing circuit 42-4.

The multiplexing circuit 42-4 inserts the data of the audio samples of the audio stream #2, the number-of-samples information, and the audio format information, which are supplied from the memory control circuit 32-2 in accordance with a request, into the multiplexed video frame supplied from the multiplexing circuit 42-3. The multiplexing circuit 42-4 outputs the data of the multiplexed video frame in which the data have been inserted to the processor 43. That is, one stream of video data is input to the processor 43.

Figure 4:
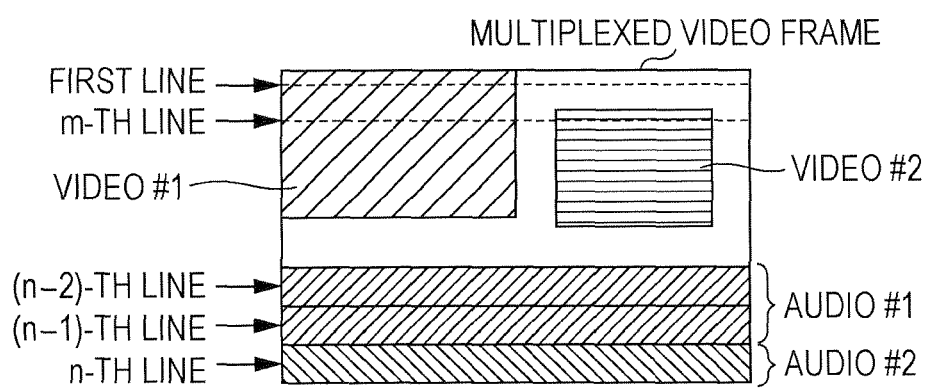
FIG. 4 is a diagram illustrating an example of a multiplexed video frame obtained after multiplexing.

FIG. 4 is a diagram illustrating an example of a multiplexed video frame obtained after multiplexing.

Here, the multiplexing of video data and audio data using a multiplexed video frame will be described. multiplexed frame arrangement information is also multiplexed in a similar manner. In the following description, pixels arranged in a horizontal line are represented by a line, as necessary.

In the example of FIG. 4, the frame of the video stream #1 is attached in such a manner that the upper left corner of the frame coincides with the upper left end of an effective image frame of the multiplexed video frame. The first line of the frame of the video stream #1 matches the first line of the multiplexed video frame.

Further, the frame of the video stream #2 is attached so as not to overlap the frame of the video stream #1 in such a manner that the first line of the frame of the video stream #2 coincides with the m-th line of the multiplexed video frame.

Further, the audio data of the audio stream #1 is inserted into the (n–2)-th line and the next line, namely, the (n–1)-th line, of the multiplexed video frame, and the audio data of the audio stream #2 is inserted into the bottom line, namely, the n-th line, of the multiplexed video frame.

Figure 5:
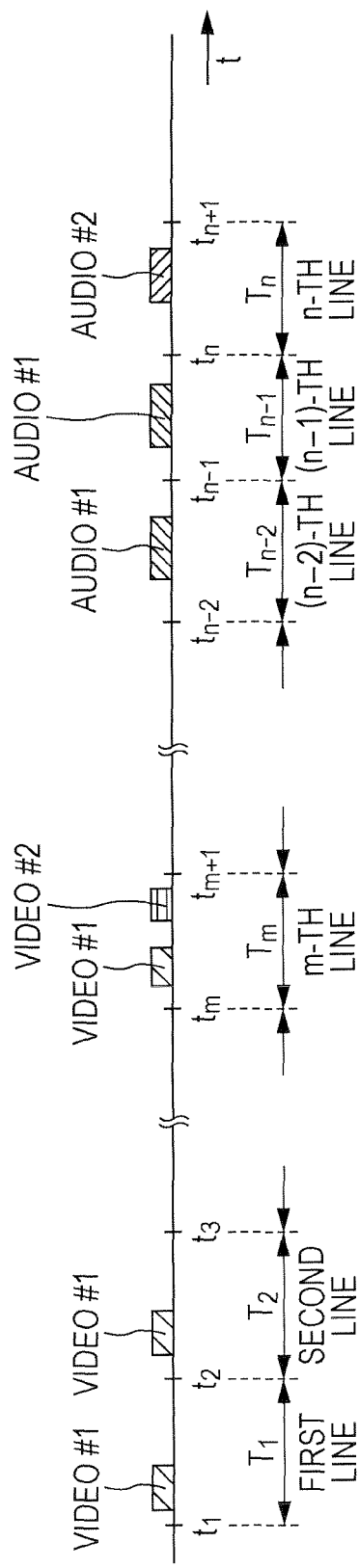
FIG. 5 is a diagram illustrating an example of video signals of the multiplexed video frame.

FIG. 5 is a diagram illustrating an example of video signals of a multiplexed video frame in which individual data items are attached in the manner illustrated in FIG. 4.

As illustrated in FIG. 5, the multiplexed video signal is composed of, when plotted on the time axis, signals for the respective periods for which the data of the lines ranging from the first line to the n-th line of the multiplexed video frame is transmitted.

In the example of FIG. 5, a period $T_1$, which is the period from time $t_1$ to time $t_2$, is a period for which the data of the first line of the multiplexed video frame is transmitted, and a period $T_2$, which is the period from time $t_2$ to time $t_3$, is a period for which the data of the second line of the multiplexed video frame is transmitted.

Further, a period $T_m$, which is the period from time $t_m$ to time $t_{m+1}$, is a period for which the data of the m-th line of the multiplexed video frame is transmitted, and a period $T_{n-2}$, which is the period from time $t_{n-2}$ to time $t_{n-1}$, is a period for which the data of the (n–2)-th line of the multiplexed video frame is transmitted. A period $T_{n-1}$, which is the period from time $t_{n-1}$ to time $t_n$, is a period for which the data of the (n–1)-th line of the multiplexed video frame is transmitted, and a period $T_n$, which is the period from time $t_n$ to time $t_{n+1}$, is a period for which the data of the n-th line of the multiplexed video frame is transmitted.

If the individual data items are attached in the manner illustrated in FIG. 4, the signal of the first line of the frame of the video stream #1 is inserted in the period $T_1$ of the multiplexed video signal. Further, the signal of the second line of the frame of the video stream #1 is inserted in the period $T_2$ of the multiplexed video signal.

Further, the signal of the m-th line of the frame of the video stream #1 and the signal of the first line of the frame of the video stream #2 are inserted in the first half and the second half of the period $T_m$ of the multiplexed video frame, respectively, with a predetermined interval therebetween.

The signal of the audio samples of the audio stream #1, the number of which is represented by the number-of-samples information, is inserted into each of the periods $T_{n-2}$ and $T_{n-1}$ of the multiplexed video frame.

A signal of audio samples of an audio stream #2, the number of which is represented by the number-of-samples information, is inserted into the period $T_n$ of the multiplexed video frame.

In this manner, the multiplexing of data to be input to the processor 43 is implemented by inserting the signals of the data to be input into periods, which correspond to the insertion positions of the data in the multiplexed video frame, among all the periods constituting the multiplexed video signal.

Attaching or inserting data such as frame data and audio data to or into a multiplexed video frame means transmitting the data as data of the multiplexed video frame corresponding to the attachment position of the insertion position. The data of the multiplexed video frame serves as data in which the attached or inserted data has been multiplexed.

Referring back to FIG. 1, the processor 43 extracts each stream of video data and each stream of audio data, which have been multiplexed in the data of the multiplexed video frame input to the video port (Video In), and performs predetermined processing on the extracted data. The processor 43 may be an arithmetic unit such as a central processing unit (CPU), a graphic processing unit (GPU), a digital signal processor (DSP), or a system-on-a-chip (SoC) device.

For example, the extraction of video data is performed in a manner similar to that of the extraction performed by extraction circuits 45-3 and 45-4 described below, and the extraction of audio data is performed in a manner similar to that of the extraction performed by extraction circuits 45-1 and 45-2.

The processor 43 further attaches the frames of video and the samples of audio of the individual streams on which the processing has been performed to the multiplexed video frame, and multiplexes these data items. If the insertion position of the data extracted by the processor 43 from the multiplexed video frame is different from the insertion position of the data obtained after processing, the video-multiplexing related information and audio-multiplexing related information inserted in the multiplexed video frame are updated as appropriate.

The processor 43 outputs the data of the multiplexed video frame in which the data items obtained after processing have been multiplex from the video port (Video Out). Output from the processor 43 is also one stream of video data. The data of the multiplexed video frame output from the processor 43 is supplied to the extraction circuit 45-1 together with the synchronization signal. The synchronization signal output from the processor 43 is also supplied to a timing generating circuit 44.

The timing generating circuit 44 generates an output timing signal, based on which the output timing of the frames of video and audio samples of the individual streams is determined, in accordance with the synchronization signal supplied from the processor 43 or the format of video and audio of the individual streams. Information regarding the format of video and audio in each stream is supplied from the extraction circuits 45-1 to 45-4.

Specifically, the timing generating circuit 44 generates an output timing signal for the video stream #1 in accordance with the synchronization signal supplied from the processor 43 and the video format information about the video stream #1 supplied from the extraction circuit 45-4, and outputs the output timing signal to a video transmitting circuit 53-1.

The timing generating circuit 44 also generates an output timing signal for the video stream #2 in accordance with the synchronization signal supplied from the processor 43 and the video format information about the video stream #2 supplied from the extraction circuit 45-3, and outputs the output timing signal to a video transmitting circuit 53-2.

The timing generating circuit 44 generates an output timing signal for the audio stream #1 in accordance with the synchronization signal supplied from the processor 43 and the audio format information about the audio stream #1 supplied from the extraction circuit 45-2, and outputs the output timing signal to an audio transmitting circuit 63-1.

The timing generating circuit 44 generates an output timing signal for the audio stream #2 in accordance with the synchronization signal supplied from the processor 43 and the audio format information about the audio stream #2 supplied from the extraction circuit 45-1, and outputs the output timing signal to an audio transmitting circuit 63-2.

The extraction circuit 45-1 extracts the data of the audio samples of the audio stream #2 from the data of the multiplexed video frame supplied from the processor 43.

The multiplexing position of the data of the audio samples of the audio stream #2 to be extracted by the extraction circuit 45-1 is represented by the audio-multiplexing related information about the audio stream #2 inserted into the multiplexed video frame. Further, the number of audio samples of the audio stream #2 inserted in the multiplexed video frame is represented by the number-of-samples information about the audio stream #2.

When the multiplexed video frame is supplied, the extraction circuit 45-1 extracts the number-of-samples information about the audio stream #2, and specifies the number of audio samples of the audio stream #2 inserted in the multiplexed video frame. Further, the extraction circuit 45-1 extracts the data inserted in the line represented by the audio-multiplexing related information about the audio stream #2, the amount of which corresponds to the specified number of audio samples, as the data of the audio samples of the audio stream #2.

The extraction circuit 45-1 outputs the extracted data of the audio samples of the audio stream #2 to a memory control circuit 61-2. The extraction circuit 45-1 further extracts the audio format information about the audio stream #2 inserted in the multiplexed video frame, and outputs the audio format information to the timing generating circuit 44 and the memory control circuit 61-2.

The extraction circuit 45-1 outputs the data of the multiplexed video frame supplied from the processor 43 to the extraction circuit 45-2.

The extraction circuit 45-2 extracts the data of the audio samples of the audio stream #1 from the multiplexed video frame supplied from the extraction circuit 45-1 in a manner similar to that of the extraction circuit 45-1.

That is, the extraction circuit 45-2 extracts the number-of-samples information about the audio stream #1, and specifies the number of audio samples of the audio stream #1 inserted in the multiplexed video frame. The extraction circuit 45-2 further extracts the data inserted in the line represented by the audio-multiplexing related information about the audio stream #1, the amount of which corresponds to the specified number of audio samples, as the data of the audio samples of the audio stream #1.

The extraction circuit 45-2 outputs the extracted data of the audio samples of the audio stream #1 to a memory control circuit 61-1. The extraction circuit 45-2 further extracts the audio format information about the audio stream #1 inserted in the multiplexed video frame, and outputs the audio format information to the timing generating circuit 44 and the memory control circuit 61-1.

The extraction circuit 45-2 outputs the data of the multiplexed video frame supplied from the extraction circuit 45-1 to the extraction circuit 45-3.

The extraction circuit 45-3 extracts the frame data of the video stream #2 from the data of the multiplexed video frame supplied from the extraction circuit 45-2.

The insertion position of the frame data of the video stream #2 to be extracted by the extraction circuit 45-3 is represented by the video-multiplexing related information about the video stream #2 inserted in the multiplexed video frame. The extraction circuit 45-3 extracts the data of the position represented by the video-multiplexing related information about the video stream #2, as the data of the frame of the video stream #2, from the multiplexed video frame.

The extraction circuit 45-3 outputs the extracted frame data of the video stream #2 to a frame synchronizer 51-2. The extraction circuit 45-3 further extracts the video format information about the video stream #2 inserted in the multiplexed video frame, and outputs the video format information to the timing generating circuit 44 and the frame synchronizer 51-2.

The extraction circuit 45-3 outputs the data of the multiplexed video frame supplied from the extraction circuit 45-2 to the extraction circuit 45-4.

The extraction circuit 45-4 extracts the frame data of the video stream #1 from the data of the multiplexed video frame supplied from the extraction circuit 45-3.

The insertion position of the frame data of the video stream #1 to be extracted by the extraction circuit 45-4 is represented by the video-multiplexing related information about the video stream #1 inserted in the multiplexed video frame. The extraction circuit 45-4 extracts the data of the position represented by the video-multiplexing related information about the video stream #1, as the data of the frame of the video stream #1, from the multiplexed video frame.

The extraction circuit 45-4 output the extracted frame data of the video stream #1 to a frame synchronizer 51-1. The extraction circuit 45-4 further extracts the video format information about the video stream #1 inserted in the multiplexed video frame, and outputs the video format information to the timing generating circuit 44 and the frame synchronizer 51-1.

The frame synchronizer 51-1 causes the frame data of video stream #1 supplied from the extraction circuit 45-4 and the video format information about the video stream #1 to be stored in the frame memory 52-1. In accordance with a request from the video transmitting circuit 53-1, the frame synchronizer 51-1 reads data from the frame memory 52-1, and outputs the data.

The video transmitting circuit 53-1 includes a cable driver, a serializer, various encoders, a 4:2:2/4:4:4 converter, a digital/analog (D/A) converter, and any other suitable device.

The video transmitting circuit 53-1 outputs the frame data of the video stream #1 supplied from the frame synchronizer 51-1 in response to a request, together with the synchronization signal, to the outside of the information processing apparatus 1 in accordance with the output timing signal supplied from the timing generating circuit 44.

Before outputting the frame data of the video stream #1 to the outside of the information processing apparatus 1, the video transmitting circuit 53-1 performs processing for adjusting the data format of the frame data of the video stream #1 on the basis of the video format information about the video stream #1, as appropriate.

In terms of implementation, if clocks having different frequencies are used as the operating clocks of the extraction circuit 45-4, the frame synchronizer 51-1, and the video transmitting circuit 53-1, a FIFO such as a dual-port RAM is provided between the extraction circuit 45-4 and the frame synchronizer 51-1 and between the frame synchronizer 51-1 and the video transmitting circuit 53-1. Data passing through the FIFOs can be reliably transmitted and received. In addition, the data rate bias during memory access can also be reduced.

A FIFO is also provided as appropriate between the extraction circuit 45-3 and the frame synchronizer 51-2 and between the frame synchronizer 51-2 and the video transmitting circuit 53-2. Also in a configuration for processing audio data, a FIFO is provided as appropriate between the extraction circuit 45-2 and the memory control circuit 61-1, between the memory control circuit 61-1 and the audio transmitting circuit 63-1, between the extraction circuit 45-1 and the memory control circuit 61-2, and between the memory control circuit 61-2 and the audio transmitting circuit 63-2.

Here, it is not guaranteed that the frame frequency of the output video signal of the video stream #1 and the frame frequency of the multiplexed video signal match. The frame synchronizer 51-1 absorbs the difference between the frame frequencies by redundantly supplying the video data stored in the frame memory 52-1 (continuously supplying video data of the same frame) to the video transmitting circuit 53-1 or by skipping reading of data.

The frame synchronizer 51-2 causes the frame data of the video stream #2 supplied from the extraction circuit 45-3 and the video format information about the video stream #2 to be stored in the frame memory 52-2. In accordance with a request from the video transmitting circuit 53-2, the frame synchronizer 51-2 reads data from the frame memory 52-2, and outputs the data.

Similarly to the video transmitting circuit 53-1, the video transmitting circuit 53-2 outputs the frame data of the video stream #2 supplied from the frame synchronizer 51-2 in response to a request, together with the synchronization signal, to the outside in accordance with the output timing signal supplied from the timing generating circuit 44.

Before outputting the frame data of the video stream #2 to the outside of the information processing apparatus 1, the video transmitting circuit 53-2 performs processing for adjusting the data format of the frame data of the video stream #2 on the basis of the video format information about the video stream #2, as appropriate.

The memory control circuit 61-1 causes the data of the audio stream #1 supplied from the extraction circuit 45-2 to be temporarily stored in a memory 62-1. The memory 62-1 stores the audio data of the audio stream #1 in units of audio samples input during one frame period of the multiplexed video frame. The memory 62-1 also stores the audio format information about the audio stream #1.

In accordance with a request from the audio transmitting circuit 63-1, the memory control circuit 61-1 reads data from the memory 62-1, and outputs the data.

The audio transmitting circuit 63-1 outputs the data of the audio samples of the audio stream #1 supplied from the memory control circuit 61-1, in units of the data of one sample, to the outside of the information processing apparatus 1 in accordance with the output timing signal supplied from the timing generating circuit 44.

Before outputting the data of the audio samples of the audio stream #1 to the outside of the information processing apparatus 1, the audio transmitting circuit 63-1 performs processing for adjusting the data format of the audio samples of the audio stream #1 on the basis of the audio format information about the audio stream #1, as appropriate.

The memory control circuit 61-2 causes the data of the audio samples of the audio stream #2 supplied from the extraction circuit 45-1 to be temporarily stored in the memory

62-2. The memory 62-2 stores the audio data of the audio stream #2 in units of audio samples input during one frame period of the multiplexed video frame. The memory 62-2 also stores the audio format information about the audio stream #2.

In accordance with a request from the audio transmitting circuit 63-2, the memory control circuit 61-2 reads data from the memory 62-2, and outputs the data.

The audio transmitting circuit 63-2 outputs the data of the audio samples of the audio stream #2 supplied from the memory control circuit 61-2, in units of the data of one sample, to the outside of the information processing apparatus 1 in accordance with the output timing signal supplied from the timing generating circuit 44.

Before outputting the data of the audio samples of the audio stream #2 to the outside of the information processing apparatus 1, the audio transmitting circuit 63-2 performs processing for adjusting the data format of the audio samples of the audio stream #2 on the basis of the audio format information about the audio stream #2, as appropriate.

In FIG. 1, two streams of video data and two streams of audio data are input to the information processing apparatus 1, and are processed. However, the number of streams of data to be input can be changed as desired.

For example, the information processing apparatus 1 may be provided with, for each stream of video data, as the configuration on the input side, a configuration similar to that of the video receiving circuit 21-1, the frame synchronizer 22-1, the frame memory 23-1, and the multiplexing circuit 42-1. The information processing apparatus 1 may also be provided with, as the configuration on the output side, a configuration similar to that of the extraction circuit 45-4, the frame synchronizer 51-1, the frame memory 52-1, and the video transmitting circuit 53-1.

The information processing apparatus 1 is provided with, for each stream of audio data, as the configuration on the input side, a configuration similar to that of the audio receiving circuit 31-1, the memory control circuit 32-1, the memory 33-1, and the multiplexing circuit 42-3. The information processing apparatus 1 may also be provided with, as the configuration on the output side, a configuration similar to that of the extraction circuit 45-2, the memory control circuit 61-1, the memory 62-1, and the audio transmitting circuit 63-1.

In the following description, as appropriate, circuits having the same names are represented by numbers before hyphen unless otherwise specified individually.

Video Interface

Figure 6:
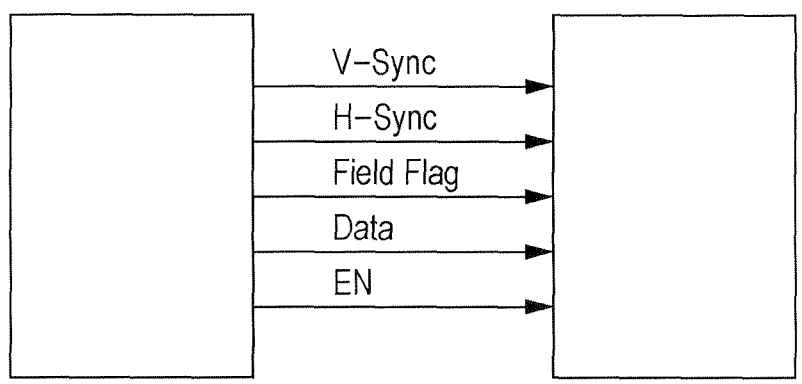
FIG. 6 is a schematic diagram illustrating a video interface.

FIG. 6 is a schematic diagram illustrating a video interface.

In the video interface, a horizontal synchronization signal (H-Sync), a vertical synchronization signal (V-Sync), a field flag signal (Field Flag), a data signal (Data) including images and sound, an enable signal (EN) indicating a clock, and the like are transmitted from the transmitter side to the receiver side. The field flag signal indicates a first field or a second field.

Figure 7:
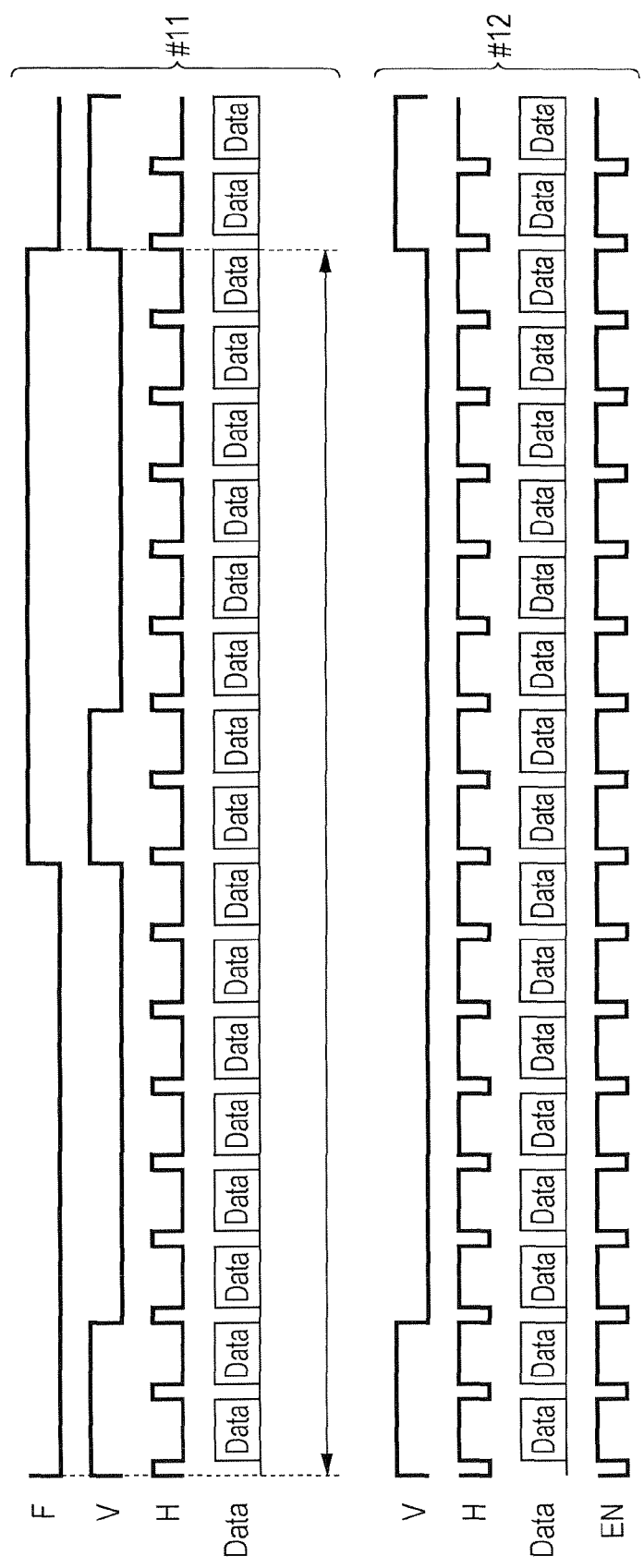
FIG. 7 is a diagram illustrating an example of waveforms of video signals.

An example of the waveforms of the video signals transmitted using the video interface illustrated in FIG. 6 is illustrated in FIG. 7. In a signal group #11 in the upper portion of FIG. 7, an example of the waveforms of interlaced video signals is illustrated, and in a signal group #12 in the lower portion of FIG. 7, an example of the waveforms of progressive video signals is illustrated.

Figure 8:
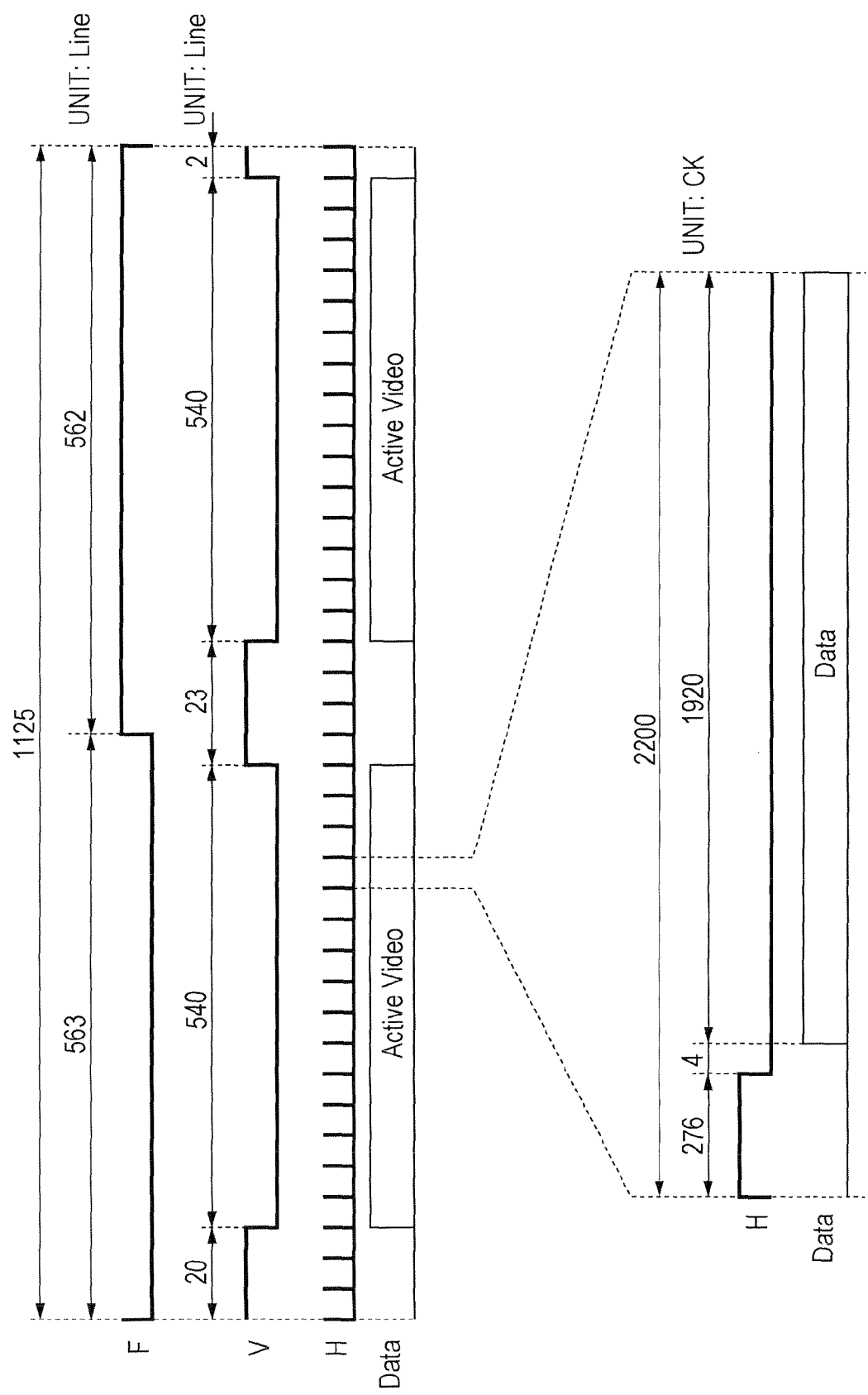
FIG. 8 is a diagram illustrating in detail the waveforms within a range indicated by a solid line arrow in FIG. 7.

The details of the waveforms within a range indicated by a solid line arrow among the waveforms illustrated in the signal group #11 in FIG. 7 are illustrated in FIG. 8. FIG. 8 illustrates an example of the waveforms of video signals of high-definition (HD) images.

As illustrated in FIG. 8, data (Data) for one field (540 lines) is transmitted during one period of a vertical synchronization signal (V) (Active Video). Also, data (Data) for one line (1920 pixels) is transmitted during one period of a horizontal synchronization signal (H).

Multiplexed Frame Arrangement Information

The multiplexed frame arrangement information includes the multiplexed video frame configuration information, the video-multiplexing related information, the video format information, audio-multiplexing related information, the audio format information, and the number-of-samples information serving as attachment data of audio, as described above.

The above pieces of information will be described with reference to FIGS. 9 and 10.

As illustrated in FIG. 9, the multiplexed video frame configuration information includes information representing the horizontal length, horizontal blanking length, horizontal effective length, vertical length, vertical blanking length, and vertical effective length of the multiplexed video frame.

The multiplexed video frame configuration information further includes information representing the frame structure (interlaced or progressive), frame frequency, bit width (8-bit/10-bit/12-bit/16-bit) of the multiplexed video frame.

The video-multiplexing related information includes information representing the presence/absence of video (frame data), multiplexing position, horizontal size, vertical size, and multiplexing line interval. The presence/absence of video is represented by a flag indicating whether or not video data has been multiplexed, and the multiplexing position is represented by the x coordinate and y coordinate of the position serving as the starting point, such as the upper left corner of the attached frame, with respect to a predetermined position of the multiplexed video frame as the origin.

The video-multiplexing related information further includes information representing the presence/absence of ancillary data, multiplexing position, horizontal size, vertical size, and multiplexing line interval. The presence/absence of ancillary data is represented by a flag indicating whether or not ancillary data has been multiplexed, and the multiplexing position is represented by the x coordinate and y coordinate of the position serving as the starting point, such as the position of the data at the beginning of the ancillary data, with respect to a predetermined position of the multiplexed video frame as the origin.

The video-multiplexing related information including the above pieces of information is provided for each piece of video data of each stream.

The video format information includes information representing a clock frequency, the polarity (H, V) of blanking pulse, horizontal length, horizontal blanking length, horizontal effective length, vertical length, vertical blanking length, and vertical effective length.

The video format information further includes information representing the frame structure (interlaced/progressive), frame frequency, image format (interleaved/planar), and number of bits (8 bits/10 bits/12 bits/14 bits/16 bits). The video format information further includes information representing the sampling format (4:2:2/4:4:4/4:1:1), number of colors and color format (RGB/YCbCr/CMYK/six colors/eight colors/ . . . ), the line number of ancillary data, and the line number of timecode.

The video format information is provided for each piece of video data of each stream.

As illustrated in FIG. 10, the audio-multiplexing related information includes information representing the presence/absence of data of audio samples, multiplexing position, horizontal size, vertical size, and multiplexing line interval. The presence/absence of data of audio samples is represented by a flag indicating whether or not the data of the audio samples has been multiplexed, and the multiplexing position is represented by the x coordinate and y coordinate of the position serving as the starting point in a region where the data of the audio sample has been inserted, with respect to a predetermined position of the multiplexed video frame as the origin.

The audio-multiplexing related information is provided for each piece of audio data of each stream.

The audio format information includes information representing a clock frequency, the number of channels (Mono/Dual-Mono/Stereo/ . . . /5.1ch/7.1ch/9.1ch), sampling frequency (32 kHz/44.1 kHz/48 kHz/96 kHz/192 kHz), and number of bits (16 bits/20 bits/24 bits).

The audio format information is provided for each piece of audio data of each stream.

The number-of-samples information serving as attachment data of audio is also provided for each piece of audio data of each stream.

The information representing the insertion position of each piece of information included in the multiplexed frame arrangement information is set in advance so as to represent a common position between an input circuit and the processor 43 and between the processor 43 and an output circuit.

The input circuit refers to an entire circuit configured to input data to the processor 43, and the output circuit refers to an entire circuit configured to output data output from the processor 43 to the outside of the information processing apparatus 1.

The input circuit includes the video receiving circuits 21, the frame synchronizers 22, the frame memories 23, the audio receiving circuits 31, the memory control circuits 32, the memories 33, the multiplexed video signal generating circuit 41, and the multiplexing circuits 42 in FIG. 1. The output circuit includes the timing generating circuit 44, the extraction circuits 45, the frame synchronizers 51, the frame memories 52, the video transmitting circuits 53, the memory control circuits 61, the memories 62, and the audio transmitting circuits 63 in FIG. 1.

Operation of Input Circuit

The process of an input circuit regarding each piece of information included in the multiplexed frame arrangement information will now be described.

The multiplexed video frame configuration information is inserted into the multiplexed video frame by the multiplexed video signal generating circuit 41. The processor 43 is capable of identifying a data area (effective image frame) of the multiplexed video frame on the basis of the multiplexed video frame configuration information.

The video-multiplexing related information is generated by a multiplexing circuit 42 that processes video data (in the example of FIG. 1, the multiplexing circuits 42-1 and 42-2), and is inserted into the multiplexed video frame. The video-multiplexing related information may be set in advance in a multiplexing circuit 42 that processes video data, or may be automatically generated in accordance with video data to be multiplexed.

If the video-multiplexing related information is set in advance, the information is stored in, for example, a register in a multiplexing circuit 42 that processes video data. The multiplexing circuit 42 inserts the video-multiplexing related information stored in the register into the multiplexed video frame.

If the video-multiplexing related information is automatically generated in accordance with video data to be multiplexed, a function (circuit) for automatically determining the insertion position of the video data to be multiplexed on the basis of the format of the video data is provided in a multiplexing circuit 42 that processes the video data. The multiplexing circuit 42 inserts information representing the insertion position determined by using the function into the multiplexed video frame as video-multiplexing related information.

The processor 43 is capable of extracting the data of a desired stream of video frame from the multiplexed video frame on the basis of the video-multiplexing related information.

The video format information is output from a video receiving circuit 21, and is inserted into the multiplexed video frame by a multiplexing circuit 42 that processes video data. The video format information may be set in advance in a video receiving circuit 21 or may be generated by a video receiving circuit 21 in accordance with a format detected based on a video signal. The video format information can also be generated by a frame synchronizer 22 instead of a video receiving circuit 21.

The processor 43 is capable of determining the configuration of the data of a video frame extracted from the multiplexed video frame on the basis of the video format information.

The audio-multiplexing related information is generated by a multiplexing circuit 42 that processes audio data (in the example of FIG. 1, the multiplexing circuits 42-3 and 42-4), and is inserted into the multiplexed video frame. The audio-multiplexing related information may be set in advance in a multiplexing circuit 42 that processes audio data, or may be automatically generated in accordance with audio data to be multiplexed.

If the audio-multiplexing related information is set in advance, the information is stored in, for example, a register in a multiplexing circuit 42 that processes audio data. The multiplexing circuit 42 inserts the audio-multiplexing related information stored in the register into the multiplexed video frame.

If the audio-multiplexing related information is automatically generated in accordance with audio data to be multiplexed, a function (circuit) for automatically determining the insertion position of the audio data to be multiplexed on the basis of the format of the audio data is provided in a multiplexing circuit 42 that processes the audio data. The multiplexing circuit 42 inserts information representing the insertion position determined by using the function into the multiplexed video frame as audio-multiplexing related information.

The processor 43 is capable of extracting the data of audio samples in a desired stream from the multiplexed video frame on the basis of the audio-multiplexing related information.

The audio format information is output from an audio receiving circuit 31, and is inserted into the multiplexed video frame by a multiplexing circuit 42 that processes audio data. The audio format information may be set in advance in an audio receiving circuit 31 or may be generated by an audio receiving circuit 31 in accordance with a format detected based on an audio signal. The audio format information can also be generated by a memory control circuit 32 instead of an audio receiving circuit 31.

The processor 43 is capable of determining the configuration of the data of audio samples extracted from the multiplexed video frame on the basis of the audio format information.

The number-of-samples information is generated by an audio receiving circuit 31, and is inserted into the multiplexed video frame by a multiplexing circuit 42 that processes audio data. The number-of-samples information can also be generated by a memory control circuit 32 instead of an audio receiving circuit 31.

The processor 43 is capable of determining an effective area (an area where the data of audio samples are actually inserted) within an insertion position of audio data, which is specified by the audio-multiplexing related information on the basis of the number-of-samples information.

Operation of Output Circuit

The process of an output circuit regarding each piece of information included in the multiplexed frame arrangement information will now be described.

The video-multiplexing related information inserted in the multiplexed video frame output from the processor 43 is read by an extraction circuit 45 that processes video data (in the example of FIG. 1, the extraction circuits 45-3 and 45-4), and is used for the extraction of frame data.

The video format information is also read by an extraction circuit 45 that processes video data, and is supplied to the timing generating circuit 44 and a video transmitting circuit 53.

The timing generating circuit 44 generates an output timing signal (H-Sync and V-Sync of video) for the video transmitting circuit 53 on the basis of the video format information. The video transmitting circuit 53 performs a process for adjusting a signal output format on the basis of the video format information. For example, D/A conversion is performed by the D/A converter of the video transmitting circuit 53 or the conversion of the format is performed.

The audio-multiplexing related information inserted in the multiplexed video frame output from the processor 43 is read by an extraction circuit 45 that processes audio data (in the example of FIG. 1, the extraction circuits 45-1 and 45-2), and is used for the extraction of audio samples.

The audio format information is read by an extraction circuit 45 that processes audio data, and is supplied to the timing generating circuit 44 and an audio transmitting circuit 63.

The timing generating circuit 44 generates an output timing signal (fs of video and audio) for the audio transmitting circuit 63 on the basis of the audio format information. The audio transmitting circuit 63 performs a process for adjusting a signal output format on the basis of the audio format information. For example, the conversion of the sampling rate is performed by a sampling rate converter included in the audio transmitting circuit 63, D/A conversion is performed by the D/A converter thereof, and the conversion of the format is performed.

Operation of Information Processing Apparatus

Here, a process of the information processing apparatus 1 illustrated in FIG. 1 will be described with reference to a flowchart of FIG. 11.

In step S1, the video receiving circuits 21-1 and 21-2 perform a video receiving process.

In step S2, the audio receiving circuits 31-1 and 31-2 perform an audio receiving process.

In step S3, the multiplexed video signal generating circuit 41 generates a multiplexed video frame.

In step S4, the multiplexed video signal generating circuit 41 inserts multiplexed video frame configuration information into the multiplexed video frame, and outputs the data of the multiplexed video frame and a synchronization signal.

In step S5, the extraction circuits 45-1 to 45-4 perform a multiplexing process.

In step S6, the processor 43 extracts video data and audio data multiplexed in the data of the multiplexed video frame input to the video port, and performs predetermined processing. The processor 43 outputs the data of a multiplexed video frame in which the data obtained after processing has been multiplex from the video port.

In step S7, the extraction circuits 45-1 to 45-4 perform an extraction process.

In step S8, the timing generating circuit 44 generates an output timing signal for each stream of data on the basis of the format of video and audio of the corresponding stream, and outputs the output timing signals.

In step S9, the audio transmitting circuits 63-1 and 63-2 perform an audio output process.

In step S10, the video transmitting circuits 53-1 and 53-2 perform a video output process. After the video output process has been completed, the process ends.

Next, the video receiving process performed in step S1 of FIG. 11 will be described with reference to a flowchart of FIG. 12.

In step S11, the video receiving circuit 21-1 receives an input video signal, and performs various processing such as A/D conversion to generate data of frames of the video stream #1 and ancillary data. The video receiving circuit 21-2 also performs similar processing to generate data of frames of the video stream #2 and ancillary data.

In step S12, the video receiving circuit 21-1 detects a format, and generates video format information about the video stream #1. In this example, video format information is generated by detecting a format.

In step S13, the frame synchronizer 22-1 causes the frame data of the video stream #1, the ancillary data, and the video format information to be stored in the frame memory 23-1. The frame synchronizer 22-2 also causes the frame data of the video stream #2, the ancillary data, and the video format information to be stored in the frame memory 23-2.

Figure 11:
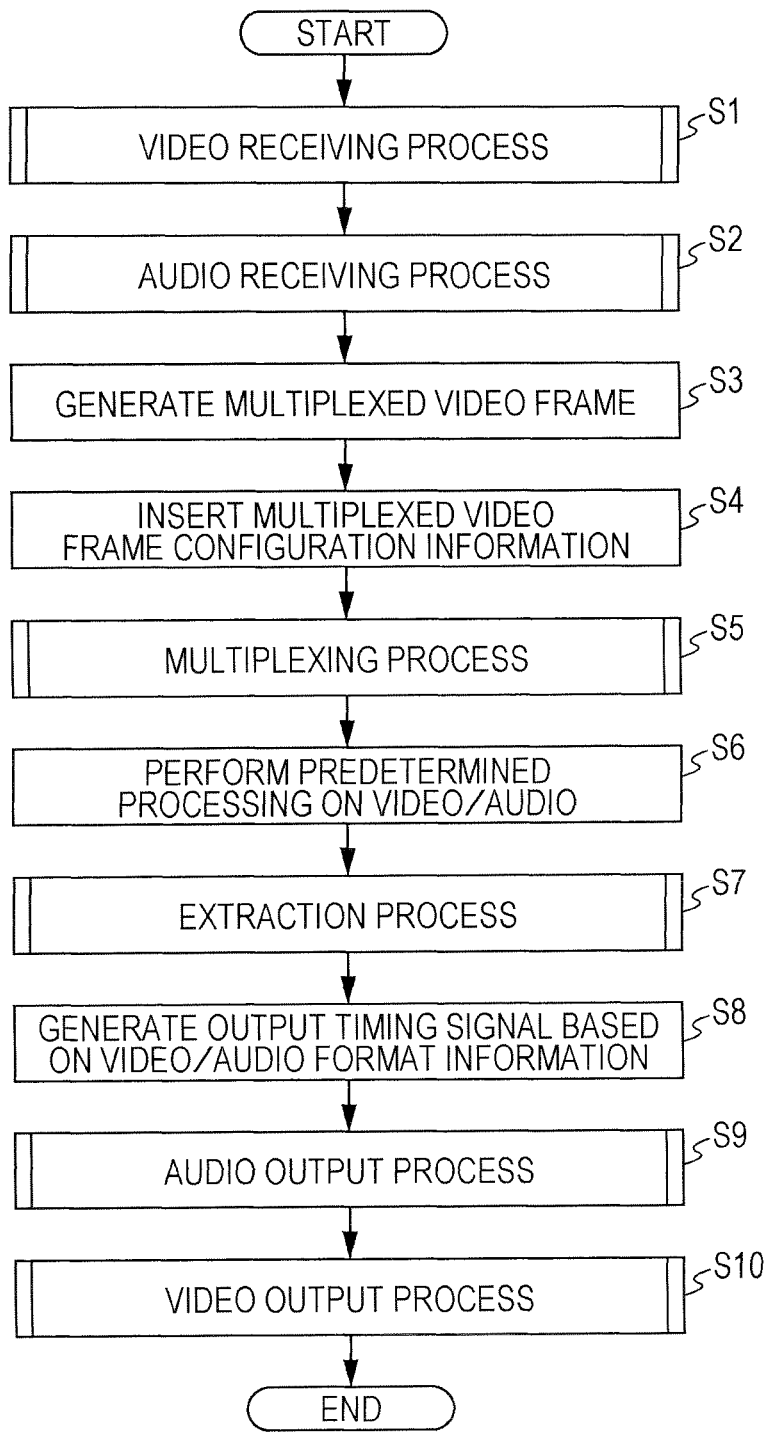
FIG. 11 is a flowchart illustrating a process of the information processing apparatus.
Figure 12:
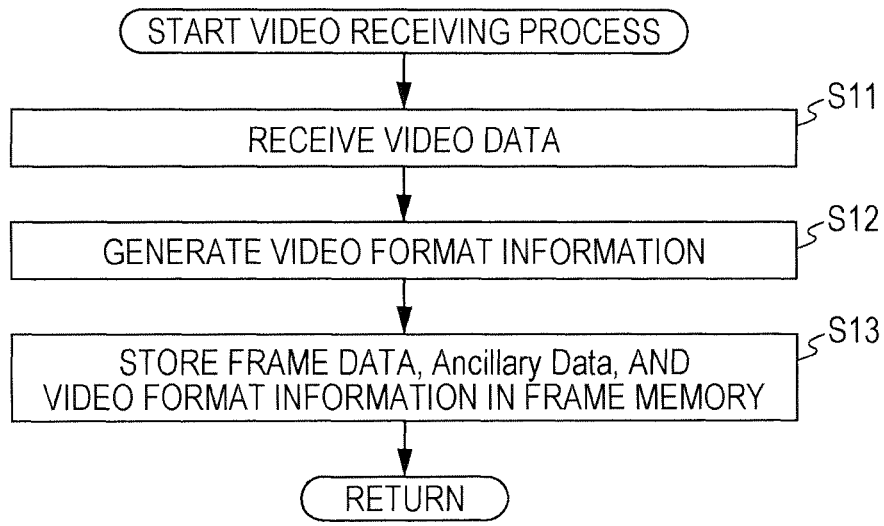
FIG. 12 is a flowchart illustrating a video receiving process performed in step S1 of FIG. 11.

After the data of the video stream #1 and the data of the video stream #2 are stored in the frame memories 23, the process returns to step S1 of FIG. 11, and the subsequent processing is performed.

Figure 13:
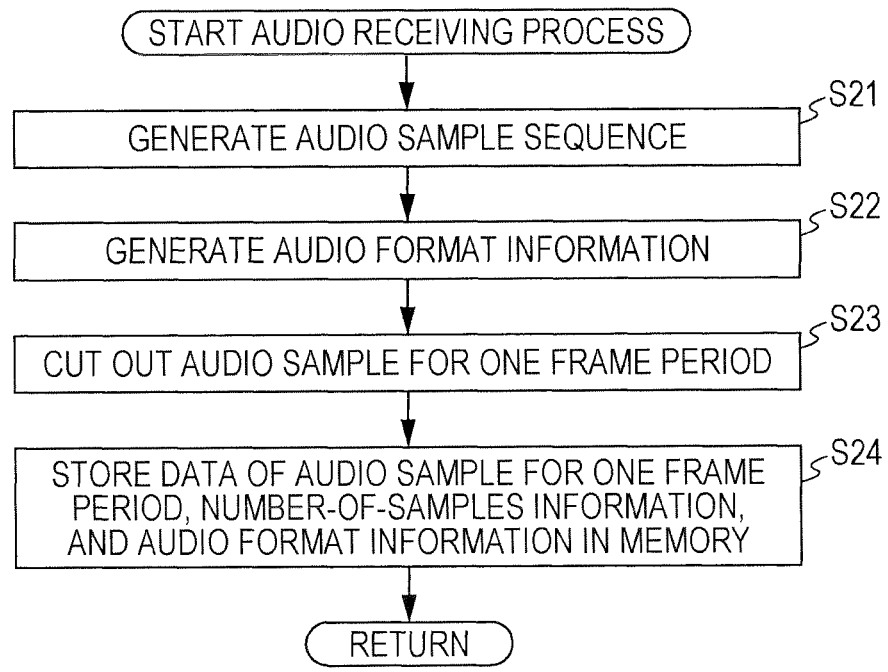
FIG. 13 is a flowchart illustrating an audio receiving process performed in step S2 of FIG. 11.

Next, the audio receiving process performed in step S2 of FIG. 11 will be described with reference to a flowchart of FIG. 13.

In step S21, the audio receiving circuit 31-1 receives an input audio signal, and performs processing such as A/D conversion to generate audio data of the audio stream #1 composed of a time sequence of audio samples. The audio receiving circuit 31-2 also performs similar processing to generate audio data of the audio stream #2.

In step S22, the audio receiving circuit 31-1 detects a format, and generates audio format information about the audio stream #1. In this example, audio format information is generated by detecting a format.

In step S23, the audio receiving circuit 31-1 cuts out, while counting the number of samples, audio samples of the audio stream #1 that are input within one frame period of the multiplexed video frame. The audio receiving circuit 31-2 also performs similar processing, and cuts out audio samples of the audio stream #2 that are input within one frame period of the multiplexed video frame.

In step S24, the memory control circuit 32-1 causes the data of the cut out audio samples of the audio stream #1, the number-of-samples information, and the audio format information to be stored in the memory 33-1. The memory control circuit 32-2 also causes the data of the cut out audio samples of the audio stream #2, the number-of-samples information, and the audio format information to be stored in the memory 33-2.

After the data of the audio stream #1 and the data of the audio stream #2 are stored in the memories 33, the process returns to step S2 of FIG. 11, and the subsequent processing is performed.

Figure 14:
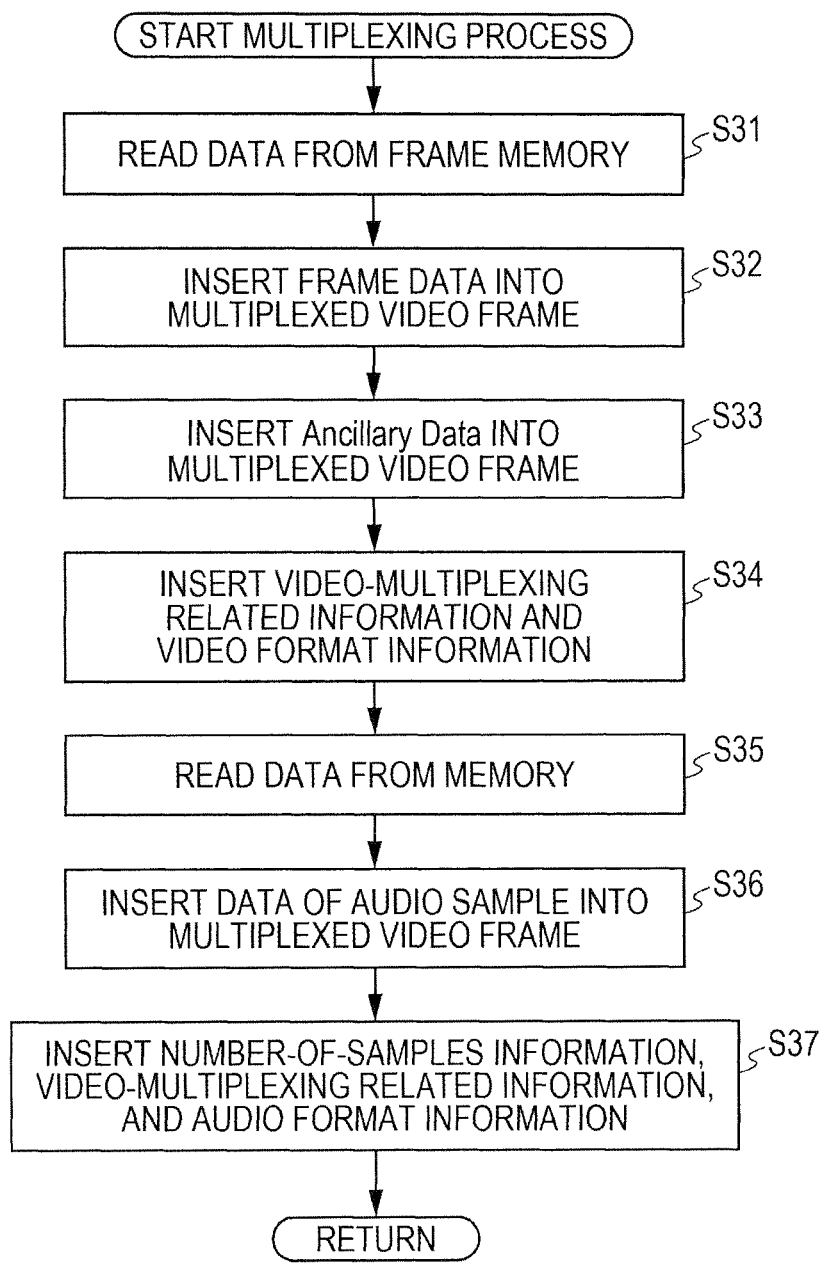
FIG. 14 is a flowchart illustrating a multiplexing process performed in step S5 of FIG. 11.

Next, the multiplexing process performed in step S5 of FIG. 11 will be described with reference to a flowchart of FIG. 14. The data of the multiplexed video frame generated in step S3 of FIG. 11 is supplied to the multiplexing circuit 42-1.

In step S31, the multiplexing circuit 42-1 requests the frame synchronizer 22-1 to read the data of the video stream #1 from the frame memory 23-1. The frame data of the video stream #1, the ancillary data, and the video format information are read from the frame memory 23-1.

In step S32, the multiplexing circuit 42-1 inserts the frame data of the video stream #1 read from the frame memory 23-1 into the multiplexed video frame.

In step S33, the multiplexing circuit 42-1 inserts the ancillary data of the video stream #1 read from the frame memory 23-1 into the multiplexed video frame.

In step S34, the multiplexing circuit 42-1 inserts video-multiplexing related information representing the insertion position of the frame data of the video stream #1 and the video format information read from the frame memory 23-1 into the multiplexed video frame.

Processing similar to that of steps S31 to S34 is also performed by the multiplexing circuit 42-2, and the frame data of the video stream #2 read from the frame memory 23-2 is inserted into the multiplexed video frame supplied from the multiplexing circuit 42-1. The video-multiplexing related information and video format information about the video stream #2 are also inserted.

In step S35, the multiplexing circuit 42-3 requests the memory control circuit 32-1 to read data from the memory 33-1. The data of the audio samples of the audio stream #1, the number-of-samples information, and the audio format information are read from the memory 33-1.

In step S36, the multiplexing circuit 42-3 inserts the data of the audio samples of the audio stream #1 into the multiplexed video frame supplied from the multiplexing circuit 42-2.

In step S37, the multiplexing circuit 42-3 inserts the number-of-samples information, audio-multiplexing related information, and audio format information about the audio stream #1 into the multiplexed video frame supplied from the multiplexing circuit 42-2.

Processing similar to that of steps S35 to S37 is also performed by the multiplexing circuit 42-4. The data of the audio samples of the audio stream #2 read from the memory 33-2 is inserted into the multiplexed video frame supplied from the multiplexing circuit 42-3, together with the number-of-samples information, the audio-multiplexing related information, and the audio format information.

After all the streams of video data and audio data have been inserted into the multiplexed video frame, the process returns to step S5 of FIG. 11, and the subsequent processing is performed.

Figure 15:
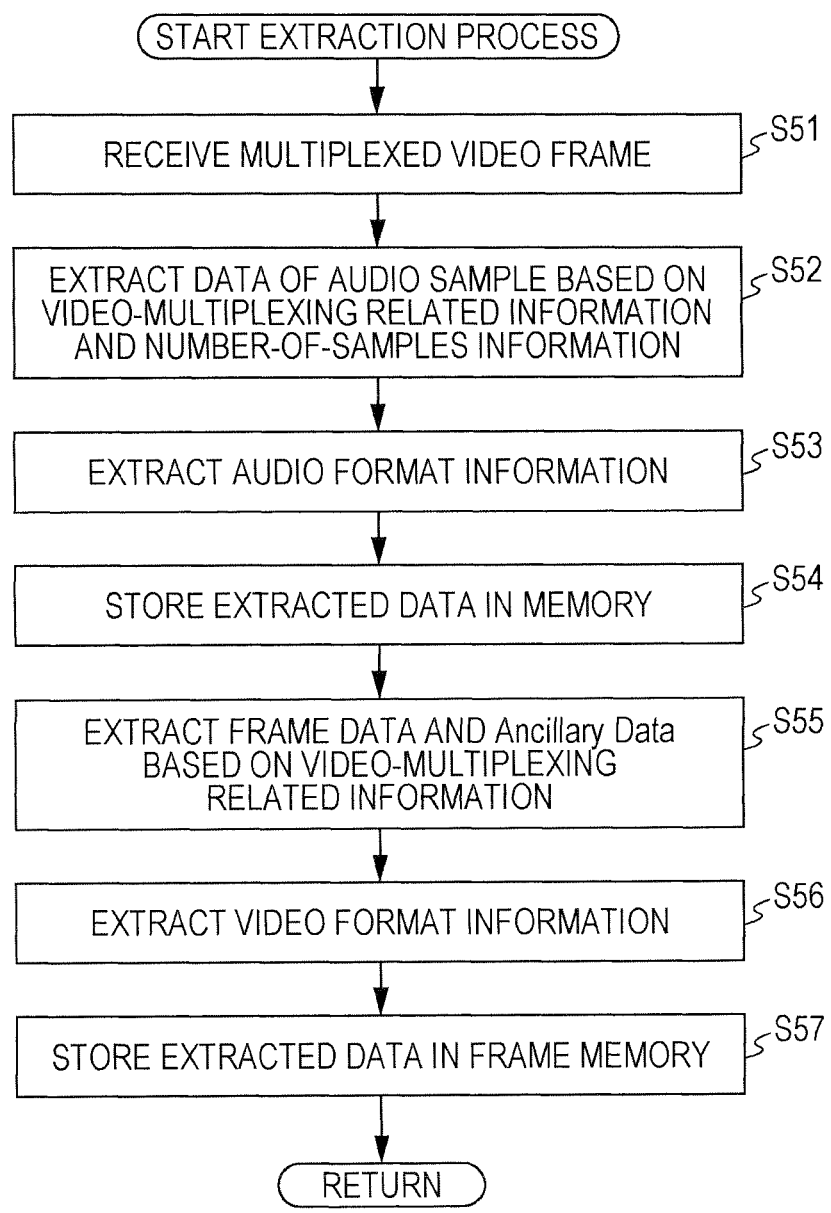
FIG. 15 is a flowchart illustrating an extraction process performed in step S7 of FIG. 11.

Next, the extraction process performed in step S7 of FIG. 11 will be described with reference to a flowchart of FIG. 15.

In step S51, the extraction circuit 45-1 receives the data of the multiplexed video frame output from the processor 43.

In step S52, the extraction circuit 45-1 extracts the data of the audio samples of the audio stream #2 from the multiplexed video frame on the basis of the audio-multiplexing related information and number-of-samples information inserted in the multiplexed video frame.

In step S53, the extraction circuit 45-1 extracts the audio format information about the audio stream #2 from the multiplexed video frame.

In step S54, the memory control circuit 61-2 causes the data of the audio samples of the audio stream #2 and the audio format information extracted by the extraction circuit 45-1 to be stored in the memory 62-2.

Processing similar to that of steps S52 to S54 is also performed by the extraction circuit 45-2 and the memory control circuit 61-1, and the data of the audio samples of the audio stream #1 and the audio format information extracted from the multiplexed video frame are stored in the memory 62-1.

In step S55, the extraction circuit 45-3 extracts the frame data and ancillary data of the video stream #2 from the multiplexed video frame on the basis of the video-multiplexing related information inserted in the multiplexed video frame.

In step S56, the extraction circuit 45-3 extracts the video format information from the multiplexed video frame.

In step S57, the frame synchronizer 51-2 causes the frame data, ancillary data, and video format information about the video stream #2 extracted by the extraction circuit 45-3 to be stored in the frame memory 52-2.

Processing similar to that of steps S55 to S57 is also performed by the extraction circuit 45-4 and the frame synchronizer 51-1. The frame data, ancillary data, and video format information about the video stream #1 extracted from the multiplexed video frame are stored in the frame memory 52-1.

After all the streams of video data and audio data have been extracted from the multiplexed video frame, the process returns to step S7 of FIG. 11, and the subsequent processing is performed.

Figure 16:
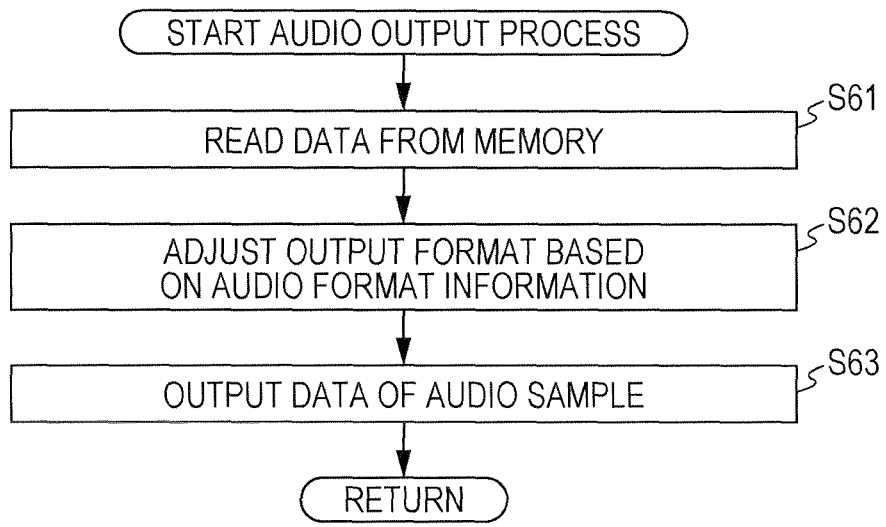
FIG. 16 is a flowchart illustrating an audio output process performed in step S9 of FIG. 11.

Next, the audio output process performed in step S9 of FIG. 11 will be described with reference to a flowchart of FIG. 16.

In step S61, the audio transmitting circuit 63-2 requests the memory control circuit 61-2 to read the data of the audio samples of the audio stream #2 and the audio format information from the memory 62-2.

In step S62, the audio transmitting circuit 63-2 performs a process for adjusting a signal output format on the basis of the audio format information.

In step S63, the audio transmitting circuit 63-2 outputs the audio data of the audio stream #2 whose output format has been adjusted in units of the data of one sample to the outside.

Processing similar to that of steps S61 to S63 is also performed by the audio transmitting circuit 63-1, and the audio data of the audio stream #1 read from the memory 62-1 is output to the outside.

After all the streams of audio data have been output, the process returns to step S9 of FIG. 11, and the subsequent processing is performed.

Figure 17:
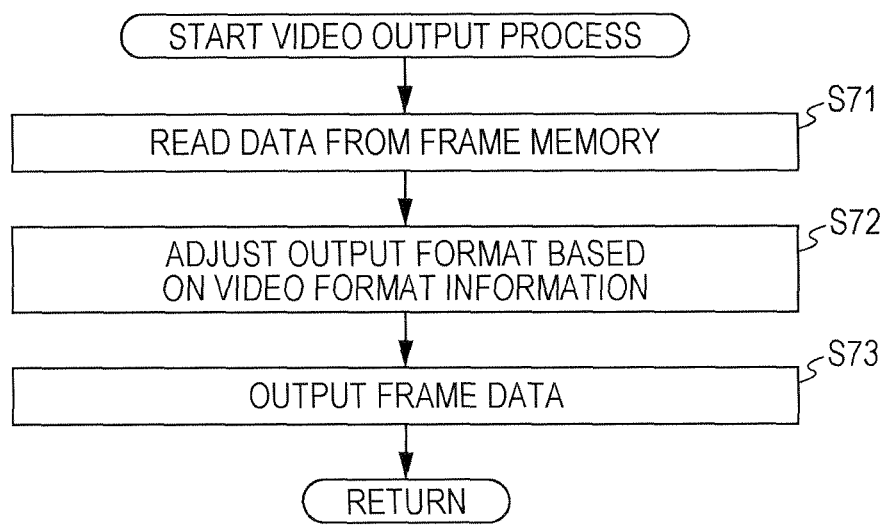
FIG. 17 is a flowchart illustrating a video output process performed in step S10 of FIG. 11.

Next, the video output process performed in step S10 of FIG. 11 will be described with reference to a flowchart of FIG. 17.

In step S71, the video transmitting circuit 53-2 requests the frame synchronizer 51-2 to read the frame data of the video stream #2 and the video format information from the frame memory 52-2.

In step S72, the video transmitting circuit 53-2 performs a process for adjusting a signal output format on the basis of the video format information.

In step S73, the video transmitting circuit 53-2 outputs the frame data of the video stream #2 whose output format has been adjusted to the outside. If the ancillary data of the video stream #2 has been extracted from the multiplexed video frame, the ancillary data is also read from the frame memory 52-2, as desired, and is output to the outside together with the frame data.

Processing similar to that of steps S71 to S73 is also performed by the video transmitting circuit 53-1, and the frame data of the video stream #1 read from the frame memory 52-1 is output to the outside.

After the frame data of all the streams of video has been output, the process returns to step S10 of FIG. 11, and the subsequent processing is performed.

The processing of the steps described above may not necessarily be performed in the order illustrated in the figures, and may be performed in parallel to the processing of other steps or before or after the processing of other steps, as appropriate.

With the series of processes described above, a plurality of streams of video data and audio data can be input to the processor 43 including one input video port. Further, a plurality of streams of video data and audio data can be output from the processor 43 including one output video port. In other words, the input of data to the processor 43 and the output of data from the processor 43 can be efficiently performed using one video port.

Furthermore, high flexibility and high degree of freedom of data input to the information processing apparatus 1 can be guaranteed.

That is, information regarding a multiplexing position of data and the like is provided from the input circuit to the subsequent stage, and therefore it is not necessary to set a multiplexing position of data and the like in advance in a fixed manner between the input circuit and the processor 43 and between the processor 43 and the output circuit.

As a result, a multiplexing position can be changed, thus making it easy to support the input of various combinations of signals. For example, four HD video frames may be attached to a 4K×2K multiplexed video frame, or four SD video frames may be attached. Both HD frames and SD frames may be contained. Various combinations of signals may be supported merely by changing the setting of the input circuit.

Also, the risk of mismatching in setting between the input circuit and the processor 43 and between the processor 43 and the output circuit can be eliminated or reduced.

The input circuit is also capable of changing or modifying a multiplexed video frame on the basis of a result obtained by automatically determining the presence/absence of signals or the type (format) of signals. For example, the operation of automatically erasing the data of a channel that is not input from the multiplexed video frame (not inserting the data into the multiplexed video frame) can be performed by the input circuit on the basis of certain criteria rather than in accordance with a user input. Furthermore, the operation of determining switching between SD/HD of a video frame to be input and automatically changing the size of an area where video is to be inserted, which is to be reserved in the multiplexed video frame, can also be performed by the input circuit.

The operation of automatically adjusting the format of an output signal on the basis of multiplexed frame arrangement information can also be performed by the output circuit. Since the output circuit is a circuit capable of reading multiplexed frame arrangement information and automatically changing the output format, no additional setting may be performed in the output circuit.

Defining the multiplexed frame arrangement information can facilitate data transmission when input video data contains frames and fields. For example, a multiplexed video signal having a frame frequency of 60 Hz may be generated and video data having a field frequency of 60 Hz may be multiplexed using the multiplexed video signal, or a multiplexed video signal having a frame frequency of 30 Hz may be generated and video data having a field frequency of 60 Hz may be multiplexed using the multiplexed video signal. Even in this case, the transmission of multiplexed frame arrangement information allows accurate restoration of the original video signal.

In addition, the insertion of multiplexed frame arrangement information into each multiplexed video frame allows a value associated with video/audio data to be changed and updated every multiplexed video frame. A general-purpose input/output (GPIO) line or a serial port may not attain such high-response data transmission.

Multiplexed Frame State Information

FIG. 18 is a diagram illustrating information included in multiplexed frame state information.

As illustrated in FIG. 18, information included in multiplexed frame state information can be separated into information regarding data continuity, information regarding data reliability, and a write-completion flag.

The information regarding data continuity includes information representing the serial number of a multiplexed video frame, frame/field identification information, information representing a serial frame number, timecode, information representing the serial number of an audio sample, and number-of-samples information.

The frame/field identification information, the information representing a serial frame number, and the timecode are set for each stream of video data for which frame data has been inserted in a multiplexed video frame. The information representing the serial number of an audio sample and the number-of-samples information are set for each stream of audio data for which data of audio samples has been inserted in a multiplexed video frame.

The information regarding data reliability includes a synchronization stability flag of a multiplexed video signal, a synchronization stability flag of a video signal, and the validity bit of audio data.

The synchronization stability flag of a video signal is set for each stream of video data for which frame data has been inserted in a multiplexed video frame. The validity bit of audio data is set for each stream of audio data for which the data of audio samples has been inserted in a multiplexed video frame.

A video write-completion flag set by the processor 43 is set for each stream of video data for which frame data has been inserted in a multiplexed video frame. An audio write-completion flag is set for each stream of audio data for which the data of audio samples has been inserted in a multiplexed video frame. An all-stream write-completion flag is set for each multiplexed video frame.

Information representing the insertion position of each piece of information included in the multiplexed frame state information is set in advance so as to represent a common position between an input circuit and the processor 43 and between the processor 43 and an output circuit.

The input circuit refers to an entire circuit configured to input data to the processor 43, and the output circuit refers to an entire circuit configured to output data output from the processor 43 to the outside of the information processing apparatus 1.

The input circuit includes the video receiving circuits 21, the frame synchronizers 22, the frame memories 23, the audio receiving circuits 31, the memory control circuits 32, the memories 33, the multiplexed video signal generating circuit 41, and the multiplexing circuits 42 in FIG. 1. The output circuit includes the timing generating circuit 44, the extraction circuits 45, the frame synchronizers 51, the frame memories 52, the video transmitting circuits 53, the memory control circuits 61, the memories 62, and the audio transmitting circuits 63 in FIG. 1.

Operation of Input Circuit

The process of an input circuit regarding each piece of information included in the multiplexed frame state information will now be described.

The information representing the serial number of a multiplexed video frame is inserted into the multiplexed video frame by the multiplexed video signal generating circuit 41. The information representing the serial number of the multiplexed video frame is supplied to the processor 43 in such a manner as to be inserted in the multiplexed video frame.

The processor 43 determines whether or not the serial number of the multiplexed video frame increases by 1 on the basis of the information representing the serial number of the multiplexed video frame. If the serial number increases by 1, it is determined that the input circuit is operating in a normal condition.

If the serial number of the multiplexed video frame do not increase by 1, the input circuit is not possibly operating in a normal condition. In this case, the processor 43 performs processing such as skipping the process of receiving the entire multiplexed video signal (not receiving a multiplexed video frame). Thus, no extra operation is performed, resulting in reduced load on the processor 43.

The information representing the serial frame number of video data is generated by a video receiving circuit 21, and is temporarily stored in a frame memory 23. After that, the information is inserted into the multiplexed video frame by a multiplexing circuit 42 that processes video data (in the example of FIG. 1, the multiplexing circuits 42-1 and 42-2). The information representing the serial frame number of video data is supplied to the processor 43 in such a manner as to be inserted in the multiplexed video frame.

The processor 43 determines whether or not the serial frame number increases by 1 on the basis of the information representing the serial frame number of video data. If the serial frame number increases by 1, it is determined that the continuity of the video data is maintained (there are no frame missing or redundancy).

If the serial frame number does not increase by 1 even if the synchronization stability flag of the video signal is on, the processor 43 determines that frame missing or redundancy has been caused by the frame synchronizer 22. Based on the serial frame number, the processor 43 can accurately determine information such as how many frames are missing, up to which frame is missing, how many frames are redundant.

For example, if frame redundancy is detected, the processor 43 omits the processing for the second and subsequent frames that have been transmitted redundantly. Thus, the load on the processor 43 can be reduced. If frame missing is detected, the processor 43 may perform processing such as interpolating a missing frame or substituting a missing frame into a gray image or a black image.

The video frame/field identification information and the timecode are read by a video receiving circuit 21 from an input video signal, and is temporarily stored in a frame memory 23. After that, the video frame/field identification information and the timecode are inserted into the multiplexed video frame by a multiplexing circuit 42 that processes video data. The processor 43 can also determine, based on the frame/field identification information and the timecode, whether or not the continuity of the video data is maintained.

The information representing the serial number of audio samples and the number-of-samples information are generated by, for example, an audio receiving circuit 31. The above information may also be generated by a memory control circuit 32. The information representing the serial number of audio samples and the number-of-samples information are temporarily stored in a memory 33, and thereafter are inserted into the multiplexed video frame by a multiplexing circuit 42 that processes audio data (in the example of FIG. 1, the multiplexing circuits 42-3 and 42-4).

The processor 43 calculates the sum of the serial number of the top audio sample inserted in the multiplexed video frame and the number of samples represented by the number-of-samples information. If the value obtained by the calculation matches the serial number of the top audio sample inserted in the next multiplexed video frame, the processor 43 determines that the continuity of the audio data is maintained.

If the value obtained by the calculation does not match the serial number of the top audio sample inserted in the next multiplexed video frame, the continuity of the audio data is not guaranteed. In this case, the processor 43 performs processing such as skipping the reading process and audio signal processing for unreliable audio data and substituting the audio data into data of silent audio samples. Thus, no extra operation is performed, resulting in reduced load on the processor 43.

The synchronization stability flag of the multiplexed video signal is inserted into the multiplexed video frame by the multiplexed video signal generating circuit 41. The synchronization stability flag of the multiplexed video signal is supplied to the processor 43 in such a manner as to be inserted in the multiplexed video frame.

The processor 43 determines whether or not a multiplexed video signal that transmits the supplied multiplexed video frame is a signal output from the multiplexed video signal generating circuit 41 when synchronization is maintained, on the basis of the synchronization stability flag of the multiplexed video signal. If the synchronization stability flag is on, the processor 43 determines that the multiplexed video signal generating circuit 41 is operating in a normal condition.

If the synchronization stability flag of the multiplexed video signal is not on, the reliability of the multiplexed video signal itself may be low. In this case, the processor 43 performs processing such as skilling the process of receiving the entire multiplexed video signal. Thus, no extra operation is performed, resulting in reduced load on the processor 43.

The synchronization stability flag of the video signal is output from the video receiving circuit 21, and is inserted into the multiplexed video frame by a multiplexing circuit 42 that processes video data. The synchronization stability flag of the video signal is supplied to the processor 43 in such a manner as to be inserted in the multiplexed video frame.

The processor 43 determines, based on the synchronization stability flag of the video signal, whether or not failure of synchronization of the input video signal has been occurred in the video receiving circuit 21 when the video frame inserted in the multiplexed video frame is output from the video receiving circuit 21. If the synchronization stability flag of the video signal is on, the processor 43 determines that no synchronization failure has occurred.

If the synchronization stability flag of the video signal is not on, the reliability of data of the video frame inserted in the multiplexed video frame may be low. In this case, the processor 43 determines that the data of the video frame inserted in the multiplexed video frame is invalid data, and skips the reading process and image processing for the invalid video data.

The processor 43 also performs processing such as substituting the video frame inserted in the multiplexed video frame into another frame such as a gray image, a black image, or a freeze image. Thus, no extra operation is performed, resulting in reduced load on the processor 43.

The validity bit is cut out by an audio receiving circuit 31, together with the data of the audio samples during one frame period of the multiplexed video frame. The validity bit is supplied to the processor 43 in such a manner as to be inserted in the multiplexed video frame together with the data of the audio samples.

If the validity bit is not on, the reliability of the data of the audio samples inserted in the multiplexed video frame is not guaranteed. The processor 43 skips the reading process and audio signal processing for the data of the unrealizable audio samples.

The processor 43 also performs processing such as substituting the data of the audio samples inserted in the multiplexed video frame into silent data. Thus, no extra operation is performed, resulting in reduced load on the processor 43.

Operation of Output Circuit

The process of an output circuit regarding each piece of information included in the multiplexed frame state information will be described.

The processor 43 performs processing on each stream of data inserted in a multiplexed video frame each time the multiplexed video frame is input from the input video port, multiplexes the data obtained after processing, and outputs resulting data from the output video port. The above operation may not necessarily be completed within one frame period of the multiplexed video frame.

To check whether or not the processor 43 has experienced such a situation that the operation is not completed within one frame period of the multiplexed video frame, a video write-completion flag, an audio write-completion flag, and an all-stream write-completion flag may be used.

After the video data obtained after processing has been inserted into the multiplexed video frame, the processor 43 sets a video write-completion flag indicating that the insertion of the data of the frames of the video in the corresponding stream has completed.

After the audio data obtained after processing has been inserted into the multiplexed video frame, the processor 43 also sets an audio write-completion flag indicating that the insertion of the data of the audio samples of the audio in the corresponding stream has completed.

After all the streams of data have been inserted and a multiplexed video frame to be output to the output circuit has been produced, the processor 43 sets an all-stream write-completion flag in the multiplexed video frame.

The video write-completion flag is read by an extraction circuit 45 that processes video data (in the example of FIG. 1, the extraction circuits 45-3 and 45-4), and is used by a video transmitting circuit 53.

If the video write-completion flag is not on (which indicates that writing has not been completed), the video data of the stream in which this flag has been set can possibly be video data that has not been completely written or that has not been written.

In this case, the video transmitting circuit 53 performs processing such as outputting a freeze image that uses a preceding frame, a gray image, or a black image, instead of, for example, a video frame extracted from the multiplexed video frame.

A freeze image may be output using the frame preceding the frame that remains in the frame memory 52. In this case, the frame synchronizer 51 keeps the preceding frame remaining in the frame memory 52 by performing the operation of preventing data from being written in the frame memory 52.

Since a gray image or a black image is formed of frames having fixed values, it may be easy to substitute output data.

The audio write-completion flag is read by an extraction circuit 45 that processes audio data (in the case of FIG. 1, the extraction circuits 45-1 and 45-2), and is used by an audio transmitting circuit 63.

If the audio write-completion flag is not on, the audio data of the stream in which this flag has been set can possibly be audio data that has not been completely written or that has not been written.

In this case, the audio transmitting circuit 63 performs processing such as muting the output without, for example, outputting the video frame extracted from the multiplexed video frame. It may be easy to generate silent data. In this case, instead of muting the output, fade-out or fade-in processing may be performed.

The serial number of the multiplexed video frame, the serial frame number of the video data, the serial number of the audio sample, and the number-of-samples information can also be used to determine whether or not the processor 43 has performed processing correctly. If the continuity of the video data or the continuity of the audio data is not maintained, the video transmitting circuit 53 or the audio transmitting circuit 63 may perform processing similar to that performed when the write-completion flag is not on.

For example, if the serial frame number of the video data does not increase by 1, it is determined that the continuity of the video data is not maintained. Further, if the sum of the serial number of the top audio sample and the number of samples represented by the number-of-samples information does not match the serial number of the top audio sample inserted in the next multiplexed video frame, it is determined that continuity is not maintained.

Operation of Information Processing Apparatus

Here, a process of the information processing apparatus 1 illustrated in FIG. 1 will be described with reference to a flowchart of FIG. 19.

In step S101, the video receiving circuits 21-1 and 21-2 perform a video receiving process.

In step S102, the audio receiving circuits 31-1 and 31-2 perform an audio receiving process.

In step S103, the multiplexed video signal generating circuit 41 generates a multiplexed video frame, and inserts information representing the serial number of the multiplexed video frame and a synchronization stability flag.

In step S104, the multiplexing circuits 42-1 to 42-4 perform a multiplexing process.

In step S105, the processor 43 extracts video data and audio data multiplexed in the data of the multiplexed video frame input to the video port, and performs predetermined processing.

In step S106, the processor 43 inserts the video data obtained after processing into the multiplexed video frame, and sets, for each stream of video data, a video write-completion flag at the timing when the insertion is completed. The processor 43 further inserts the audio data obtained after processing into the multiplexed video frame, and sets, for each stream of audio data, an audio write-completion flag at the timing when the insertion is completed. The processor 43 outputs the data of the multiplexed video frame in which the data has been multiplexed from the video port.

In step S107, the extraction circuits 45-1 to 45-4 perform an extraction process.

In step S108, the audio transmitting circuits 63-1 and 63-2 perform an audio output process.

In step S109, the video transmitting circuits 53-1 and 53-2 perform a video output process. After the video output process has been completed, the process ends.

Figure 20:
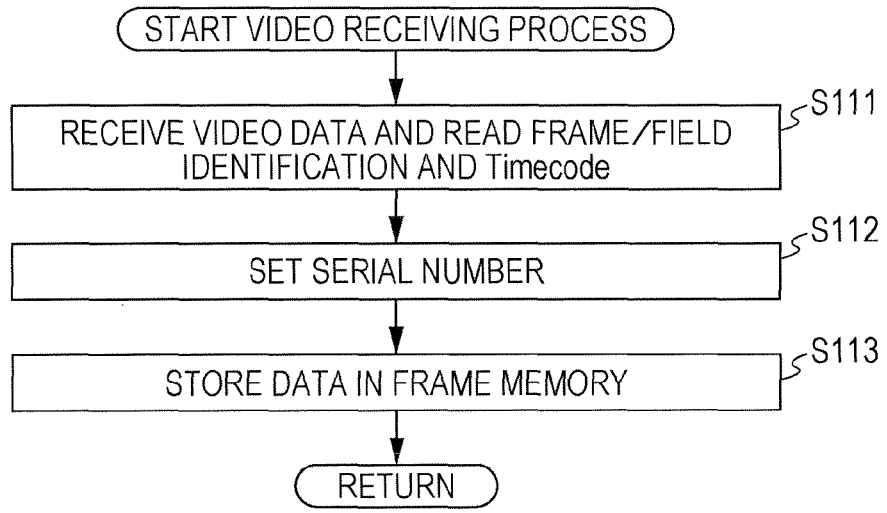
FIG. 20 is a flowchart illustrating a video receiving process performed in step S101 of FIG. 19.

Next, the video receiving process performed in step S101 of FIG. 19 will be described with reference to a flowchart of FIG. 20.

In step S111, the video receiving circuit 21-1 receives an input video signal, and performs various processing such as A/D conversion to generate data of frames included in a video stream #1. The video receiving circuit 21-1 further reads frame/field identification information and timecode on the basis of the video signal of the video stream #1.

In step S112, the video receiving circuit 21-1 sets a serial frame number in each of the frames generated in step S11.

In step S113, the frame synchronizer 22-1 causes the frame data of the video stream #1, the frame/field identification information, the timecode, and the information representing the serial frame number to be stored in the frame memory 23-1.

The processing of steps S111 to S113 is also performed by the video receiving circuit 21-2 and the frame synchronizer 22-2, and the frame data of the video stream #2, the frame/field identification information, the timecode, and the information representing the serial frame number is stored in the frame memory 23-2.

After the data of the video streams #1 and #2 are stored in the frame memories 23, the process returns to step S101 of FIG. 19, and the subsequent processing is performed.

Figure 21:
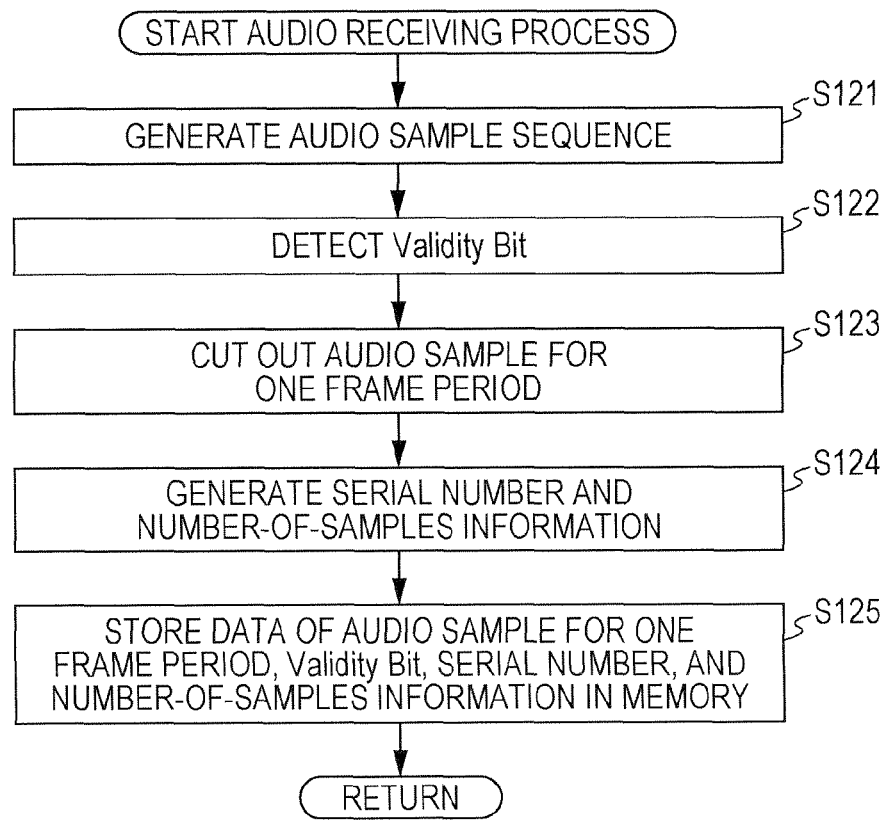
FIG. 21 is a flowchart illustrating an audio receiving process performed in step S102 of FIG. 19.

Next, the audio receiving process performed in step S102 of FIG. 19 will be described with reference to a flowchart of FIG. 21.

In step S121, the audio receiving circuit 31-1 receives an input audio signal, and performs processing such as A/D conversion to generate audio data of an audio stream #1 composed of a time sequence of audio samples.

In step S122, the audio receiving circuit 31-1 detects the validity bit on the basis of the audio signal of the audio stream #1.

In step S123, the audio receiving circuit 31-1 cuts out, while counting the number of samples, audio samples of the audio stream #1 that are input within one frame period of the multiplexed video frame.

In step S124, the audio receiving circuit 31-1 sets a serial number in the cut out audio samples to generate information representing the serial number of the audio samples, and also generates number-of-samples information representing the number of audio samples counted.

In step S125, the memory control circuit 32-1 causes the data of the cut out audio samples of the audio stream #1, the validity bit, the information representing the serial number, and the number-of-samples information to be stored in the memory 33-1.

The processing of steps S121 to S125 is also performed by the audio receiving circuit 31-2 and the memory control circuit 32-2, and the data of audio samples of an audio stream #2, the validity bit, the information representing the serial number, and the number-of-samples information are stored in the memory 33-2.

After the data of the audio streams #1 and #2 are stored in the memories 33, the process returns to step S102 of FIG. 19, and the subsequent processing is performed.

Figure 22:
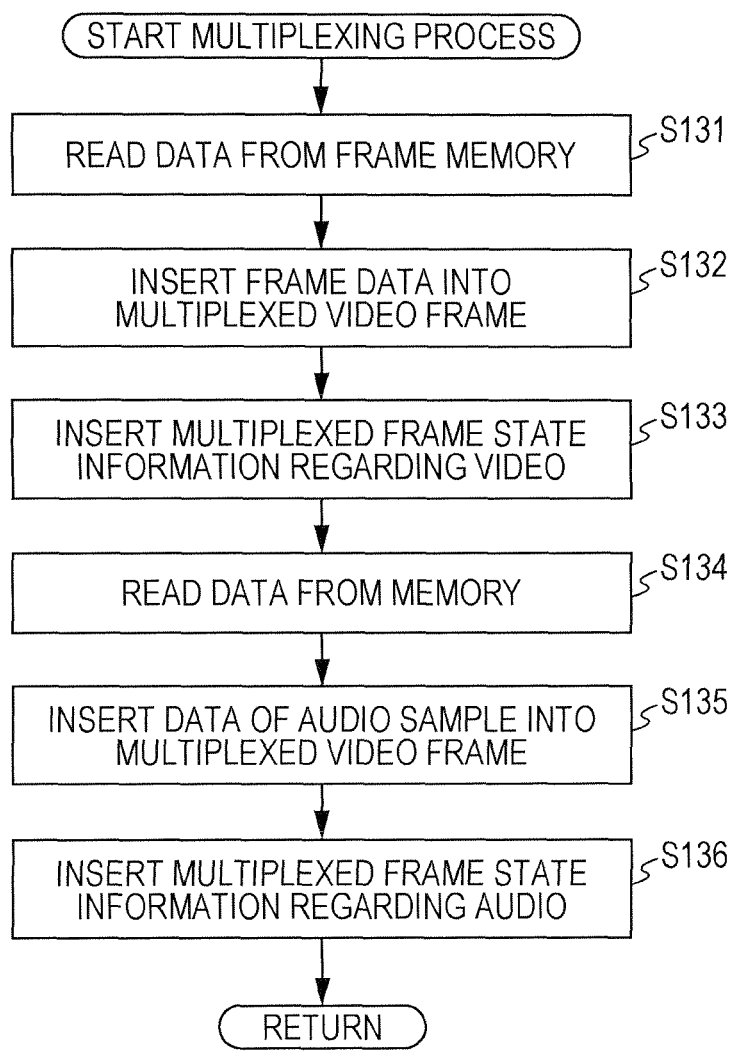
FIG. 22 is a flowchart illustrating a multiplexing process performed in step S104 of FIG. 19.

Next, the multiplexing process performed in step S104 of FIG. 19 will be described with reference to a flowchart of FIG. 22. The data of the multiplexed video frame generated in step S103 of FIG. 19 is supplied to the multiplexing circuit 42-1.

In step S131, the multiplexing circuit 42-1 requests the frame synchronizer 22-1 to read the data of the video stream #1 from the frame memory 23-1. The frame data of the video stream #1, the frame/field identification information, the timecode, and the information representing the serial frame number are read from the frame memory 23-1.

In step S132, the multiplexing circuit 42-1 inserts the frame data of the video stream #1 read from the frame memory 23-1 into the multiplexed video frame.

In step S133, the multiplexing circuit 42-1 inserts multiplexed frame state information regarding the video stream #1 read from the frame memory 23-1 into the multiplexed video frame.

Processing similar to that of steps S131 to S133 is also performed by the multiplexing circuit 42-2, and the frame data of the video stream #2 and the multiplexed frame state information read from the frame memory 23-2 is inserted into the multiplexed video frame supplied from the multiplexing circuit 42-1.

In step S134, the multiplexing circuit 42-3 requests the memory control circuit 32-1 to read data from the memory 33-1. The data of the audio samples of the audio stream #1, the validity bit, the information representing the serial number, and the number-of-samples information are read from the memory 33-1.

In step S135, the multiplexing circuit 42-3 inserts the data of the audio samples of the audio stream #1 into the multiplexed video frame supplied from the multiplexing circuit 42-2.

In step S136, the multiplexing circuit 42-3 inserts multiplexed frame state information regarding the audio stream #1 into the multiplexed video frame supplied from the multiplexing circuit 42-2.

Processing similar to that of steps S134 to S136 is also performed by the multiplexing circuit 42-4, and the data of the audio samples of the audio stream #2 and the multiplexed frame state information read from the memory 33-2 are inserted into the multiplexed video frame supplied from the multiplexing circuit 42-3.

After all the streams of video data and audio data have been inserted into the multiplexed video frame, the process returns to step S104 of FIG. 19, and the subsequent processing is performed.

Figure 23:
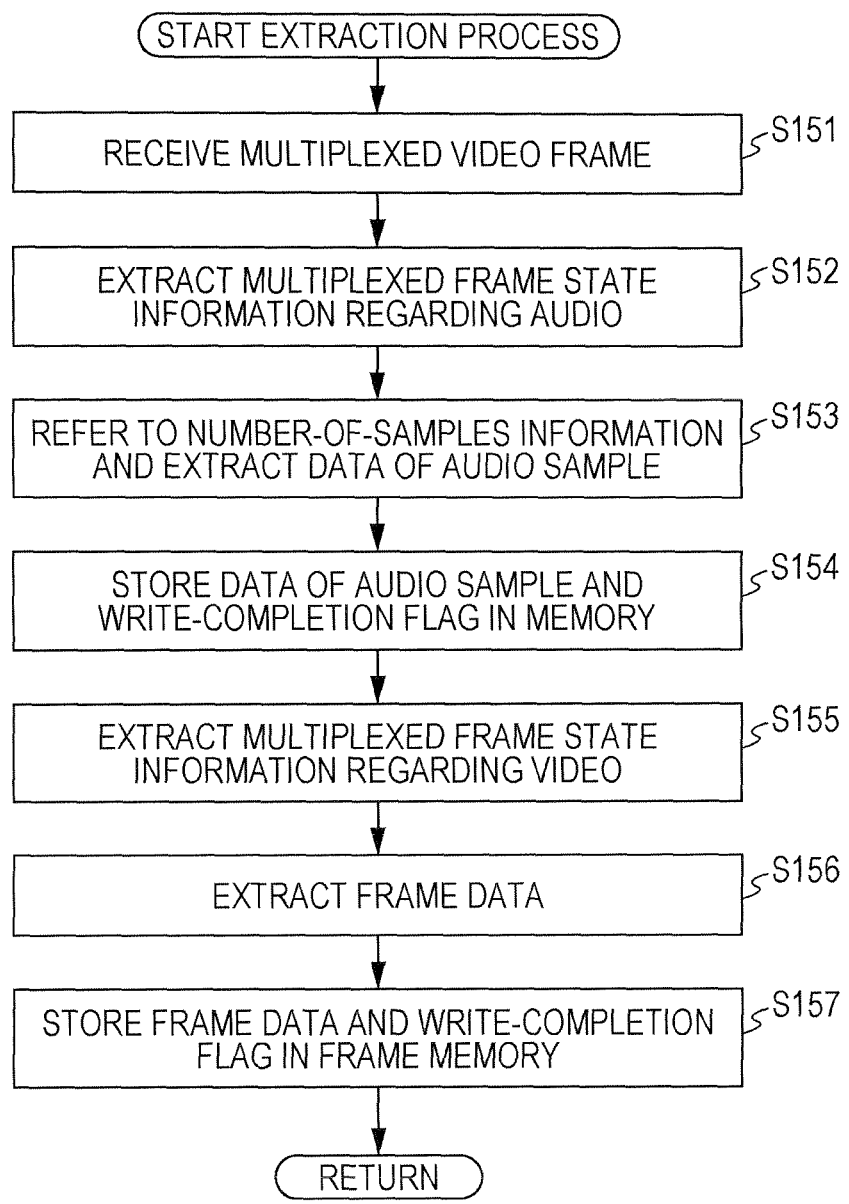
FIG. 23 is a flowchart illustrating an extraction process performed in step S107 of FIG. 19.

Next, the extraction process performed in step S107 of FIG. 19 will be described with reference to a flowchart of FIG. 23.

In step S151, the extraction circuit 45-1 receives the data of the multiplexed video frame output from the processor 43. The multiplexed frame state information inserted in the multiplexed video frame output from the processor 43 also includes a write-completion flag set by the processor 43.

In step S152, the extraction circuit 45-1 extracts multiplexed frame state information regarding the audio stream #2 inserted in the multiplexed video frame.

In step S153, the extraction circuit 45-1 extracts the data of the audio samples of the audio stream #2 from the multiplexed video frame on the basis of number-of-samples information included in the extracted multiplexed frame state information.

In step S154, the memory control circuit 61-2 causes the data of the audio samples of the audio stream #2 extracted by the extraction circuit 45-1 and, for example, an audio write-completion flag included in the multiplexed frame state information to be stored in the memory 62-2.

Processing similar to that of steps S152 to S154 is also performed by the extraction circuit 45-2 and the memory control circuit 61-1, and the data of the audio samples of the audio stream #1 and the multiplexed frame state information extracted from the multiplexed video frame are stored in the memory 62-1.

In step S155, the extraction circuit 45-3 extracts the multiplexed frame state information about the video stream #2 inserted in the multiplexed video frame.

In step S156, the extraction circuit 45-3 extracts the frame data of the video stream #2 inserted in the multiplexed video frame from multiplexed video frame.

In step S157, the frame synchronizer 51-2 causes the frame data of the video stream #2 extracted by the extraction circuit 45-3 and, for example, a video write-completion flag included in the multiplexed frame state information to be stored in the frame memory 52-2.

Processing similar to that of steps S155 to S157 is also performed by the extraction circuit 45-4 and the frame synchronizer 51-1. The frame data of the video stream #1 extracted from the multiplexed video frame and the video write-completion flag included in the multiplexed frame state information are stored in the frame memory 52-1.

After all the streams of video data and audio data have been extracted from the multiplexed video frame, the process returns to step S107 of FIG. 19, and the subsequent processing is performed.

Figure 24:
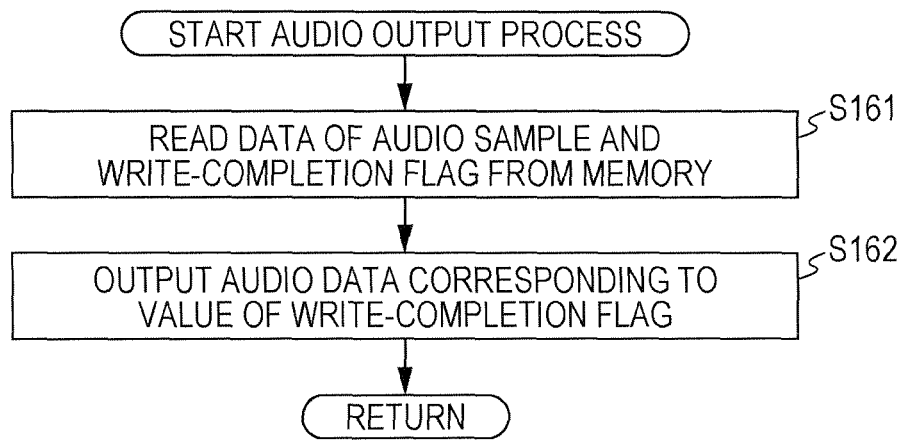
FIG. 24 is a flowchart illustrating an audio output process performed in step S108 of FIG. 19.

Next, the audio output process performed in step S108 of FIG. 19 will be described with reference to a flowchart of FIG. 24.

In step S161, the audio transmitting circuit 63-2 requests the memory control circuit 61-2 to read the data of the audio samples of the audio stream #2 and the audio write-completion flag from the memory 62-2.

In step S162, the audio transmitting circuit 63-2 outputs data corresponding to the value of the audio write-completion flag to the outside, in units of the data of one sample, as audio data of the audio stream #2.

Specifically, if the audio write-completion flag is on, the data of the audio samples extracted from the multiplexed video frame is output as the audio data corresponding to the value of the audio write-completion flag. If the audio write-completion flag is not on, silent data or the like instead of the audio samples extracted from the multiplexed video frame is output as the audio data corresponding to the value of the audio write-completion flag.

Processing similar to that of steps S161 and S162 is also performed by the audio transmitting circuit 63-1, and the audio data of the audio stream #1 corresponding to the value of the audio write-completion flag read from the memory 62-1 is output to the outside.

After all the streams of audio data have been output, the process returns to step S108 of FIG. 19, and the subsequent processing is performed.

Figure 25:
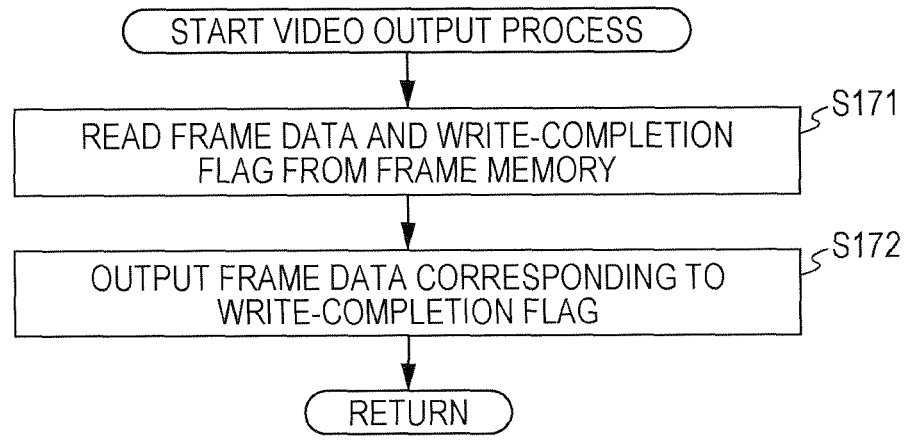
FIG. 25 is a flowchart illustrating a video output process performed in step S109 of FIG. 19.

Next, the video output process performed in step S109 of FIG. 19 will be described with reference to a flowchart of FIG. 25.

In step S171, the video transmitting circuit 53-2 requests the frame synchronizer 51-2 to read the frame data of the video stream #2 and the video write-completion flag from the frame memory 52-2.

In step S172, the video transmitting circuit 53-2 outputs the data corresponding to the value of the video write-completion flag to the outside as the frame data of the video stream #2.

Specifically, if the video write-completion flag is on, the frame data extracted from the multiplexed video frame is output as the video data corresponding to the value of the video write-completion flag. If the video write-completion flag is not on, the data of other frames, such as that of a freeze image, instead of the frame data extracted from the multiplexed video frame, is output as the video data corresponding to the value of the video write-completion flag.

Processing similar to that of steps S171 and S172 is also performed by the video transmitting circuit 53-1, and the frame data of the video stream #1 corresponding to the value of the video write-completion flag read from the frame memory 52-1 is output to the outside.

After the frame data of all the streams of video has been output, the process returns to step S109 of FIG. 19, and the subsequent processing is performed.

The processing of the steps described above may not necessarily be performed in the order illustrated in the figures, and may be performed in parallel to the processing of other steps or before or after the processing of other steps, as appropriate.

With the series of processes described above, a plurality of streams of video data and audio data can be input to the processor 43 including one input video port. Further, a plurality of streams of video data and audio data can be output from the processor 43 including one output video port. In other words, the input of data to the processor 43 and the output of data from the processor 43 can be efficiently performed using one video port.

Furthermore, the processor 43 or the output circuit that has received video data or audio data multiplexed using a multiplexed video frame can determine whether or not data continuity is maintained, based on information included in multiplexed frame state information. Thus, a high stability system operation can be guaranteed.

If it is determined that continuity is not maintained or if data reliability is low, for example, for video data, as described above, a freeze image, a gray image, or a black image is output, thus achieving a high system stability.

Examples of Multiplexing

In the foregoing description, two streams of video signals and two streams of audio signal are input to the information processing apparatus 1. However, the number of signals to be input can be changed as desired. For example, four streams of video signals and four streams of audio signals may be input.

FIG. 26 is a diagram illustrating an example of a multiplexed video frame in a case where four streams of video signals and four streams of audio signals are input.

In the multiplexed video frame illustrated in FIG. 26, a blanking region is provided so as to extend in the horizontal and vertical directions, and an area from the first line to a predetermined line within an effective image frame is set as an area $A_1$ for multiplexed frame arrangement information. The individual pieces of information illustrated in FIGS. 9 and 10 are inserted at allocated positions in the area $A_1$.

Instead of being collectively inserted in consecutive areas as illustrated in FIG. 26, the individual pieces of information included in the multiplexed frame arrangement information may be inserted into a plurality of areas defined away from each other within the multiplexed video frame.

In the multiplexed video frame illustrated in FIG. 26, a video area $A_2$ that is an area for video is further provided below the area $A_1$. In the video area $A_2$, the frames of the video streams #0 to #3 are attached so as not to overlap each other with their frame sizes being maintained.

An audio area $A_3$ that is an area for audio data is provided below the video area $A_2$. The audio data of the audio streams #0 to #3 is inserted tightly into the respective lines of the audio data area $A_3$ in the order input to the information processing apparatus 1, starting from the left end of each line.

In FIG. 26, different horizontal lengths of portions of audio data inserted in the respective lines indicate that the amount of audio data inserted differs depending on the stream. As described above, audio data multiplexed into the same multiplexed video frame is input during a frame period of the multiplexed video frame. Therefore, if each piece of audio data has a different sampling frequency or a different quantization accuracy, variation may occur in the amount of audio data multiplexed into the same multiplexed video frame. Among the lines allocated to audio data, an area in which data has been recorded serves as the effective area of the audio data described above.

Figure 27:
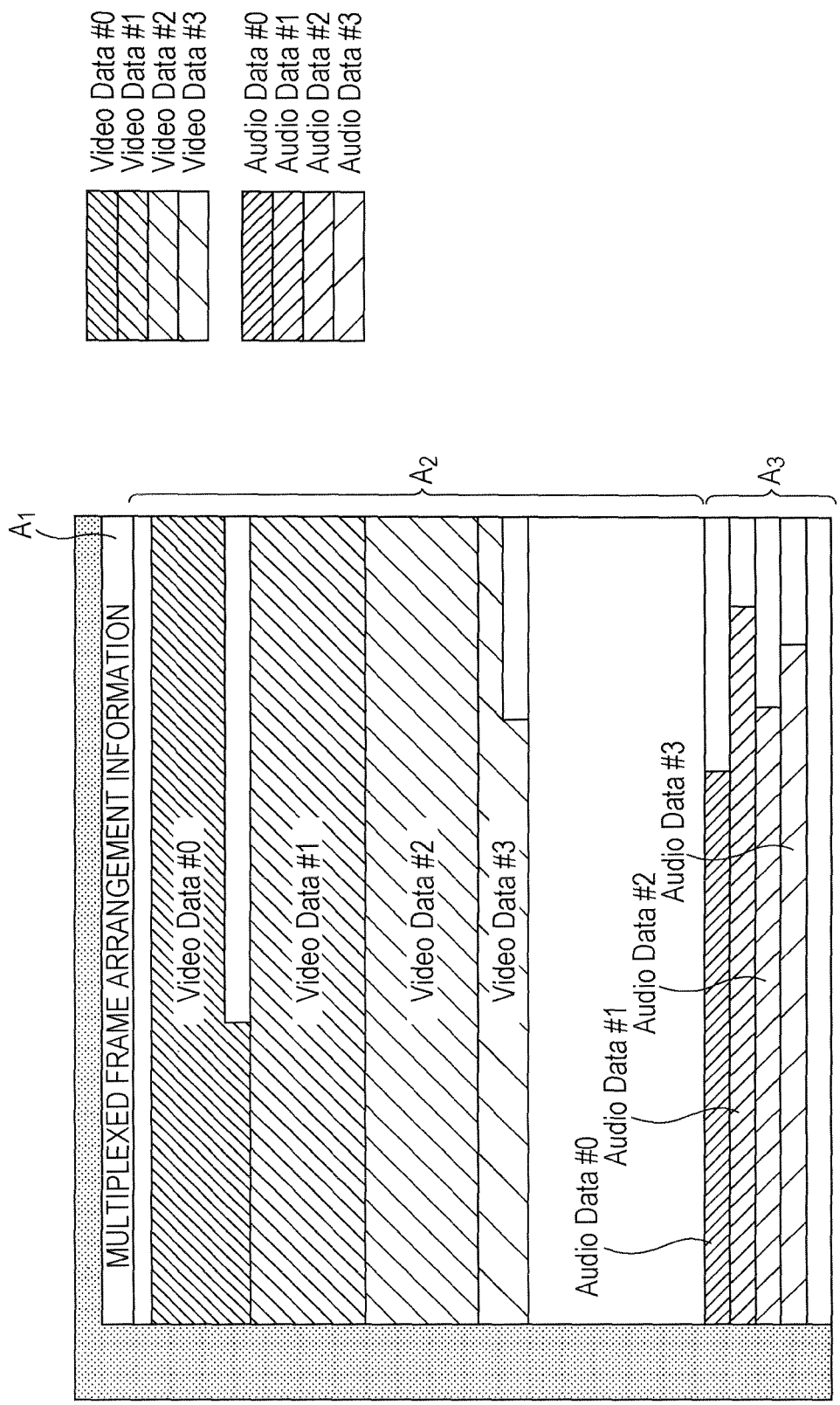
FIG. 27 is a diagram illustrating another example of the multiplexed video frame.

FIG. 27 is a diagram illustrating another example of a multiplexed video frame in a case where four streams of video signals and four streams of audio signals are input.

In a video area $A_2$ of the multiplexed video frame illustrated in FIG. 27, an area having pixels located in the horizontal direction, the number of which is equal to the number of pixels in the horizontal direction of an effective image frame, and pixels located in the vertical direction, the number of which corresponds to a predetermined number of lines, is set as an area where data of frames of each video stream is to be inserted. In the example of FIG. 27, areas where the data of the frames of the video streams #0 to #3 is to be inserted are set in order, starting from the top.

In this manner, instead of being attached to a multiplexed video frame with the input size being maintained, a frame of each video stream may be attached in a shape different from that when it is input. Depending on the setting of an area where a frame of each video stream is to be attached, efficient multiplexing of data can be achieved.

Exemplary Modifications

Figure 28:
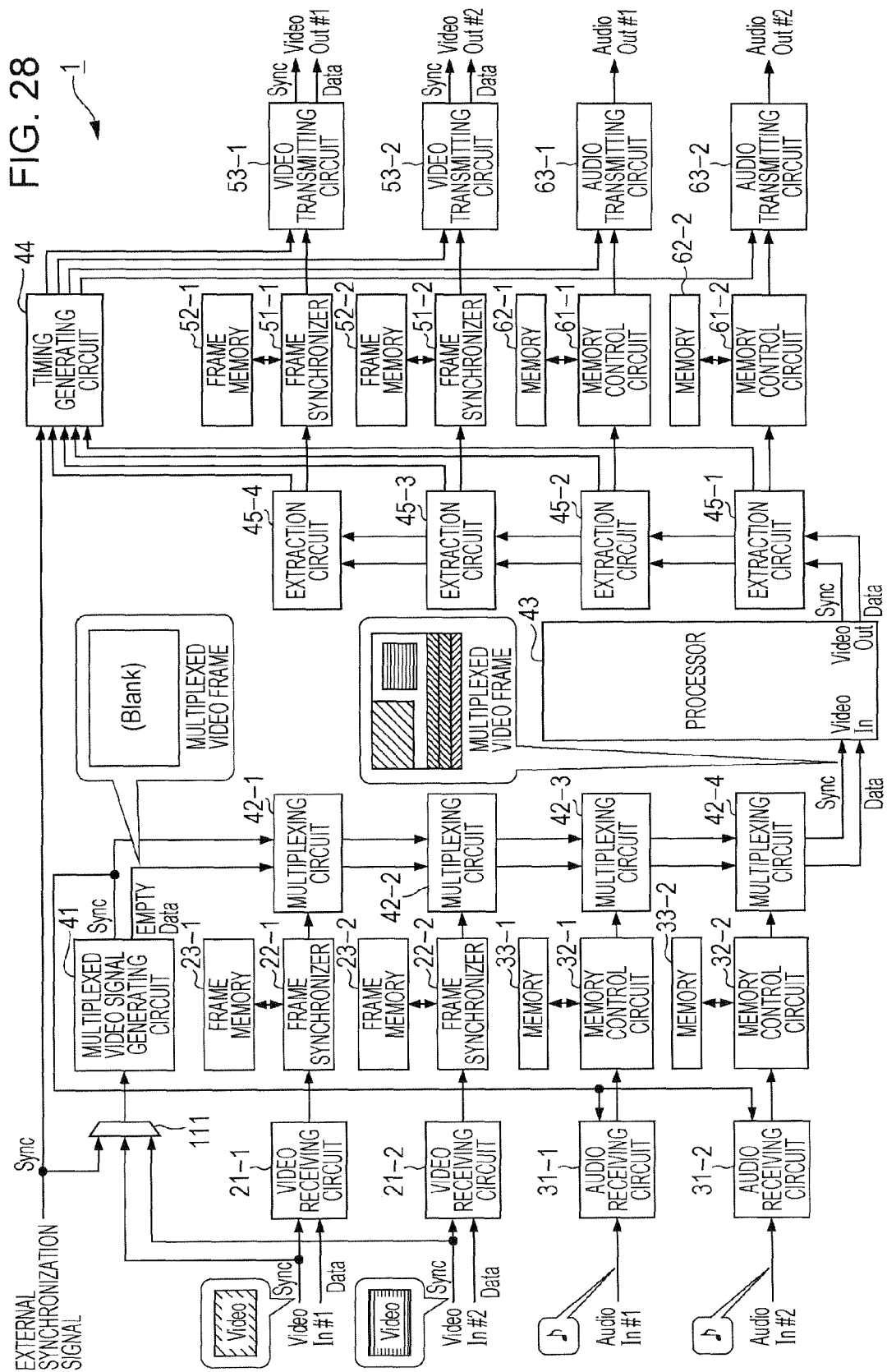
FIG. 28 is a block diagram illustrating another example configuration of the information processing apparatus.

FIG. 28 is a block diagram illustrating another example configuration of the information processing apparatus 1.

In the configuration illustrated in FIG. 28, elements that are the same as or similar to those illustrated in FIG. 1 are represented by the same numerals. Redundant description will be omitted as appropriate.

The configuration illustrated in FIG. 28 is different from the configuration of the information processing apparatus 1 illustrated in FIG. 1 in that a switching circuit 111 is provided before the multiplexed video signal generating circuit 41.

A synchronization signal of the video stream #1, a synchronization signal of the video stream #2, and an external synchronization signal that is a synchronization signal input from the outside separately from the above two synchronization signals are input to the switching circuit 111. The external synchronization signal is also supplied to the timing generating circuit 44.

The switching circuit 111 selects a desired synchronization signal among the synchronization signal of the video stream #1, the synchronization signal of the video stream #2, and the external synchronization signal, and outputs the selected synchronization signal to the multiplexed video signal generating circuit 41.

The multiplexed video signal generating circuit 41 generates a multiplexed video frame at a cycle defined by the synchronization signal supplied from the switching circuit 111, and outputs the data of the generated multiplexed video frame to the multiplexing circuit 42-1, together with the synchronization signal supplied from the switching circuit 111.

The timing generating circuit 44 generates a synchronization signal based on which the output timing of frame data of video and audio data of the individual streams is determined, in accordance with the external synchronization signal or the format of each stream of video and audio, and outputs the synchronization signal.

In this manner, a synchronization signal input from the outside can also be used by switching as a synchronization signal that defines the cycle at which a multiplexed video frame is generated.

Multiplexing Operation Using Multiplexed Video Frame for Input

Here, a method for multiplexing video data and audio data using a multiplexed video frame will be described. A delay of data can be reduced depending on the insertion position of the data.

First, multiplexing of a multiplexed video frame for input to the processor 43, which is performed by a multiplexing circuit 42, will be described.

Figure 29:
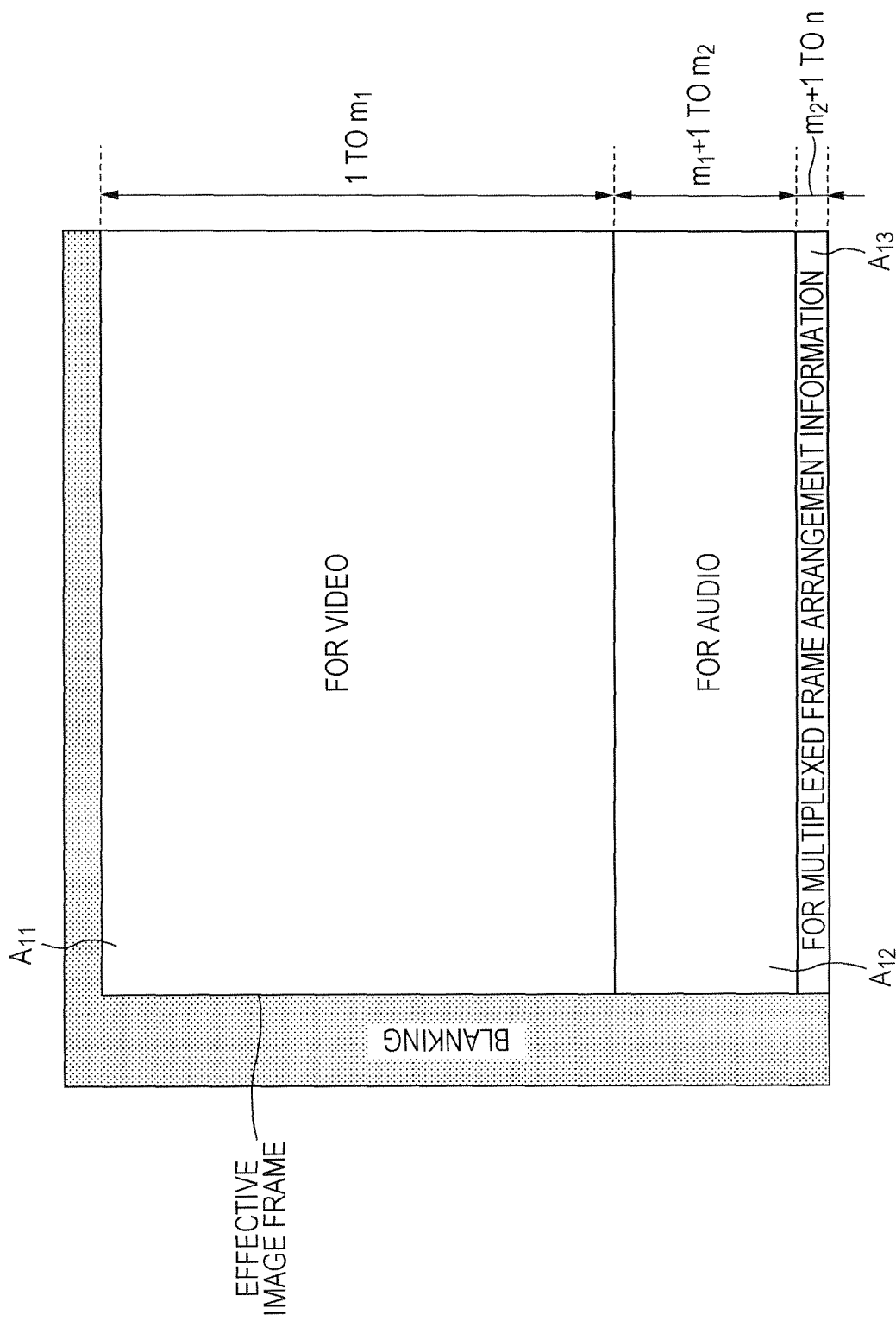
FIG. 29 is a diagram illustrating an example of the area configuration of a multiplexed video frame for input.

FIG. 29 is a diagram illustrating an example of the area configuration of a multiplexed video frame for input.

As illustrated in FIG. 29, a blanking region is provided so as to extend in the horizontal and vertical directions of the multiplexed video frame for input. In the example of FIG. 29, an area from the first line to the $m_1$-th line within an effective image frame is set as a video area $A_{11}$ that is an area for video. Further, an area from the $(m_1+1)$-th line to the $m_2$-th line within the effective image frame is defined as an audio area $A_{12}$ that is an area for audio. An area from the $(m_2+1)$-th line to the n-th line that is the last line is set as an area $A_{13}$ for multiplexed frame arrangement information.

In this manner, the video area $A_{11}$ is defined in the upper portion of the multiplexed video frame for input, and the audio area $A_{12}$ is defined below the video area $A_{11}$. When the multiplexed video frame for input is plotted on the time axis, processing is performed in the order from the upper portion of the multiplexed video frame for input to the lower portion.

Figure 30:
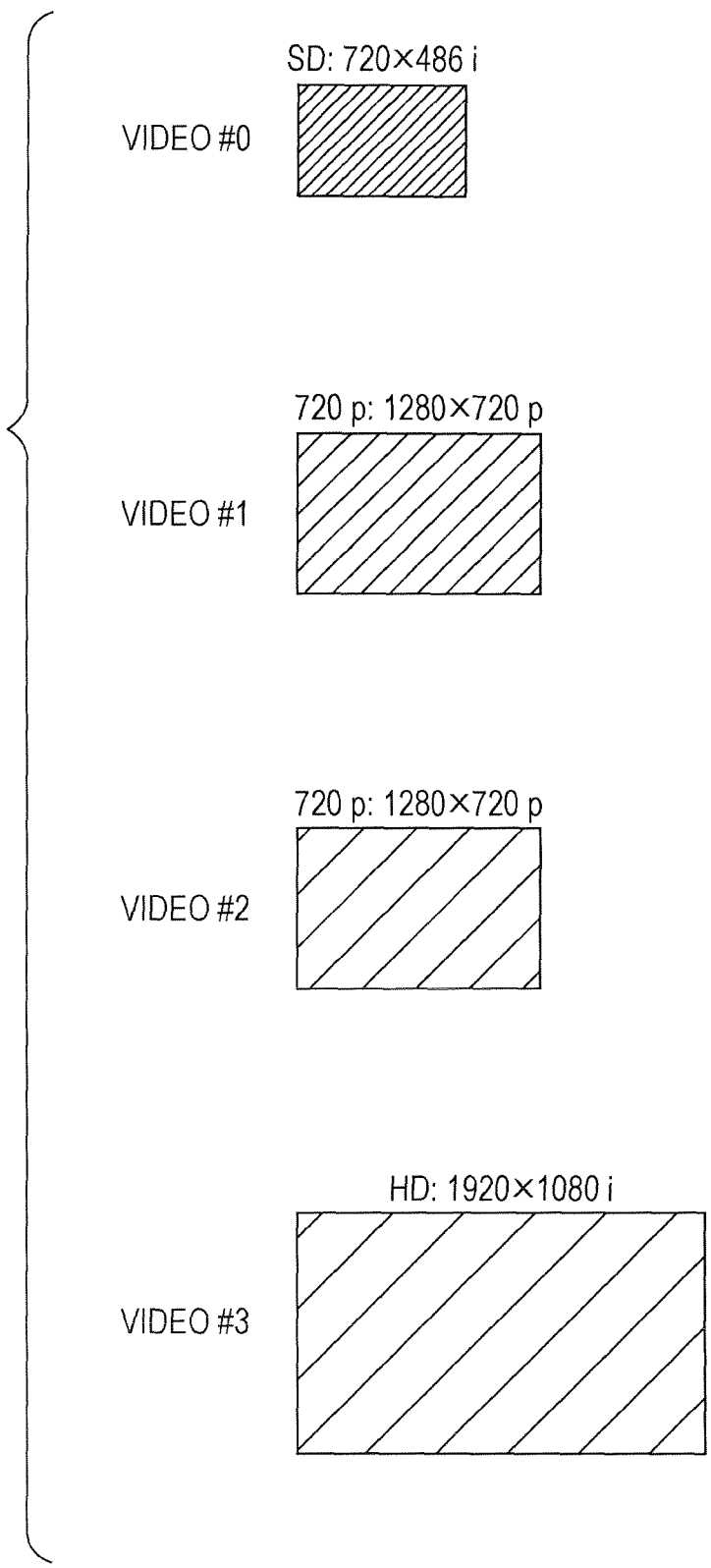
FIG. 30 is a diagram illustrating an example of video frames to be multiplexed.

FIG. 30 is a diagram illustrating an example of video frames to be attached to the multiplexed video frame for input illustrated in FIG. 29.

The following description will be given in the context of the multiplexing of four streams of video data, namely, video streams #0 to #3.

In the example of FIG. 30, the video stream #0 has a frame size of 720×486i (SD), and the video stream #1 has a frame size of 1280×720p (720p). Further, the video stream #2 has a frame size of 1280×720p (720p), which is the same as the frame size of video stream #1, and the video stream #3 has a frame size of 1920×1080i (HD).

A frame to be attached to the multiplexed video frame for input is divided into, for example, lines, and each line is attached to a different line on the multiplexed video frame for input.

Further, the data of frames to be attached are attached so as not to overlap each other and so as to be interleaved. Interleaving is a method for arranging lines of the same frame in a non-contiguous manner in the vertical direction on a multiplexed video frame for input.

The frames of the video streams #0 and #3 are interlaced frames. In the video streams #0 and #3, actually, lines forming one field are attached to one multiplexed video frame for input. In the following description, however, it is assumed that frames are attached.

Figure 31:
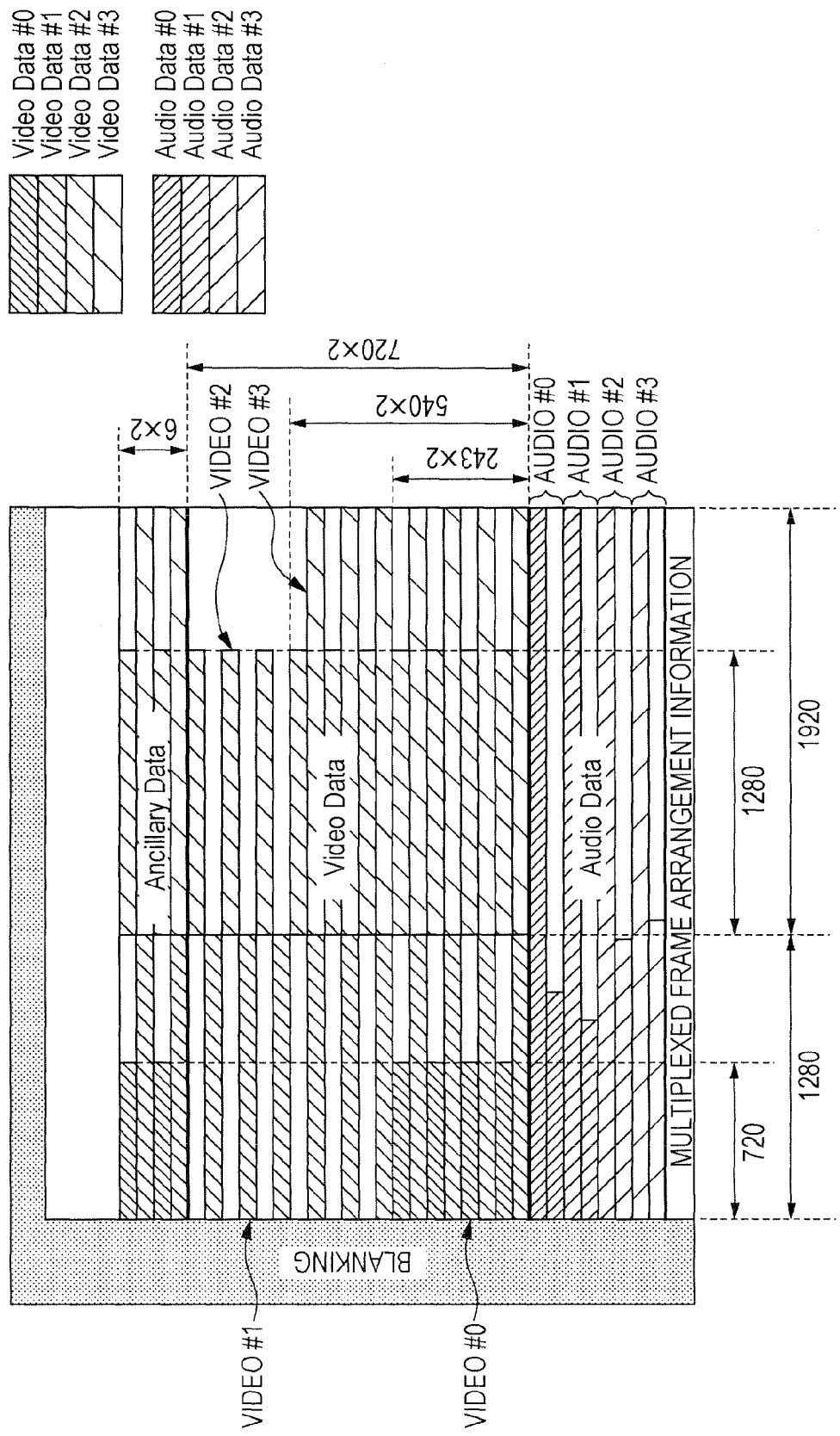
FIG. 31 is a diagram illustrating an example of a multiplexed video frame in which data is inserted from bottom to top.

FIG. 31 is a diagram illustrating an example of a multiplexed video frame for input, which is obtained after multiplexing by a multiplexing circuit 42.

In the example of FIG. 31, the lines of the frame of the video stream #0 are inserted in the horizontal direction within a range of 720 pixels to the right from the left end of the effective image frame, and are inserted in the vertical direction within a range of 243×2 lines upward from the $m_1$-th line, which is the last line of the video area $A_{11}$. The number of lines in one field, i.e., 243 lines, are inserted every other line although, in FIG. 31, four lines are illustrated as lines of the frame of the video stream #0.

In the example of FIG. 31, furthermore, the lines of the frame of the video stream #1 are inserted in the horizontal direction within a range of 1280 pixels to the right from the left end of the effective image frame, and are inserted in the vertical direction within a range of 720×2 lines upward from the $m_1$-th line, which is the last line of the video area $A_{11}$. The number of lines of one frame, i.e., 720 lines, are inserted every other line so as not to overlap the lines of the frame of the video stream #0 although, in FIG. 31, ten lines are illustrated as lines of the frame of the video stream #1.

The lines of the frame of the video stream #2 are inserted in the horizontal direction within a range of 1280 pixels to the right from the 1281st pixel, where the pixel at the left end of the effective image frame is used as the first pixel. Further, the lines of the frame of the video stream #2 are inserted in the vertical direction within a range of 720×2 lines upward from the $m_1$-th line, which is the last line of the video area $A_{11}$. The number of lines of one frame, i.e., 720 lines, are inserted every other line although, in FIG. 31, ten lines are illustrated as lines of the frame of the video stream #2.

The lines of the frame of the video stream #3 are inserted in the horizontal direction within a range of 1920 pixels to the right from the 1281st pixel, where the pixel at the left end of the effective image frame is used as the first pixel. Further, the lines of the frame of the video stream #3 are inserted in the vertical direction within a range of 540×2 lines upward from the $m_1$-th line, which is the last line of the video area $A_{11}$. The number of lines in one field, i.e., 540 lines, are inserted every other line so as not to overlap the lines of the frame of the video stream #2 although, in FIG. 31, seven lines are illustrated as lines of the frame of the video stream #3.

In the illustrated example, the number of pixels per horizontal line of the effective image frame of the multiplexed video frame for input is set to 3200 pixels (1280+1920 pixels).

Above the area where the lines of the respective frames have been inserted, the ancillary data of the corresponding video streams are inserted in the multiplexed video frame so as to be interleaved in a manner similar to that of the lines of the individual frames.

The same process as that for the frame data is not performed on the ancillary data. For example, if 4:2:2 to 4:4:4 conversion and YCbCr to RGB conversion is performed on the ancillary data in a manner similar to that for the frame data, the ancillary data may be broken. Thus, the ancillary data and the frame data are separately input to the processor 43. As illustrated in FIG. 31, the separate insertion of the ancillary data and the frame data into the video area $A_{11}$ can prevent the ancillary data from being broken.

As illustrated in FIG. 31, furthermore, the audio data of the audio streams #0 to #3 are inserted tightly into the audio area $A_{12}$ of the multiplexed video frame for input, in the order input to the information processing apparatus 1, starting from the left end of each line.

In the example of FIG. 31, the ($m_1$+1)-th line, which is the start position of the audio area $A_{12}$, and the ($m_1$+2)-th line are allocated to the audio data of the audio stream #0. The audio data of the audio stream #0 is inserted into the ($m_1$+1)-th line and the ($m_1$+2)-th line in such a manner that the entirety of the ($m_1$+1)-th line and up to the middle of the ($m_1$+2)-th line are filled with the audio data.

Further, the ($m_1$+3)-th line and the ($m_1$+4)-th line are allocated to the audio data of the audio stream #1. The audio data of the audio stream #1 is inserted into the ($m_1$+3)-th line and the ($m_1$+4)-th line in such a manner that the entirety of the ($m_1$+3)-th line and up to the middle of the ($m_1$+4)-th line are filled with the audio data.

The ($m_1$+5)-th line and the ($m_1$+6)-th line are allocated to the audio data of the audio stream #2. The audio data of the audio stream #2 is inserted into the ($m_1$+5)-th line and the ($m_1$+6)-th line in such a manner that the entirety of the ($m_1$+5)-th line and up to the middle of the ($m_1$+6)-th line are filled with the audio data.

The ($m_1$+7)-th line and the ($m_1$+8)-th line (the $m_2$-th line) are allocated to the audio data of the audio stream #3. The audio data of the audio stream #3 is inserted into the ($m_1$+7)-th line and the ($m_1$+8)-th line in such a manner that the entirety of the ($m_1$+7)-th line and up to the middle of the ($m_1$+8)-th line are filled with the audio data.

The size of the audio data to be inserted into the multiplexed video frame for input is determined using the data rate of the audio data to be processed by the individual multiplexing circuits 42, the frame frequency (one frame period) of the multiplexed video frame for input, and the like.

Therefore, the number of lines to be allocated as the number of lines in which each stream of audio data is to be inserted can be determined after the format of each stream of audio data has been detected. In the example of FIG. 31, two lines are allocated to each stream of audio data.

For example, the number of lines of the audio area $A_{12}$ may be set so as to be the same as the sum of lines allocated to each stream of audio data. Also in the example of FIG. 31, the number of lines of the audio area $A_{12}$ is set accordingly.

As described above, the frames to be attached are interleaved line by line of a frame so as not to overlap each other, and are attached from bottom to top in the video area $A_{11}$ of the multiplexed video frame for input. Further, each piece of audio data to be inserted is inserted into the audio area $A_{12}$ defined below the video area $A_{11}$ using, for example, the whole lines of the audio area $A_{12}$. The multiplexed frame arrangement information is inserted into the area $A_{13}$ defined below the audio area $A_{12}$.

As viewed in the entire multiplexed video frame for input, each stream of data is arranged from bottom to top.

Therefore, even when a plurality of streams of data are multiplexed using a multiplexed video frame for input and are input to the processor 43, the input delay can be reduced. The input delay is represented by the difference between the time at which the data to be processed by the processor 43 is input to the information processing apparatus 1 and the time at which the data is input to the processor 43.

Figure 32:
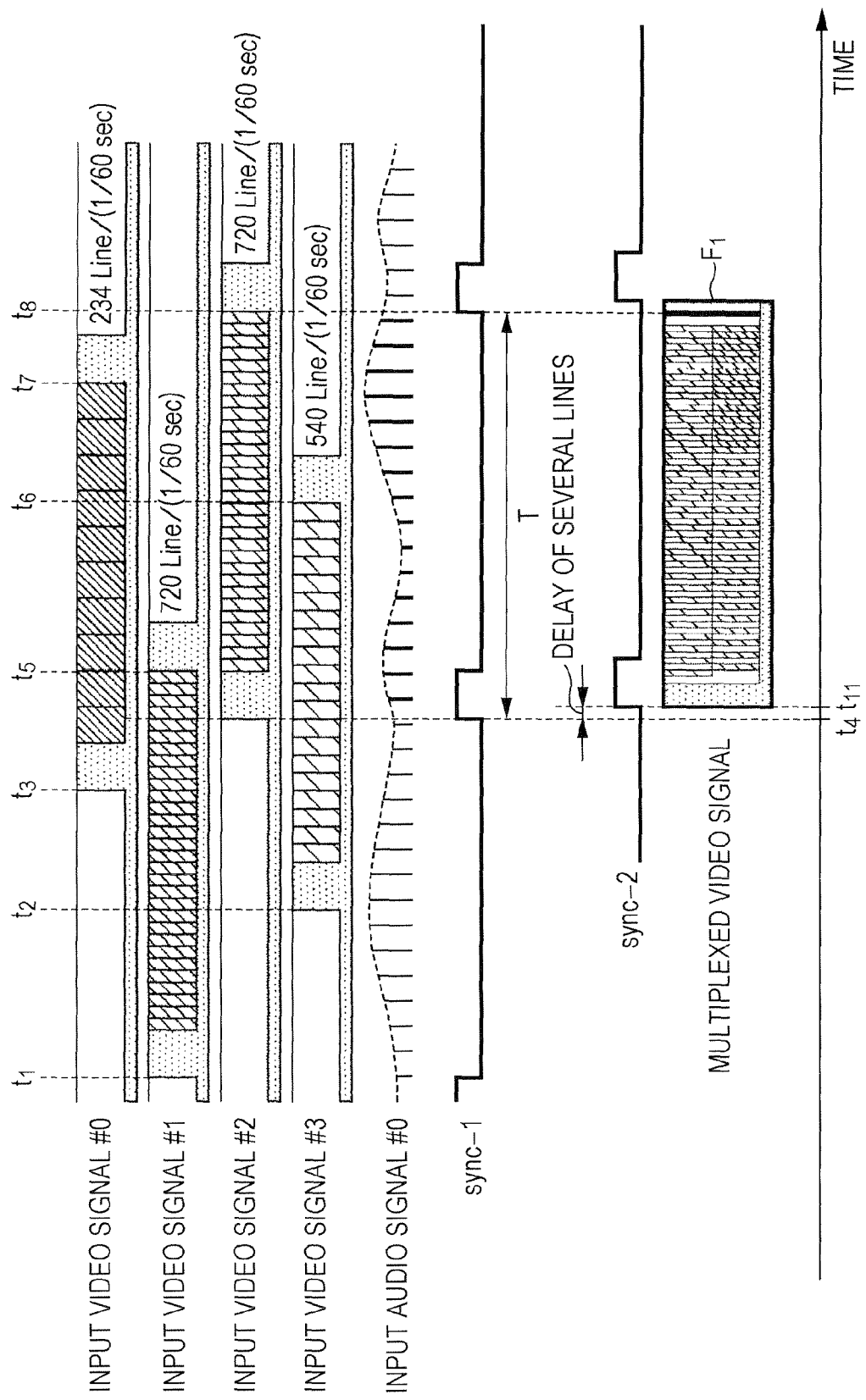
FIG. 32 is a diagram illustrating an example of the advantages of bottom-to-top arrangement.

FIG. 32 is a diagram illustrating the advantages of bottom-to-top arrangement. In FIG. 32, the abscissa represents time.

In the example of FIG. 32, the video data (input video signals) of the video streams #0 to #3 are input at different timings.

For example, the data of one frame of the video stream #0 is input to the information processing apparatus 1 at the timing of time $t_3$ to time $t_7$. Further, the data of one frame of the video stream #1 is input to the information processing apparatus 1 at the timing of time $t_1$ to time $t_5$.

The data of one frame of the video stream #2 is input to the information processing apparatus 1 at the timing of time $t_4$ to time $t_8$. The data of one frame of the video stream #3 is input to the information processing apparatus 1 at the timing of time $t_2$ to time $t_6$.

For example, for video, a video frame for which the data of the last line is input within the period of one frame of the multiplexed video frame for input is attached to a multiplexed video frame for input that is generated during the same period.

Therefore, in this case, the frames of the video streams #0 to #3, which are indicated by hatching in the respective lines in FIG. 32, are multiplexed into a multiplexed video frame $F_1$ that is a multiplexed video frame (multiplexed video signal) for input generated during a period of time T from time $t_4$ to time $t_8$.

The data of the last line of the frame of the video stream #0, which is indicated by hatching in the respective line, is input at a time immediately before the time $t_7$ within the period of time T. Similarly, the data of the last line of the frames of the video streams #1 to #3, which are indicated by hatching in the respective lines, is input at a time within the period of time T.

For audio, as described above, audio samples input during the period of one frame of the multiplexed video frame for input are inserted into a multiplexed video frame for input that is generated during the same period.

Therefore, in the example of FIG. 32, audio samples that are indicated by bold lines, which are included in the period of time T, among the audio samples of the audio stream #0 are inserted into the multiplexed video frame $F_1$. While in FIG. 32, only the audio stream #0 is illustrated, the other streams of audio data are also inserted into the multiplexed video frame $F_1$ in a similar manner.

The period of one frame of the multiplexed video frame for input is defined by a synchronization signal generated by the multiplexed video signal generating circuit 41. In FIG. 32, a synchronization signal sync-1 represents a synchronization signal generated by the multiplexed video signal generating circuit 41.

In the example of FIG. 32, the synchronization signal sync-1 is synchronized with the synchronization signal for the video stream #2. As described with reference to FIG. 28, a video synchronization signal input from the outside may also be used as a synchronization signal for defining one frame period of a multiplexed video frame for input.

A synchronization signal sync-2 represents a synchronization signal for defining one frame period of the multiplexed video frame for input, which is output from the multiplexing circuit 42 in the last stage that outputs the multiplexed video frame for input to the processor 43. In accordance with the synchronization signal sync-2, the multiplexed video frame for input in which each stream of data has been multiplexed is output from the multiplexing circuit 42 in the last stage to the processor 43. In the example of FIG. 1, the multiplexing circuit 42-4 serves as the multiplexing circuit in the last stage.

Each of the multiplexing circuits 42 performs multiplexing after waiting for the input of data to be multiplexed. There is a difference between the time at which a multiplexed video frame for input is input from the multiplexed video signal generating circuit 41 or from the multiplexing circuit 42 in the preceding stage and the time at which the multiplexed video frame for input obtained after multiplexing by multiplexing data into the multiplexed video frame for input is output from a certain multiplexing circuit 42, in accordance with the time at which the last data item of the data to be multiplexed is input. Here, it is assumed that the time involved for the video receiving circuits 21 or the audio receiving circuits 31 to receive data or the time involved for the frame memories 23 or the memories 33 to temporarily store data is negligible.

The timings (the time of a value of 1) of the synchronization signals sync-1 and sync-2 which are close to each other mean a small difference between the time at which a multiplexed video frame for input is output from the multiplexed video signal generating circuit 41 and the time at which a multiplexed video frame for input obtained after multiplexing is input to the processor 43. In other words, the timings of the synchronization signals sync-1 and sync-2 which are close to each other mean that the input delay is reduced.

Based on this assumption, the bottom-to-top insertion of data into a multiplexed video frame for input will now be described.

The multiplexed video frame $F_1$ illustrated in FIG. 32 represents a multiplexed video frame for input obtained after multiplexing in which the respective data items have been inserted from bottom to top in the manner as described with reference to FIG. 31.

As illustrated in FIG. 32, when plotted on the time axis running from left to right, the video area $A_{11}$ is indicated in the left portion in the multiplexed video frame $F_1$, and the audio area $A_{12}$ in the right portion. In FIG. 32, a bold line in the right portion of the multiplexed video frame $F_1$ indicates the audio data of the audio stream #0 inserted in the audio area $A_{12}$.

The data of the last line of the frame of the video stream #0 to be attached to the multiplexed video frame $F_1$ can be inserted after the time immediately before the time $t_7$ at which the data is input. If the data of the last line of the frame of the video stream #0 is to be inserted into the upper portion (earlier in time) of the video area $A_{11}$ of the multiplexed video frame $F_1$, the time of the line of the multiplexed video frame $F_1$, which corresponds to the insertion position, may be later than the time $t_7$. As an image, the entire multiplexed video frame $F_1$ is at a position to the right relative to the position illustrated in FIG. 32.

Therefore, in order to reduce the input delay, it is preferable that the data of the last line of the frame of the video stream #0 be inserted at a position corresponding to a time later than the time immediately before the time $t_7$ of the multiplexed video frame $F_1$. The data input before the time at which the data is actually inserted is stored in a memory until the insertion time.

Further, the data of the last line of the frame of the video stream #2 to be multiplexed into the multiplexed video frame $F_1$ can be inserted after the time immediately before the time $t_8$ at which the data is input (including the time immediately before the time $t_8$). If the data of the last line of the frame of the video stream #2 is to be inserted into the upper portion of the video area $A_{11}$ of the multiplexed video frame $F_1$, the time of the line of the multiplexed video frame $F_1$, which corresponds to the insertion position, may be later than the time immediate before the time $t_8$. As an image, the entire multiplexed video frame $F_1$ is at a position to the right relative to the position illustrated in FIG. 32.

Therefore, in order to reduce the input delay, it is preferable that the data of the last line of the frame of the video stream #2 be inserted at a position of the multiplexed video frame $F_1$ corresponding to a time later than the time immediately before the time $t_8$.

The same applies to the data of the last line of the frames of the video streams #1 and #3.

The data of the audio samples of the audio stream #0 to be inserted into the multiplexed video frame $F_1$ and the number-of-samples information are determined by the synchronization signal sync-1. After the time $t_8$ (including the time $t_8$) that is the end time of the period of time T, the audio data of the audio stream #0 can be inserted.

If the audio data of the audio stream #0 is to be inserted into the area defined in the upper portion of the multiplexed video frame $F_1$, the time of the line of the multiplexed video frame $F_1$, which corresponds to the insertion position, may be later than the time $t_8$. As an image, the entire multiplexed video frame $F_1$ is at a position to the right relative to the position illustrated in FIG. 32.

Therefore, in order to reduce the input delay, it is preferable that the audio data of the audio stream #0 be inserted at a position corresponding to a time later than the time $t_8$ of the multiplexed video frame $F_1$.

For the multiplexed frame arrangement information, furthermore, the time at which information included therein, for example, the number-of-samples information, is allowed to be inserted may be a time after the number of samples to be multiplexed into the multiplexed video frame has been determined. Therefore, if the multiplexed frame arrangement information is collectively inserted, the number-of-samples information is preferably inserted at a position corresponding to the time after the time $t_8$ at which the number of samples to be multiplexed is determined.

Accordingly, frames of video data of individual video streams are interleaved line-by-line and are inserted from bottom to top in the video area $A_{11}$, and the audio data of each audio stream is inserted into the audio area $A_{12}$ defined below the video area $A_{11}$, so that the data of the entire multiplexed video frame for input can be arranged from bottom to top, thus allowing reduction in input delay. Further, the multiplexed frame arrangement information is inserted in the area $A_{13}$ defined below the audio area $A_{12}$.

In the example of FIG. 32, the input delay is reduced to the time corresponding to several lines, which is the difference between time $t_4$ and time $t_{11}$ at which the multiplexed video frame $F_1$ starts to be input to the processor 43.

As illustrated in FIG. 32, if the frame data of the video streams #0 to #3 are input at different timings, the video data of the stream for which the data of the last line is input earlier is processed by a multiplexing circuit 42 in an earlier stage. The video data of the stream for which the data of the last line is input later is processed by a multiplexing circuit 42 in a later stage. Therefore, as described above, the lines of the video frames can be inserted from bottom to top.

Further, the audio data is processed by a multiplexing circuit 42 in a later stage than the multiplexing circuits 42 that process the video data. Therefore, as described above, audio data can be inserted into the audio area $A_{12}$ defined in the lower portion of the multiplexed video frame for input.

Each piece of information included in the multiplexed frame arrangement information is supplied to the multiplexing circuit 42 in the last stage, and is collectively inserted into the multiplexed video frame by the multiplexing circuit 42 in the last stage. Therefore, the multiplexed frame arrangement information can be inserted into the area $A_{13}$ defined below the audio area $A_{12}$ of the multiplexed video frame for input.

The multiplexing circuits 42-1 to 42-4 illustrated in FIG. 1 may be integrated into a single circuit. The resulting single circuit may multiplex all the data items, without taking into account which stream of data and which multiplexing circuit 42 among the plurality of multiplexing circuits 42 connected in series in the manner as illustrated in FIG. 1 is to process that stream of data.

Multiplexing Operation Using Multiplexed Video Frame for Output

Next, a multiplexing operation using a multiplexed video frame for output will be described.

A multiplexed video frame for output has multiplexed therein each stream of data that has been extracted from the multiplexed video frame for input and that has been subjected to various processes. That is, the multiplexing of data (data obtained after processing) using a multiplexed video frame for output is performed by the processor 43.

In the processor 43, unlike the multiplexing operation using a multiplexed video frame for input, each stream of data is inserted from top to bottom.

Figure 33:
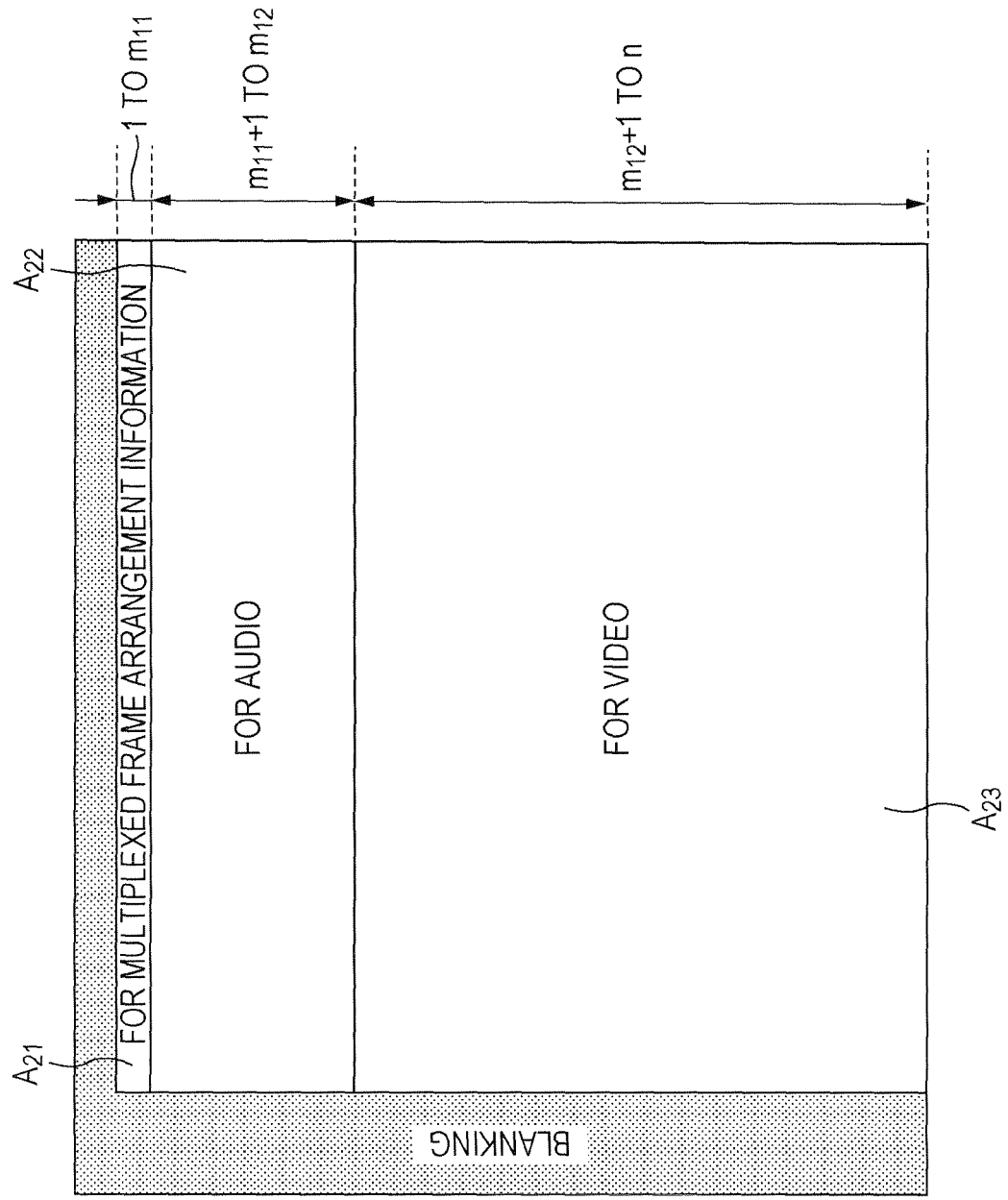
FIG. 33 is a diagram illustrating an example of the area configuration of a multiplexed video frame for output.

FIG. 33 is a diagram illustrating an example of the area configuration of a multiplexed video frame for output.

As illustrated in FIG. 33, the multiplexed video frame for output is provided with a blanking region in each of the horizontal and vertical directions. In the example of FIG. 33, an area from the first line to the $m_{11}$-th line within the effective image frame is defined as an area $A_{21}$ for multiplexed frame arrangement information. Further, an area from the $(m_{11}+1)$-th line to the $m_{12}$-th line within the effective image frame is defined as an audio area $A_{22}$ that is an area for audio. An area from the $(m_{12}+1)$-th line within the effective image frame to the n-th line that is the last line is defined as a video area $A_{23}$ for video.

In this manner, the audio area $A_{22}$ is defined in the upper portion of the multiplexed video frame for output, and the video area $A_{23}$ is defined below the audio area $A_{22}$.

Figure 34:
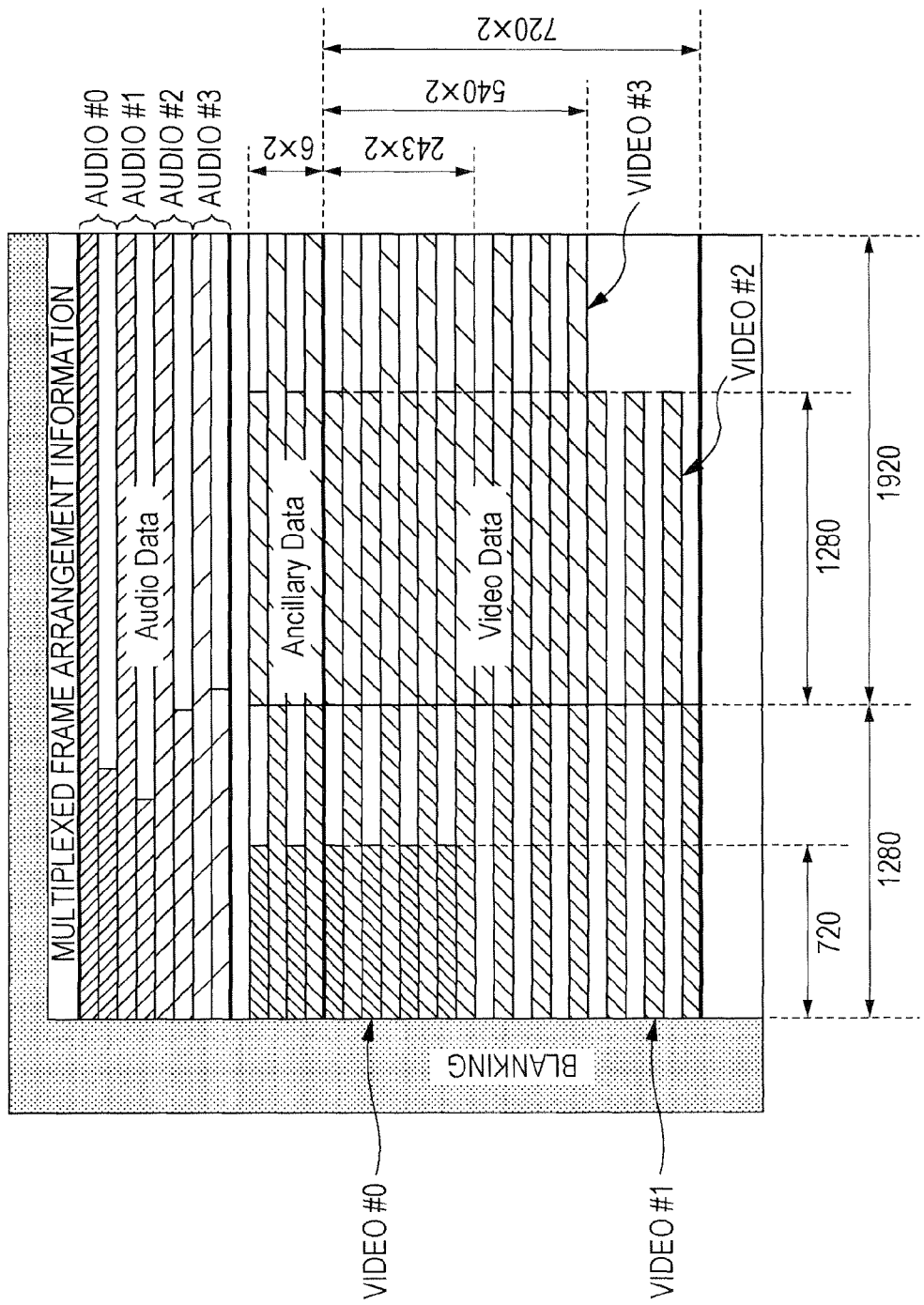
FIG. 34 is a diagram illustrating an example of a multiplexed video frame in which data is inserted from top to bottom.

FIG. 34 is a diagram illustrating an example of a multiplexed video frame for output, which is obtained after multiplexing by the processor 43.

When a multiplexed video frame for input is input, the processor 43 extracts the data of the frames of the video streams #0 to #3 and the audio data of the audio streams #0 to #3, and performs processing as desired. The data of the frames of the video streams #0 to #3 and the audio data of the audio streams #0 to #3, which have been subjected to processing as desired, are inserted into a multiplexed video frame for output.

As illustrated in FIG. 34, the multiplexed frame arrangement information is inserted into the area $A_{21}$ of the multiplexed video frame for output.

Further, the audio data of the audio streams #0 to #3 is inserted tightly into the audio area $A_{22}$ of the multiplexed video frame for output, starting from the left end of each line.

In the example of FIG. 34, the $(m_{11}+1)$-th line, which is the start position of the audio area $A_{22}$, and the $(m_{11}+2)$-th line are allocated to the audio data of the audio stream #0. The audio data of the audio stream #0 is inserted into the $(m_{11}+1)$-th line and the $(m_{11}+2)$-th line in such a manner that the entirety of the $(m_{11}+1)$-th line and up to the middle of the $(m_{11}+2)$-th line are filled with the audio data.

In the example of FIG. 34, furthermore, the $(m_{11}+3)$-th line and the $(m_{11}+4)$-th line are assigned to the audio data of the audio stream #1. The audio data of the audio stream #1 is inserted into the $(m_{11}+3)$-th line and the $(m_{11}+4)$-th line in such a manner that the entirety of the $(m_{11}+3)$-th line and up to the middle of the $(m_{11}+4)$-th line are filled with the audio data.

The $(m_{11}+5)$-th line and the $(m_{11}+6)$-th line are allocated to the audio data of the audio stream #2. The audio data of the audio stream #2 is inserted into the $(m_{11}+5)$-th line and the $(m_{11}+6)$-th line in such a manner that the entirety of the $(m_{11}+5)$-th line and up to the middle of the $(m_{11}+6)$-th line are filled with the audio data.

The $(m_{11}+7)$-th line and the $(m_{11}+8)$-th line (the $m_{12}$-th line) are allocated to the audio data of the audio stream #3. The audio data of the audio stream #3 is inserted into the $(m_{11}+7)$-th line and the $(m_{11}+8)$-th line in such a manner that the entirety of the $(m_{11}+7)$-th line and up to the middle of the $(m_{11}+8)$-th line are filled with the audio data.

For example, the number of lines of the audio area $A_{22}$ may be set so as to be the same as the sum of lines allocated to each stream of audio data. Also in the example of FIG. 34, the number of lines of the audio area $A_{22}$ is set accordingly.

Further, the frames to be attached are interleaved line by line of a frame so as not to overlap each other, and are attached subsequently to the ancillary data from top to bottom in the video area $A_{23}$ of the multiplexed video frame for output.

In the example of FIG. 34, the lines of the frame of the video stream #0 are inserted in the horizontal direction within a range of 720 pixels to the right from the left end of the effective image frame. Further, the lines of the frame of the video stream #0 are inserted in the vertical direction within a range of 243×2 lines downward from the line subsequent to the last line of the ancillary data inserted in the video area $A_{23}$. The number of lines in one field, i.e., 243 lines, are inserted every other line although, in FIG. 34, four lines are illustrated as lines of the frame of the video stream #0.

Further, the lines of the frame of the video stream #1 are inserted in the horizontal direction within a range of 1280 pixels to the right from the left end of the effective image frame, and are inserted in the vertical direction within a range of 720×2 lines downward from the line subsequent to the last line of the ancillary data inserted in the video area $A_{23}$. The number of lines of one frame, i.e., 720 lines, are inserted every other line so as not to overlap the lines of the frame of the video stream #0 although, in FIG. 34, ten lines are illustrated as lines of the frame of the video stream #1.

The lines of the frame of the video stream #2 are inserted in the horizontal direction within a range of 1280 pixels to the right from the 1281st pixel, where the pixel at the left end of the effective image frame is used as the first pixel. Further, the lines of the frame of the video stream #2 are inserted in the vertical direction within a range of 720×2 lines downward from the line subsequent to the last line of the ancillary data inserted in the video area $A_{23}$. The number of lines of one frame, i.e., 720 lines, are inserted every other line although, in FIG. 34, ten lines are illustrated as lines of the frame of the video stream #2.

The lines of the frame of the video stream #3 are inserted in the horizontal direction within a range of 1920 pixels to the right from the 1281st pixel, where the pixel at the left end of the effective image frame is used as the first pixel. Further, the lines of the frame of the video stream #3 are inserted in the vertical direction within a range of 540×2 lines downward from the line subsequent to the last line of the ancillary data inserted in the video area $A_{23}$. The number of lines in one field, i.e., 540 lines, are inserted every other line so as not to overlap the lines of the frame of the video stream #2 although, in FIG. 34, seven lines are illustrated as lines of the frame of the video stream #3.

In the illustrated example, the number of pixels per horizontal line of the effective image frame of the multiplexed video frame for output is also set to 3200. The size of the multiplexed video frame for input may be made different from the size of the multiplexed video frame for output.

In this manner, as viewed in the entire multiplexed video frame for output, each stream of data is inserted from top to bottom.

Therefore, even when a plurality of streams of data are multiplexed using a multiplexed video frame for output and are output from the processor 43, the output delay can be reduced. The output delay is represented by the difference between the time at which data obtained after processing is output from the processor 43 and the time at which the data obtained after processing is output to the outside of the information processing apparatus 1.

Figure 35:
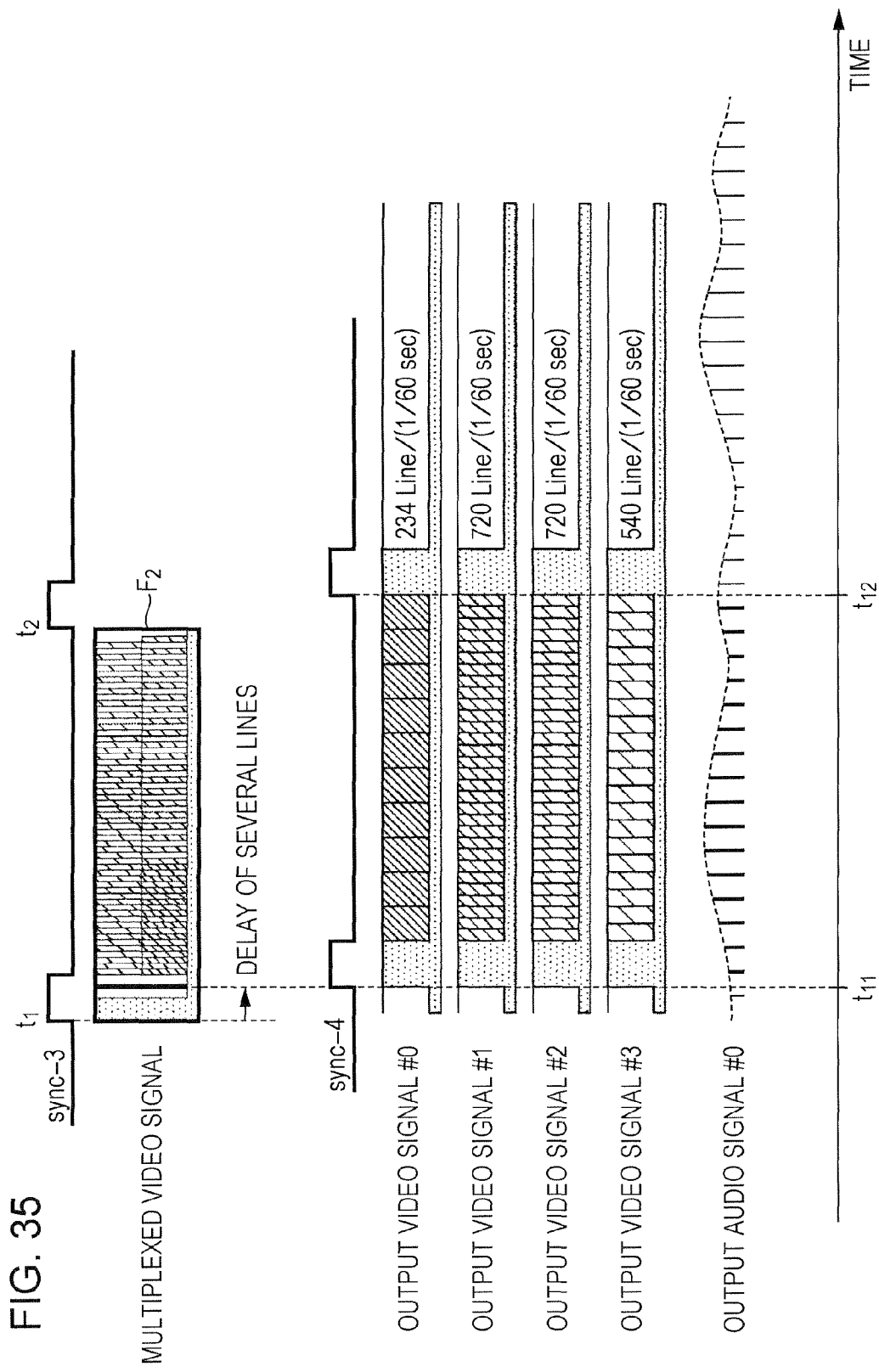
FIG. 35 is a diagram illustrating the advantages of top-to-bottom arrangement.

FIG. 35 is a diagram illustrating the advantages of top-to-bottom arrangement. In FIG. 35, the abscissa represents time.

A multiplexed video frame $F_2$ illustrated in FIG. 35 represents a multiplexed video frame for output that is output from the processor 43. A synchronization signal sync-3 is a synchronization signal output from the processor 43, and defines one frame period of the multiplexed video frame $F_2$. The multiplexed video frame $F_2$ is output from the processor 43 during a period of time from time $t_1$ to time $t_2$.

The data of the frames of the video streams #0 to #3, which are indicated by hatching in the respective lines, represents data (output video signals) that have been extracted from the multiplexed video frame $F_2$ and that have been output from the video transmitting circuit 53 to the outside of the information processing apparatus 1. Further, the data of the audio samples of the audio stream #0, which is indicated by a bold line, represents data (output audio signals) that have been extracted from the multiplexed video frame $F_2$ and that have been output from the audio transmitting circuit 63 to the outside of the information processing apparatus 1.

For example, data multiplexed in the same multiplexed video frame for output is output to the outside of the information processing apparatus 1 at the same timing in accordance with the synchronization signal output from the timing generating circuit 44.

A synchronization signal sync-4 illustrated in FIG. 35 is a synchronization signal that is generated by the timing generating circuit 44 and that is supplied to the video transmitting circuits 53 and the audio transmitting circuits 63. Each stream of data extracted from the multiplexed video frame $F_2$ is output to the outside of the information processing apparatus 1 during a period of time from time $t_{11}$ to time $t_{12}$.

In each of the video transmitting circuits 53, after the data of a frame to be output is extracted from the multiplexed video frame for output, the data can be output.

Further, in each of the audio transmitting circuits 63, after the data of audio samples to be output is extracted from the multiplexed video frame for output, the data can be output.

If data multiplexed in the same multiplexed video frame for output is output at the same timing, in order to allow the video transmitting circuits 53 and the audio transmitting circuits 63 to output the data, all the video transmitting circuits 53 and the audio transmitting circuits 63 receive data to be output, which has been extracted from the same multiplexed video frame for output.

There is a difference between the time at which a multiplexed video frame for output is output from the processor 43 and the time at which the data is output to the outside, in accordance with the time at which the top data among the data to be output is input to each of the video transmitting circuits 52 and each of the audio transmitting circuits 63. Here, it is assumed that the time involved for the extraction circuits 45 to extract data or the time involved for the frame memories 52 or the memories 62 to temporarily store data is negligible.

The timings (the time of a value of 1) of the synchronization signals sync-3 and sync-4 which are close to each other mean a small difference between the time at which a multiplexed video frame for output is output from the processor 43 and the time at which each stream of data is output to the outside. In other words, the timings of the synchronization signals sync-3 and sync-4 which are close to each other mean that the output delay is reduced.

Based on this assumption, the top-to-bottom insertion of data into a multiplexed video frame for output will now be described.

The multiplexed frame arrangement information is information including information used for the extraction of each stream of video data and audio data. Therefore, if the multiplexed frame arrangement information has not been extracted from the multiplexed video frame, it may be difficult to extract each stream of video data and audio data. In order to reduce the output delay, it is preferable that the multiplexed frame arrangement information be inserted at a position ahead of the multiplexed video frame for output.

For audio data, if audio data is to be inserted in an area defined in the lower portion of the multiplexed video frame $F_2$, the start time of the output of the audio data of the audio stream #0 may be later than the time corresponding to the insertion position.

As an image, the output timing of the audio stream #0 may be at a position to the right relative to the position illustrated in FIG. 35. Since data extracted from the same multiplexed video frame for output is output at the same timing, the output timings of the video streams #0 to #3 are also at a position to the right relative to the position illustrated in FIG. 35.

Therefore, in order to reduce the output delay, it is preferable that the audio data of the audio stream #0 be inserted at a position early in the multiplexed video frame for output.

Furthermore, it is assumed that frames of individual video streams are interleaved line-by-line and are inserted from bottom to top in a multiplexed video frame for output. In this case, the output time of the data of the top line of the frame of the video stream #0 may be later than the time corresponding to the insertion position. In particular, the smaller the total number of lines of the frame of the video stream #0, the later the output time.

As an image, the output timing of the video stream #0 is at a position to the right relative to the position illustrated in FIG. 35. Since data extracted from the same multiplexed video frame for output is output at the same timing, the output timings of the video streams #1 to #3 and the output timing of the audio stream #0 are also at positions to the right relative to the positions illustrated in FIG. 35.

Therefore, in order to reduce the output delay, it is preferable that the data of the top line of the frame of the video stream #0 be inserted at an upper position in the upper portion of the video area $A_{23}$ of the multiplexed video frame $F_2$. The same applies to the video streams #1 to #3.

As can be seen from above, audio data of individual audio streams is inserted into the audio area $A_{22}$ defined in the upper portion of a multiplexed video frame for output, and, for video data of individual video streams, frames are interleaved line-by-line and are inserted from top to bottom in the video area $A_{23}$ defined below the audio area $A_{22}$ so that, as the entire multiplexed video frame for output, data can be arranged from top to bottom. Therefore, the output delay can be reduced.

In the example of FIG. 35, the output delay is reduced to the time corresponding to several lines, which is the difference between the time $t_1$ at which the multiplexed video frame $F_2$ starts to be output from the processor 43 and the time $t_{11}$ at which the data starts to be output to the outside.

Other Exemplary Modifications

In the foregoing description, the processor 43 has a one-input and one-output video port. However, multiple inputs and multiple outputs may be provided. A multiplexed video frame is input/output using each video port, thus enabling a larger number of streams of data to be input to the processor 43 and enabling data obtained after processing to be output from the processor 43.

Furthermore, a compressed bit stream may also be used as video data and audio data to be input to the information processing apparatus 1. In addition, not only video data and audio data but also data having a special size may be transmitted using a multiplexed video signal, and may be input to the processor 43 or output from the processor 43. For example, planar (color-based) transmission or multi-color (such as six-color or eight-color) transmission can also be implemented.

In the foregoing description, mainly, input video data and a multiplexed video frame are processed frame-by-frame. However, processing may also be performed field-by-field. In the foregoing description, the term "frame" may be replaced by the term "field".

Example Configuration of Computer

The series of processes described above may be executed by hardware or software. If the series of processes is executed by software, a program constituting the software may be installed from a program recording medium into a computer incorporated in dedicated hardware, a general-purpose personal computer, or the like.

Figure 36:
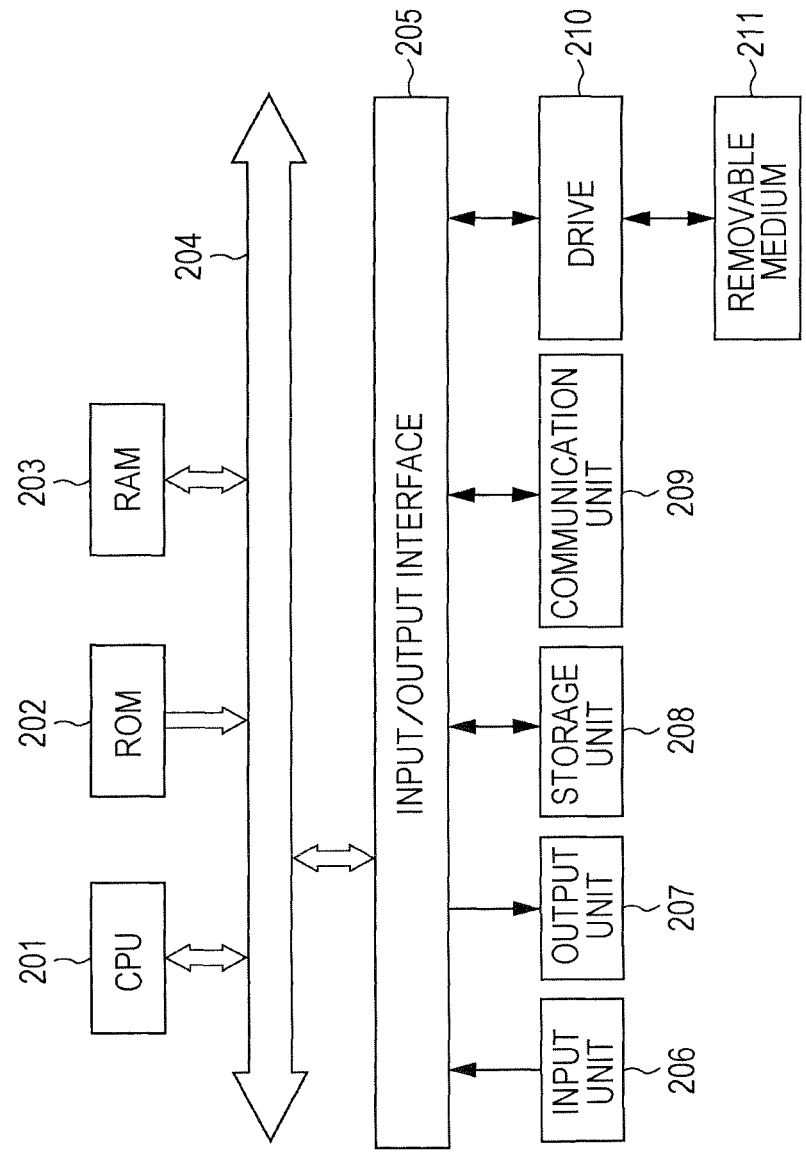
FIG. 36 is a block diagram illustrating an example configuration of a computer.

FIG. 36 is a block diagram illustrating an example configuration of hardware of a computer that executes the series of processes described above in accordance with a program.

A central processing unit (CPU) 201, a read only memory (ROM) 202, and a random access memory (RAM) 203 are connected to one another via a bus 204.

An input/output interface 205 is also connected to the bus 204. The input/output interface 205 is connected to an input unit 206 including a keyboard and a mouse, and an output unit 207 including a display and speakers. The input/output interface 205 is also connected to a storage unit 208 including a hard disk and a non-volatile memory, a communication unit 209 including a network interface, and a drive 210 that drives a removable medium 211.

In the computer having the above configuration, the CPU 201 loads a program stored in, for example, the storage unit 208 into the RAM 203 via the input/output interface 205 and the bus 204, and executes the program, thereby performing the series of processes described above.

The program executed by the CPU 201 may be provided in the form recorded on, for example, the removable medium 211 or via a wired or wireless transmission medium such as a local area network, the Internet, or digital broadcasting, and may be installed into the storage unit 208.

The program executed by the computer may be a program according to which processes are performed in a time-series manner in the order described herein, or may be a program according to which processes are performed in parallel or at a necessary timing such as when called.

Embodiments of the present invention are not limited the embodiments described above, and a variety of modifications can be made without departing from the scope of the present invention.

The present application contains subject matter related to that disclosed in Japanese Priority Patent Application JP 2010-006137 filed in the Japan Patent Office on Jan. 14, 2010 and Japanese Priority Patent Application JP 2010-006138 filed in the Japan Patent Office on Jan. 14, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   generating means for generating a multiplexed video frame that is a video frame having a predetermined screen size, and for inserting first information into the multiplexed video frame, the first information being information regarding a configuration of the multiplexed video frame;
   first multiplexing means for arranging one frame included in input video data in the multiplexed video frame, for multiplexing data of the frame so as to be transmitted as data of the multiplexed video frame corresponding to an arrangement position of the frame, and for inserting second information and third information into a multiplexed video frame obtained after multiplexing, the second information being information regarding the arrangement position of the frame, the third information being information regarding a format of the video data; and processing means for extracting the data of the frame multiplexed in the multiplexed video frame obtained after multiplexing, the multiplexed video frame obtained after multiplexing being input to the processing means from an input video port thereof, in accordance with the first information, the second information, and the third information, and for performing processing on the extracted data.

2. The information processing apparatus according to claim 1, further comprising:

dividing means for dividing input audio data into audio data items, each having samples input during a period of time corresponding to a period of one frame of the multiplexed video frame, in order, starting from a top sample of the audio data; and second multiplexing means for arranging each of the audio data items obtained through division by the dividing means in the multiplexed video frame, for multiplexing the audio data item so as to be transmitted as data of the multiplexed video frame corresponding to an arrangement position of the audio data item, and for inserting fourth information, fifth information, and sixth information into the multiplexed video frame, the fourth information being information representing the number of samples included in the audio data item, the fifth information being information regarding the arrangement position of the audio data item, the sixth information being information regarding a format of the audio data, wherein the processing means extracts the audio data items obtained through division, which are multiplexed in the multiplexed video frame obtained after multiplexing, in accordance with the first information, the fourth information, the fifth information, and the sixth information, and performs processing on the extracted data items.

3. The information processing apparatus according to claim 2, wherein the first multiplexing means divides one frame of each of a plurality of formats of the video data into lines, arranges the frame in the multiplexed video frame so that the lines of the frame are arranged from bottom to top in a first video area provided in the multiplexed video frame, in such a manner that the lines of the same frame are not consecutive, and multiplexes data of the frames of the plurality of formats.

4. The information processing apparatus according to claim 3, wherein the second multiplexing means multiplexes the audio data items obtained through division so as to be transmitted as data in a first audio area provided below the first video area of the multiplexed video frame.

5. The information processing apparatus according to claim 4, wherein the processing means divides each of the frames of the formats, which are obtained after processing, into lines, arranges the frames in the multiplexed video frame so that the lines of the frames are arranged from top to bottom in a second video area provided in the multiplexed video frame, in such a manner that the lines of the same frame are not consecutive, and multiplexes the frames so as to be transmitted as data of the multiplexed video frame corresponding to arrangement positions of the frames, wherein the processing means multiplexes the audio data items obtained through division, which are obtained after processing, so as to be transmitted as data in a second audio area provided above the second video area of the multiplexed video frame, and wherein the processing means outputs from an output video port thereof a multiplexed video frame in which data obtained after processing is transmitted.

6. The information processing apparatus according to claim 5, further comprising:

first extracting means for extracting data of each of the frames of the formats from the multiplexed video frame output from the processing means in accordance with the first information, the second information, and the third information; and first transmitting means for outputting the extracted data of each of the frames of the formats to outside after performing processing corresponding to the format based on the third information.

7. The information processing apparatus according to claim 6, further comprising:

second extracting means for extracting the audio data items obtained through division from the multiplexed video frame output from the processing means in accordance with the first information, the fourth information, the fifth information, and the sixth information; and second transmitting means for performing processing corresponding to the format based on the sixth information on the extracted audio data items obtained through division, and for outputting the audio data items obtained through division, on which the processing has been performed, to outside in order, starting from a top sample of the audio data items.

8. An information processing method comprising the steps of:

generating a multiplexed video frame that is a video frame having a predetermined screen size;

inserting first information into the multiplexed video frame, the first information being information regarding a configuration of the multiplexed video frame;

arranging one frame included in input video data in the multiplexed video frame;

multiplexing data of the frame so as to be transmitted as data of the multiplexed video frame corresponding to an arrangement position of the frame;

inserting second information and third information into a multiplexed video frame obtained after multiplexing, the second information being information regarding the arrangement position of the frame, the third information being information regarding a format of the video data;

extracting the data of the frame multiplexed in the multiplexed video frame obtained after multiplexing, the multiplexed video frame obtained after multiplexing being input from an input video port, in accordance with the first information, the second information, and the third information; and performing processing on the extracted data.

9. An information processing apparatus comprising:

generating means for generating a multiplexed video frame that is a video frame having a predetermined screen size, and for inserting information regarding continuity of the multiplexed video frame into the multiplexed video frame;

first multiplexing means for arranging one frame included in input video data in the multiplexed video frame, for multiplexing data of the frame so as to be transmitted as data of the multiplexed video frame corresponding to an arrangement position of the frame, and for inserting information regarding continuity of the frame into the multiplexed video frame;

dividing means for dividing input audio data into audio data items, each having samples input during a period of time corresponding to a period of one frame of the multiplexed video frame, in order, starting from a top sample of the audio data; and second multiplexing means for arranging each of the audio data items obtained through division by the dividing means in the multiplexed video frame, for multiplexing the audio data item so as to be transmitted as data of the multiplexed video frame corresponding to an arrangement position of the audio data item, and for inserting information representing the number of samples included in the audio data item and information regarding continuity into the multiplexed video frame.

10. An information processing apparatus comprising:

a generation unit configured to generate a multiplexed video frame that is a video frame having a predetermined screen size, and to insert first information into the multiplexed video frame, the first information being information regarding a configuration of the multiplexed video frame;

a first multiplexing unit configured to arrange one frame included in input video data in the multiplexed video frame, to multiplex data of the frame so as to be transmitted as data of the multiplexed video frame corresponding to an arrangement position of the frame, and to insert second information and third information into a multiplexed video frame obtained after multiplexing, the second information being information regarding the arrangement position of the frame, the third information being information regarding a format of the video data; and a processing unit configured to extract the data of the frame multiplexed in the multiplexed video frame obtained after multiplexing, the multiplexed video frame obtained after multiplexing being input to the processing unit from an input video port thereof, in accordance with the first information, the second information, and the third information, and to perform processing on the extracted data.

11. An information processing apparatus comprising:

a generation unit configured to generate a multiplexed video frame that is a video frame having a predetermined screen size, and to insert information regarding continuity of the multiplexed video frame into the multiplexed video frame;

a first multiplexing unit configured to arrange one frame included in input video data in the multiplexed video frame, to multiplex data of the frame so as to be transmitted as data of the multiplexed video frame corresponding to an arrangement position of the frame, and to insert information regarding continuity of the frame into the multiplexed video frame;

a dividing unit configured to divide input audio data into audio data items, each having samples input during a period of time corresponding to a period of one frame of the multiplexed video frame, in order, starting from a top sample of the audio data; and a second multiplexing unit configured to arrange each of the audio data items obtained through division by the dividing unit in the multiplexed video frame, to multiplex the audio data item so as to be transmitted as data of the multiplexed video frame corresponding to an arrangement position of the audio data item, and to insert information representing the number of samples included in the audio data item and information regarding continuity into the multiplexed video frame.

* * * * *